(12) United States Patent
Noguchi et al.

(10) Patent No.: US 7,975,545 B2
(45) Date of Patent: Jul. 12, 2011

(54) ANGULAR VELOCITY SENSOR AND ANGULAR VELOCITY SENSOR DEVICE

(75) Inventors: Takao Noguchi, Tokyo (JP); Kenichi Tochi, Tokyo (JP); Ken Unno, Tokyo (JP); Tatsuo Namikawa, Tokyo (JP)

(73) Assignee: TDK Corporation, Tokyo (JP)

( * ) Notice: Subject to any disclaimer, the term of this patent is extended or adjusted under 35 U.S.C. 154(b) by 547 days.

(21) Appl. No.: 11/987,996

(22) Filed: Dec. 6, 2007

(65) Prior Publication Data

US 2008/0134781 A1 Jun. 12, 2008

(30) Foreign Application Priority Data

Dec. 8, 2006 (JP) .................................. 2006-332443
Jan. 17, 2007 (JP) .................................. 2007-008151

(51) Int. Cl.
*G01P 9/04* (2006.01)
(52) U.S. Cl. .................................. 73/504.12; 73/504.16
(58) Field of Classification Search ............... 73/504.16, 73/504.12, 504.04; 310/370
See application file for complete search history.

(56) References Cited

U.S. PATENT DOCUMENTS

| | | | | |
|---|---|---|---|---|
| 5,166,571 A | * | 11/1992 | Konno et al. | 310/333 |
| 5,585,562 A | * | 12/1996 | Kurata et al. | 73/504.16 |
| 6,119,518 A | * | 9/2000 | Itou et al. | 73/504.16 |
| 6,186,003 B1 | * | 2/2001 | Kikuchi et al. | 73/504.12 |
| 6,439,051 B2 | * | 8/2002 | Kikuchi et al. | 73/504.12 |
| 6,467,349 B1 | * | 10/2002 | Andersson et al. | 73/504.14 |
| 6,747,393 B2 | * | 6/2004 | Kikuchi et al. | 310/321 |
| 7,210,350 B2 | * | 5/2007 | Ogura | 73/504.12 |
| 2001/0010173 A1 | * | 8/2001 | Inoue et al. | 73/504.16 |
| 2002/0097037 A1 | * | 7/2002 | Layton | 324/76.49 |

FOREIGN PATENT DOCUMENTS

| | | |
|---|---|---|
| JP | A-8-128833 | 5/1996 |
| JP | A-2003-227719 | 8/2003 |
| JP | A-2005-106481 | 4/2005 |
| JP | B2-3694160 | 7/2005 |

* cited by examiner

*Primary Examiner* — Helen C. Kwok
(74) *Attorney, Agent, or Firm* — Oliff & Berridge, PLC

(57) ABSTRACT

Proposed is a horizontally located angular velocity sensor hardly affected by a translational acceleration in a lateral direction, and in which a fixed section is easily fixed. The angular velocity sensor includes a fixed section fixed on a support surface. On both sides of the fixed section, an arm section of an upper detection arm and a pair of upper drive arms extending along a plane parallel to the support surface, and an arm section of a lower detection arm and a pair of lower drive arms extending along the plane parallel to the support surface are coupled, respectively. The upper detection arm and the pair of upper drive arms are coupled without the fixed section in between, and the lower detection arm and the pair of lower drive arms are coupled without the fixed section in between.

11 Claims, 34 Drawing Sheets

ANGULAR VELOCITY SENSOR AND ANGULAR VELOCITY SENSOR DEVICE

BACKGROUND OF THE INVENTION

1. Field of the Invention

The present invention relates to an angular velocity sensor detecting an angular velocity of an object and an angular velocity sensor device provided therewith.

2. Description of the Related Art

Angular velocity sensors have been used in technique autonomously controlling postures of ship, airplanes, rockets or the like. Recently, the angular velocity sensors have been equipped on small electronic devices such as car navigation systems, digital cameras, video cameras, cell-phones or the like. With that trend, miniaturization and low profile (thinning) of the angular velocity sensors are further demanded. Instead of a vertically supported angular velocity sensor (for example, Japanese Unexamined Patent Publication No. 2003-227719 and Japanese Unexamined Patent Publication No. Hei-8-128833) of the related art in which its longitudinal direction (detection axis direction) is parallel to the vertical direction, a horizontally located angular velocity sensor (for example, Japanese Patent No. 3694160) in which its longitudinal direction is orthogonal to the vertical direction has been proposed.

SUMMARY OF THE INVENTION

However, in the abovementioned techniques, when the angular velocity sensor receives translational acceleration in the lateral direction, it is difficult to distinguish whether the vibrations of the detection arm is due to the angular velocity by the rotation of the object or is due to the acceleration received in the lateral direction.

Thus, as shown in an angular velocity sensor 100 of FIG. 34, it is considered to provide a pair of detection arms 120 on both sides of a fixed section 110 (the up-down direction of the drawing surface), a pair of connection arms 130 in the direction orthogonal to the detection arms 120 of the fixed section 110 (the right-left direction of the drawing surface), and, on respective tip ends of the pair of connection arms 130, a pair of drive arms 140 extending in the direction parallel to the extending direction of the detection arms 120. In this case, the acceleration components received in the lateral direction can be certainly eliminated. However, because the drive arms 140 and the detection arms 120 are combined through the fixed section 110, when the fixed section 110 is firmly fixed on the support surface (not shown in the figure), the distortion generated by Coriolis force acting on the drive arms 140 becomes difficult to be efficiently transmitted to the detection arms 120 through the fixed section 110. On the other hand, when the fixed section 110 is weakly fixed on the support surface, there arises an issue that not only the fixed section 110, but also the detection arms 120 become unstable during the driving time of the drive arms 140.

To solve the issue, Japanese Unexamined Patent Publication No. 2005-106481 has been proposed the technique that a mount support section (not shown in the figure) integrally combined with a plurality of flexural bridges in a horizontal plane is provided inside of the fixed section 110. It is said that, by this technique, the distortion of the connection arms 130 generated by the Coriolis force acting on the drive arms 140 can be efficiently transmitted to the detection arms 120 through the fixed section 110. However, with such a complicated configuration of the fixed section 110, there arises an issue that fixing the fixed section 110 is not facilitated.

In view of the foregoing, it is desirable to provide a horizontally located angular velocity sensor capable of facilitating the elimination of the influence of the translational acceleration in a lateral direction and facilitating the fixation of the fixed section, and an angular velocity sensor device provided therewith.

A first angular velocity sensor according to an embodiment of the present invention includes a fixed section fixed on a support surface, an upper detection arm and a lower detection arm coupled to both sides of the fixed section, respectively, and extending along a plane parallel to a support surface, a pair of upper drive arms coupled directly or indirectly to the upper detection arm and extending along the plane parallel to the support surface, and a pair of lower drive arms coupled directly or indirectly to the lower detection arm and extending along the plane parallel to the support surface. Here, the concept of the term "coupled" includes the case where the both parts are mechanically bonded, the case where the both parts are integrally formed, and the case where the both parts are coupled directly or indirectly.

A first angular velocity sensor device of an embodiment of the present invention includes the first angular velocity sensor and an integrated circuit disposed in internal space formed by a case and an upper cover section stacked with each other, while the integrated circuit transmits drive signals to the pair of upper drive arms and the pair of lower drive arms, and receives detection signals outputted from the upper detection arm and the lower detection arm.

In the first angular velocity sensor and the first angular velocity sensor device of an embodiment of the present invention, the upper detection arm and the pair of upper drive arms are coupled without the fixed section in between, and the lower detection arm and the pair of lower drive arms are coupled without the fixed section in between, thereby distortion generated by a Coriolis force acting on the pair of upper drive arms and the pair of lower drive arm is directly transmitted to the upper detection arm and the lower detection arm without the fixed section in between. Also, an arm of the upper detection arm and the pair of upper drive arms and an arm of the lower detection arm and the pair of lower drive arms are coupled to both sides of the fixed section, respectively. Therefore, in the upper detection arm and the lower detection arm, the vibrations generated due to the Coriolis force and the vibrations generated by the acceleration that is received in the lateral direction are easily distinguished.

Here, between the pair of upper drive arms and the detection arm, and between the pair of lower drive arms and the lower detection arm may be coupled directly, or may be coupled indirectly as in the following (A) and (B). (A) There are provided an upper beam section coupled to the upper detection arm and extending along the plane parallel to the support surface and a lower beam section coupled to the lower detection arm and extending along the plane parallel to the support surface, and the pair of upper drive arms are coupled indirectly to the upper detection arm through the upper beam section and the pair of lower drive arms are coupled indirectly to the lower detection arm through the lower beam section. (B) There are provided a pair of upper beam sections coupled to the upper detection arm and extending along the plane parallel to the support surface and a pair of lower beam sections coupled to the lower detection arm and extending along the plane parallel to the support surface, and each of the pair of upper drive arms is coupled indirectly to the upper detection arm through each of the pair of upper beam sections and each of the pair of lower drive arms is coupled indirectly to the lower detection arm through each of the pair of lower beam sections.

In this way, in case the upper beam section and the lower beam section are provided, the following (1) to (7) are enabled. (1) The upper detection arm, the lower detection arm, the upper drive arm and the lower drive arm are formed extending in the direction parallel to each other. (2) The pair of upper drive arms are formed extending from the upper beam section toward the fixed section and the pair of lower drive arms are formed extending on from the lower beam section toward the fixed section. (3) The pair of upper drive arms are formed extending from the upper beam section toward a direction different from the fixed section and the pair of lower drive arms are formed extending from the lower beam section toward a direction different from the fixed section. (4) The pair of upper drive arms and another pair of upper drive arms are formed respectively extending both from the upper beam section toward the fixed section and from the upper beam section toward a direction different from the fixed section, and the pair of lower drive arms and another pair of lower drive arms are formed respectively extending both from the lower beam section toward the fixed section and from the lower beam section toward a direction different from the fixed section. (5) An upper weighted section is formed to couple to a tip end of each of the pair of upper drive arms, and a lower weighted section is formed to couple to a tip end of each of the pair of lower drive arms. (6) The upper beam section is formed larger than one of the upper drive arm and the upper detection arm in width, and the lower beam section is formed larger than one of the lower drive arm and the lower detection arm in width. (7) The upper beam section is formed larger than one of the upper drive arm and the upper detection arm in thickness, and the lower beam section is formed larger than one of the lower drive arm and the lower detection arm in thickness.

The pair of upper drive arms can be symmetrically disposed with respect to the upper detection arm, and the pair of lower drive arms can be symmetrically disposed with respect to the lower detection arm. The upper detection arm and the lower detection arm can be symmetrically disposed with respect to a straight line orthogonal to the extending direction of the upper detection arm through the fixed section, and the pair of upper drive arms and the pair of lower drive arms can be symmetrically disposed with respect to the straight line orthogonal to the extending direction of the upper detection arm through the fixed section.

According to the first angular velocity sensor and the first angular velocity sensor device of an embodiment of the present invention, the upper detection arm and the pair of upper drive arms are coupled without the fixed section in between, and the lower detection arm and the pair of lower drive arms are coupled without the fixed section in between, thereby the distortion generated due to the Coriolis force acting on the pair of upper drive arms and the pair of lower drive arms can be efficiently transmitted to the upper detection arm and the lower detection arm, with even the uncomplicated configuration of the fixed section. Therefore, the fixed section can be easily fixed on the support surface. Also, an arm of the upper detection arm and the pair of upper drive arms, and an arm of the lower detection arm and the pair of lower drive arms are coupled to the both sides of the fixed section, respectively. Therefore, although the angular velocity sensor is horizontally located, in the upper detection arm and the lower detection arm, the vibrations generated due to the Coriolis force and the vibrations generated by the acceleration that is received in the lateral direction are easily distinguished, thereby the influence of the acceleration in the lateral direction is easily eliminated.

In case there are provided an upper beam section coupled to the upper detection arm and extending along the plane parallel to the support surface, and a lower beam section coupled to the lower detection arm and extending along the plane parallel to the support surface, and the upper drive arms are coupled to the upper detection arm through the upper beam section and the lower drive arms are coupled to the lower detection arm through the lower beam section, and in case there are provided a pair of upper beam sections coupled to the upper detection arm and extending along the plane parallel to the support surface and the pair of lower beam sections coupled to the lower detection arm and extending along the plane parallel to the support surface, and the upper drive arms are coupled to the upper detection arm through the pair of upper beam sections and the lower drive arms are coupled to the lower detection arm through the pair of lower beam sections, when the Coriolis force is generated, a greater moment of the Coriolis force can be charged on the upper detection arm and the lower detection arm, thereby the upper detection arm and the lower detection arm can be vibrated with relatively large amplitude. As a result, the detection accuracy of the angular velocity is improved.

In this way, in case the upper beam section and the lower beam section are provided, when the upper detection arm, the lower detection arm, the upper drive arms and the lower drive arms are formed extending in the direction parallel to each other, the moment of the Coriolis force can be maximized, thereby the detection accuracy of the angular velocity is further improved.

When the upper drive arm is formed extending from the upper beam section toward the fixed section and the lower drive arm is formed extending from the lower beam section toward the fixed section, the angular velocity sensor can be miniaturized in comparison with the case where the upper drive arm is formed extending from the upper beam section toward a direction different from the fixed section and the lower drive arm is formed extending from the lower beam section toward a direction different from the fixed section. In case the upper drive arm is formed extending from the upper beam section toward a direction different from the fixed section and the lower drive arm is formed extending from the lower beam section toward a direction different from the fixed section, when the upper drive arm and the lower drive arm are vibrated, the upper drive arm and the lower drive arm can be vibrated with relatively large amplitude so that the detection accuracy of the angular velocity is improved. In case the pair of upper drive arms and another pair of upper drive arms are formed extending both from the upper beam section toward the fixed section and from the upper beam section toward a direction different from the fixed section, and the pair of lower drive arms and another pair of lower drive arms are formed extending both from the lower beam section toward the fixed section and from the lower beam section toward a direction different from the fixed section, when the upper drive arms and the lower drive arms are vibrated, the upper beam section and the lower beam section can be balanced not to be vibrated correspondingly. As a result, the detection accuracy of the angular velocity is improved.

In case the upper weighted section is formed coupled to the tip end of each of the upper drive arms, and the lower weighted section is formed to couple to the tip end of each of the lower drive arms, when the upper drive arms and the lower drive arms are vibrated, the upper drive arms and the lower drive arms can be vibrated with relatively large amplitude so that the detection accuracy of the angular velocity is improved.

In case the upper beam section is formed larger than one of the upper drive arm and the upper detection arm in width, and the lower beam section is formed larger than one of the lower drive arm and the lower detection arm in width, and in case the upper beam section is formed larger than one of the upper drive arm and the upper detection arm in thickness, and the thickness of the lower beam section is formed larger than one of the lower drive arm and the lower detection arm in thickness, the rigidity of the upper beam section and the lower beam section is enhanced so that drive vibrations can be efficiently generated on the upper drive arm and the lower drive arm. Further, when the Coriolis force is generated, detection vibrations can be efficiently generated on the upper detection arm and lower detection arm. As a result, the detection accuracy of the angular velocity is improved.

In case the pair of upper drive arms are symmetrically disposed with respect to the upper detection arm, and the pair of lower drive arms are symmetrically disposed with respect to the lower detection arm, the bilaterally-symmetric drive vibrations are likely generated so that a drive circuit driving the upper drive arm and the lower drive arm can be simplified and the unnecessary vibrations (the undesired vibrations) of the upper detection arm and the lower detection arm can be suppressed. In case the upper detection arm and the lower detection arm are symmetrically disposed with respect to the straight line orthogonal to the extending direction of the upper detection arm through the fixed section, and the pair of upper drive arms and the pair of lower drive arms are symmetrically disposed with respect to the straight line orthogonal to the extending direction of the upper detection arm through the fixed section, the vibrations generated due to the acceleration in the lateral direction and the vibrations generated by the angular velocity are easily distinguished so that the detection accuracy of the angular velocity is improved.

A second angular velocity sensor of an embodiment of the present invention includes a fixed section fixed on a support surface; a first upper vibration arm and a first lower vibration arm coupled to both sides of a fixed section, respectively, and extending along a plane parallel to a support surface, and respectively having a first electrode; a pair of second upper vibration arms coupled directly or indirectly to the first upper vibration arm and extending along the plane parallel to the support surface, and respectively having a second electrode; and a pair of second lower vibration arms coupled directly or indirectly to the first lower vibration arm and extending along the plane parallel to the support surface, and respectively having a third electrode.

A second angular velocity sensor device of an embodiment of the present invention includes an angular velocity sensor and an integrated circuit in internal space formed by a case and an upper cover section stacked with each other. In the second angular velocity device including the second angular velocity sensor, the integrated circuit transmits a drive signal to the second electrodes and the third electrodes, and receives a detection signal outputted from the first electrodes.

A third angular velocity sensor of an embodiment of the present invention includes a fixed section fixed on a support surface, an upper connection arm and a lower connection arm coupled to both sides of the fixed section, respectively, and extending along a plane parallel to the support surface, a pair of first upper vibration arms coupled to the upper connection arm and extending along the plane parallel to a support surface, and respectively having a first electrode, a pair of first lower vibration arms coupled to the lower connection arm and extending along the plane parallel to the support surface, and respectively having a second electrode, a pair of second upper vibration arms respectively coupled to the pair of first upper vibration arms and extending along the plane parallel to the support surface, and respectively having a third electrode, and a pair of second lower vibration arms respectively coupled to the pair of first lower connection arms and extending along the plane parallel to the support surface, and respectively having a fourth electrode. Here, the concept of the term "coupled" includes the case where the both parts are mechanically coupled, the case where the both parts are integrally formed, and the case where the both parts are coupled directly or indirectly.

A third angular velocity sensor device of an embodiment of the present invention includes an angular velocity sensor and an integrated circuit. The integrated circuit transmits drive signals to the pair of second upper vibration arms and the pair of second lower vibration arms, and receives detection signals outputted from the first upper vibration arm and the first lower vibration arm.

In the third angular velocity sensor and the third angular velocity sensor device of an embodiment of the present invention, the first upper vibration arm and the pair of second upper vibration arms are coupled, and the first lower vibration arm and the pair of second lower vibration arms are coupled, thereby distortion generated by the Coriolis force acting on the second upper vibration arm and the second lower vibration arm is directly transmitted to the first upper vibration arm and the first lower vibration arm without the fixed section in between. Also, an arm section of the first upper vibration arm and the second upper vibration arm and an arm section of the first lower vibration arm and the second lower vibration arm are respectively coupled to both sides of the fixed section with the fixed section in between. Therefore, in the first upper vibration arm and the first lower vibration arm, the vibrations generated due to the Coriolis force and the vibrations generated by the translational acceleration that is received in the lateral direction are easily distinguished.

Here, the second upper vibration arm and the second lower vibration arm can be formed extending in a direction parallel to each other. The second upper vibration arm can be formed extending from the first upper vibration arm toward the fixed section, and the second lower vibration arm can be formed extending from the first lower vibration arm toward the fixed section. Alternatively, the second upper vibration arm can be disposed extending from the first upper vibration arm toward a direction different from the fixed section, and the second lower vibration arm can be disposed extending from the first lower vibration arm toward a direction different from the fixed section. Alternatively, the second upper vibration arm and the third upper vibration arm can be respectively disposed extending both from the first upper vibration arm toward the fixed section and from the first upper vibration arm toward a direction different from the fixed section, and the second lower vibration arm and the third lower vibration arm can be disposed extending from the first lower vibration arm toward the fixed section and from the first lower vibration arm toward a direction different from the fixed section.

An upper weighted section can be formed to couple to a tip end of each of the pair of second upper vibration arms, and a lower weighted section can be formed to couple to a tip end of each of the pair of second lower vibration arms. The upper connection arm can be formed larger than one of the first upper vibration arm and the second upper vibration arm in width, and the lower connection arm can be formed lager than one of the first lower vibration arm and the second lower vibration arm in width. The upper connection arm can be formed larger than one of the first upper vibration arm and the second upper vibration arm in thickness, and the lower connection arm can be formed larger than one of the first lower vibration arm and the second lower vibration arm in thickness.

The second upper vibration arm can be symmetrically disposed with respect to the upper connection arm, and the second lower vibration arm can be symmetrically disposed with respect to the lower connection arm. The first upper vibration arm and the first lower vibration arm can be symmetrically disposed with respect to a straight line orthogonal to the extending direction of the upper connection arm through the fixed section, and the second upper vibration arm and the second lower vibration arm can be symmetrically disposed with respect to the straight line orthogonal to the extending direction of the upper connection arm through the fixed section.

According to the third angular velocity sensor and the third angular velocity sensor device of an embodiment of the present invention, the first upper vibration arm and the second upper vibration arm are coupled without the fixed section in between, and the first lower vibration arm and the second lower vibration arm are coupled without the fixed section in between, thereby the distortion generated due to the Coriolis force acting on the second upper vibration arm and the second lower vibration arm can be efficiently transmitted to the first upper vibration arm and the first lower vibration arm, with even the uncomplicated configuration of the fixed section. Therefore, the fixed section is easily fixed on the support surface. Also, an arm section of the first upper vibration arm and the second upper vibration arm and an arm section of the first lower vibration arm and the second lower vibration arm are respectively coupled to the both sides of the fixed section with the fixed section in between. Therefore, although the angular velocity sensor is horizontally located, in the first upper vibration arm and the first lower vibration arm, the vibrations generated due to the Coriolis force and the vibrations generated by the translational acceleration that is received in the lateral direction are easily distinguished. Accordingly, the influence of the translational acceleration in the lateral direction is easily eliminated.

In case the second upper vibration arm and the second lower vibration arm are formed extending in the direction parallel to each other, the moment of the Coriolis force can be maximized, thereby the detection accuracy of the angular velocity is further improved.

When the second upper vibration arm is disposed extending from the first upper vibration arm toward the fixed section and the second lower vibration arm is disposed extending from the first lower vibration arm toward the fixed section, the angular velocity sensor can be miniaturized in comparison with the case where the second upper vibration arm is disposed extending from the first upper vibration arm toward a direction different from the fixed section and the second lower vibration arm is disposed extending from the first lower vibration arm toward a direction different from the fixed section. In case the second upper vibration arm is disposed extending from the first upper vibration arm toward a direction different from the fixed section and the second lower vibration arm is disposed extending from the first lower vibration arm toward a direction different from the fixed section, when the second upper vibration arm and the second lower vibration arm are vibrated, the second upper vibration arm and the second lower vibration arm can be vibrated with relatively large amplitude so that the detection accuracy of the angular velocity is improved. In case the second upper vibration arm is disposed extending from the first upper vibration arm toward the fixed section and from the first upper vibration arm toward a direction different from the fixed section, and the second lower vibration arm is disposed extending both from the first lower vibration arm toward the fixed section and from the first lower vibration arm toward a direction different from the fixed section, when the second upper vibration arm and the second lower vibration arm are vibrated with no rotation applied, the first upper vibration arm and the first lower vibration arm can be controlled not to be vibrated correspondingly. As a result, the detection accuracy of the angular velocity is improved.

In case the upper weighted section is formed to couple to the tip end of each of the second upper vibration arms and the lower weighted section is formed to couple to the tip end of each of the second lower vibration arms, when the second upper vibration arm and the second lower vibration arm are vibrated, the second upper vibration arm and the second lower vibration arm can be vibrated with relatively large amplitude so that the detection accuracy of the angular velocity is improved.

In case the upper connection arm is formed larger than one of the first upper vibration arm and the second upper vibration arm in width and the lower connection arm is formed larger than one of the first lower vibration arm and the second lower vibration arm in width, and in case the upper connection arm is formed larger than one of the first upper vibration arm and the second upper vibration arm in thickness and the lower connection arm is formed larger than one of the first lower vibration arm and the second lower vibration arm in thickness, the rigidity of the upper connection arm and the lower connection arm is enhanced so that the drive vibrations can be efficiently generated on the second upper vibration arm and the second lower vibration arm. Further, when the Coriolis force is generated, the detection vibrations can be efficiently generated on the first upper vibration arm and first lower vibration arm. As a result, the detection accuracy of the angular velocity is improved.

In case the second upper vibration arm is symmetrically disposed with respect to the upper connection arm and the second lower vibration arm is symmetrically disposed with respect to the lower connection arm, the bilaterally-symmetric drive vibrations are likely generated so that the drive circuit driving the second upper vibration arm and the second lower vibration arm can be simplified and the unnecessary vibrations (the undesired vibrations) of the first upper vibration arm and the first lower vibration arm can be suppressed. In case the first upper vibration arm and the first lower vibration arm are symmetrically disposed with respect to the straight line orthogonal to the extending direction of the upper connection arm through the fixed section, and the second upper vibration arm and the second lower vibration arm are symmetrically disposed with respect to the straight line orthogonal to the extending direction of the upper connection arm through the fixed section, the vibrations generated due to the translational acceleration in the lateral direction and the vibrations generated by the angular velocity are easily distinguished so that the detection accuracy of the angular velocity is improved.

Other and further objects, features and advantages of the invention will appear more fully from the following description.

DETAILED DESCRIPTION OF THE PREFERRED EMBODIMENTS

Hereinafter, preferred embodiments of the present invention will be described in detail with reference to the accompanying drawings.

First Embodiment

With reference to FIGS. 1 to 5, the configuration of an angular velocity sensor device according to a first embodiment of the present invention will be described in the following.

Figure 1:
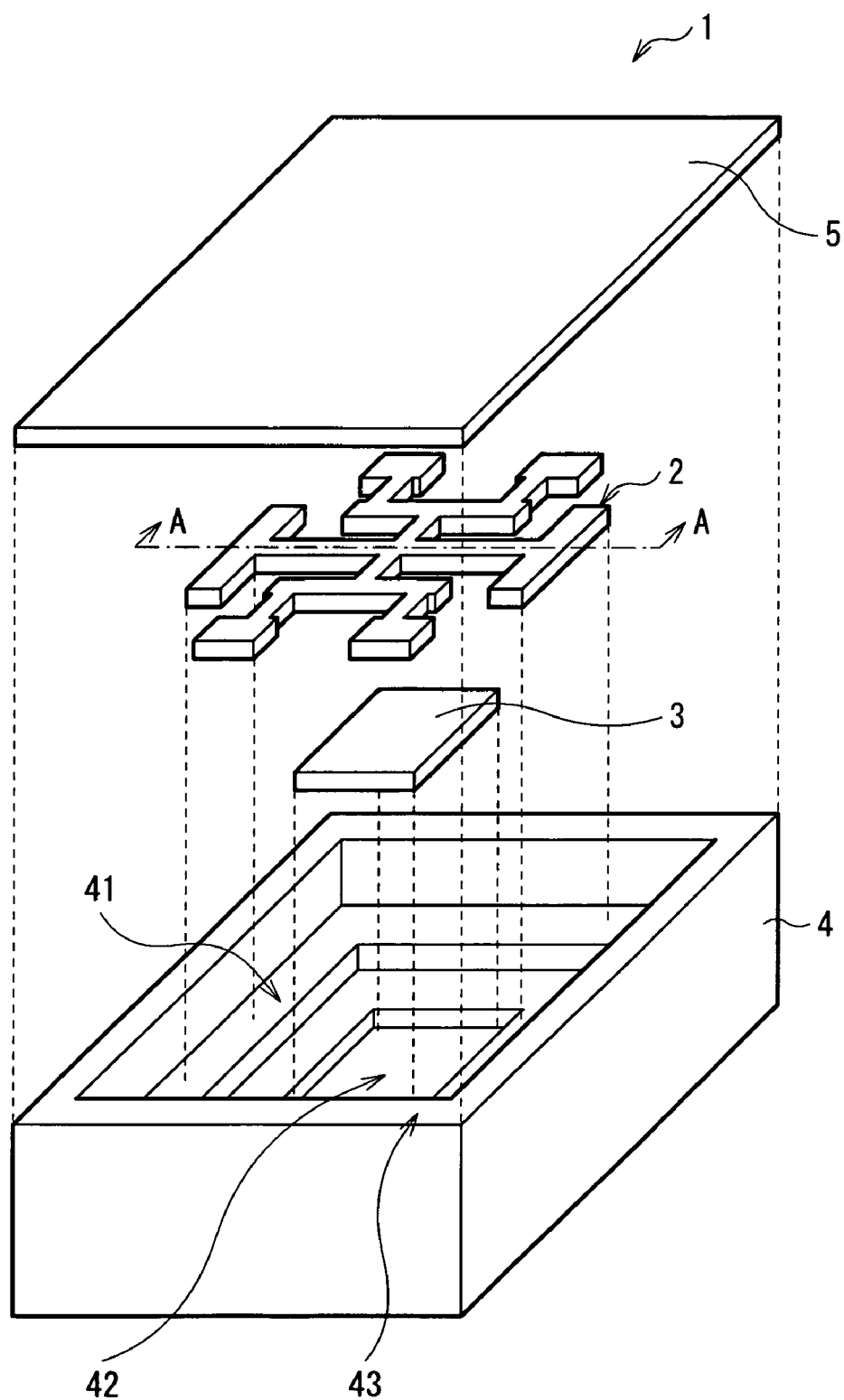
FIG. 1 is an exploded perspective view of an angular velocity sensor device according to an embodiment of the present invention.

FIG. 1 is an exploded perspective view showing the internal configuration of the angular velocity sensor device 1 of the first embodiment.

Figure 2:
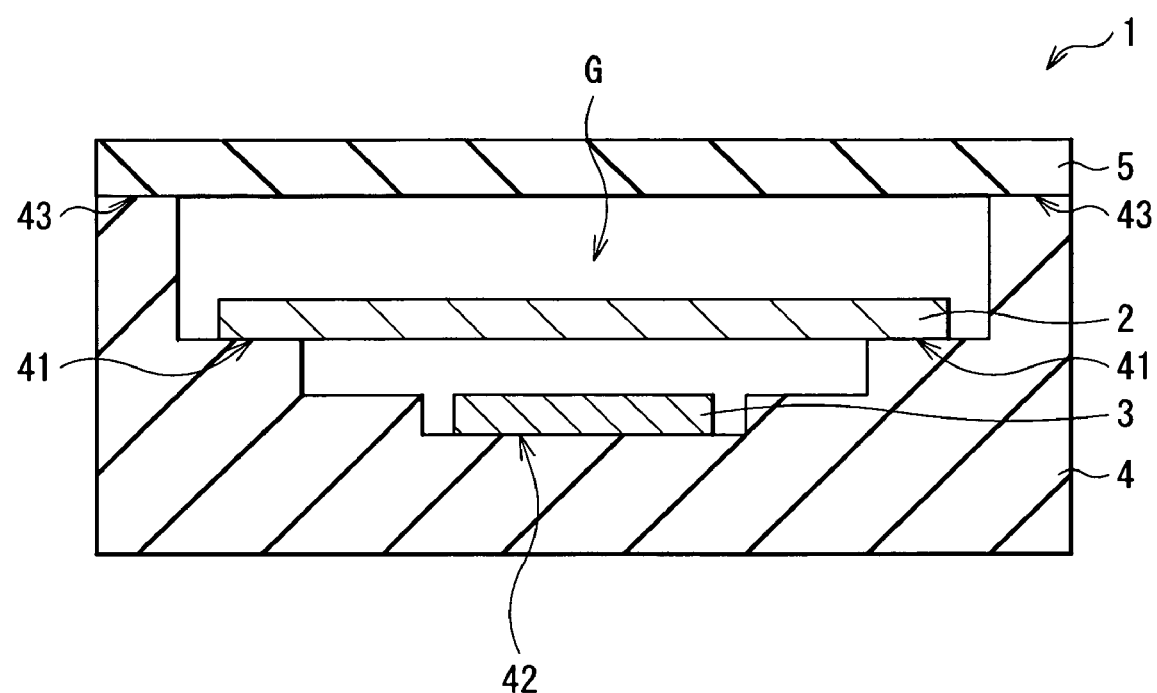
FIG. 2 is a cross-sectional configuration view of the angular velocity sensor device of FIG. 1.

FIG. 2 is a cross-sectional view showing the cross-sectional configuration as viewed from the direction of an arrow A-A of the angular velocity sensor device 1. In the angular velocity sensor device 1, an angular velocity sensor 2 and an integrated circuit 3 are disposed in an internal space G (refer to FIG. 2) formed by a case 4 and an upper cover section 5 stacked with each other.

As will be described later, the integrated circuit 3 transmits a drive signal to each of piezoelectric elements (the drive means) provided on each of drive arms of the angular velocity sensor 2 and receives a detection signal outputted from each of the piezoelectric elements (the output means) provided on each of detection arms of the angular velocity sensor 2. The case 4 is, for example, formed by stacking a plurality of ceramic laminates and has stepped depressions capable of storing the angular velocity sensor 2 and the integrated circuit 3. The upper cover section 5 is, for example, formed by the same ceramic material as the case 4.

As shown in FIG. 1, a rectangular integrated circuit support section 42 is formed in the deepest position of the depressions of the case 4, and the integrated circuit 3 is disposed on the integrated circuit support section 42. A rectangular annular sensor support section 41 is formed in the vicinity of the integrated circuit support section 42 and in the position shallower than the position of the integrated circuit support section 42. The angular velocity sensor 2 is disposed on a top surface (a support surface) of the sensor support section 41, in the center-impeller beam structure. A rectangular annular upper cover support section 43 forming an outer edge of the depression is formed in the vicinity of the sensor support section 41. The upper cover support section 43 and the upper cover section 5 seal up the case 4 from the exterior, and are stacked with each other to form the internal space G (refer to FIG. 2).

As shown in FIGS. 1 and 2, the angular velocity sensor 2 is provided along the in-plane parallel to the top surface of the sensor support section 41 of the case 4. That is, the angular velocity sensor 2 is a so-called horizontally located element.

Figure 3:
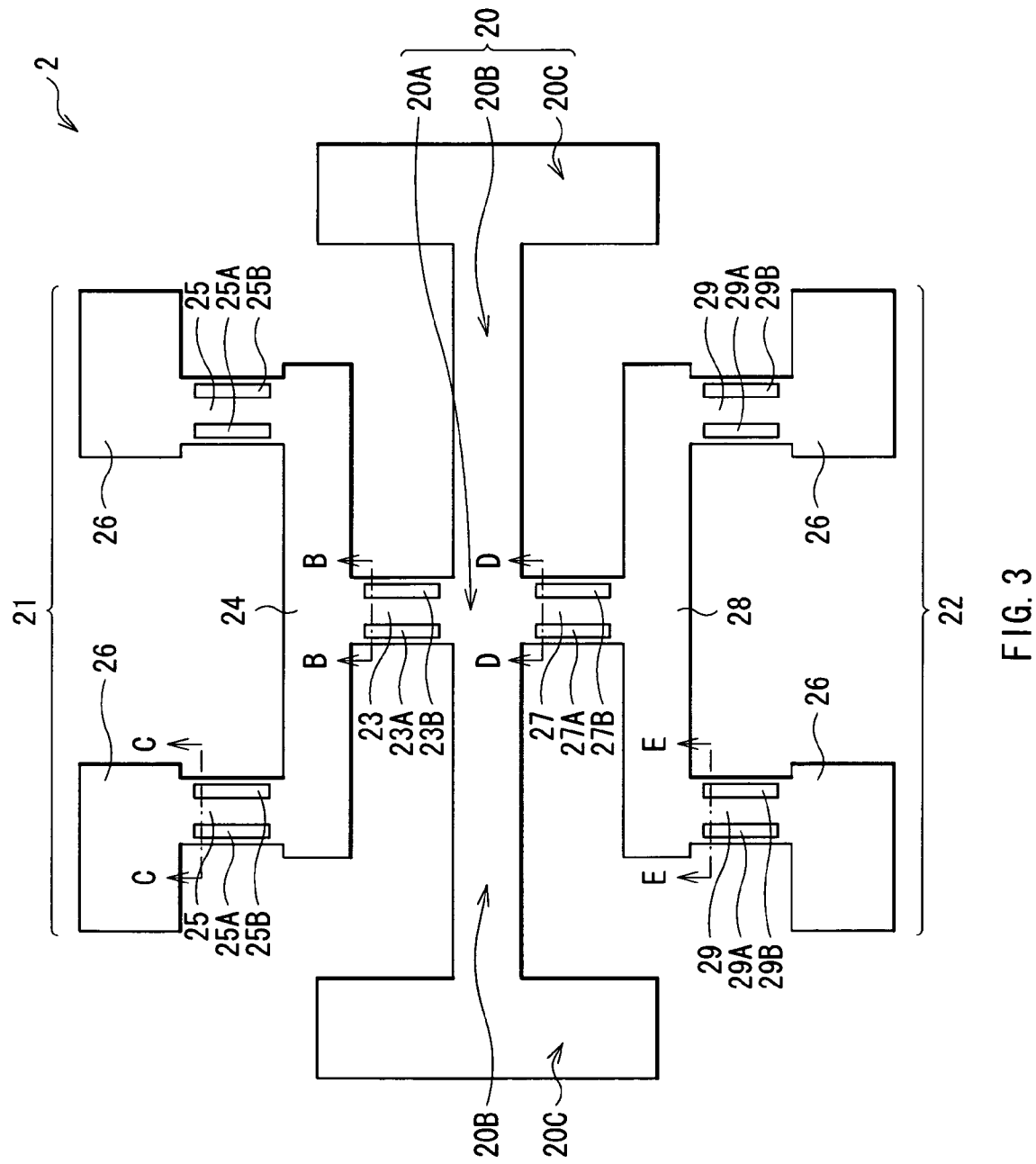
FIG. 3 is a top configuration view of the angular velocity sensor of FIG. 1.
Figure 4:
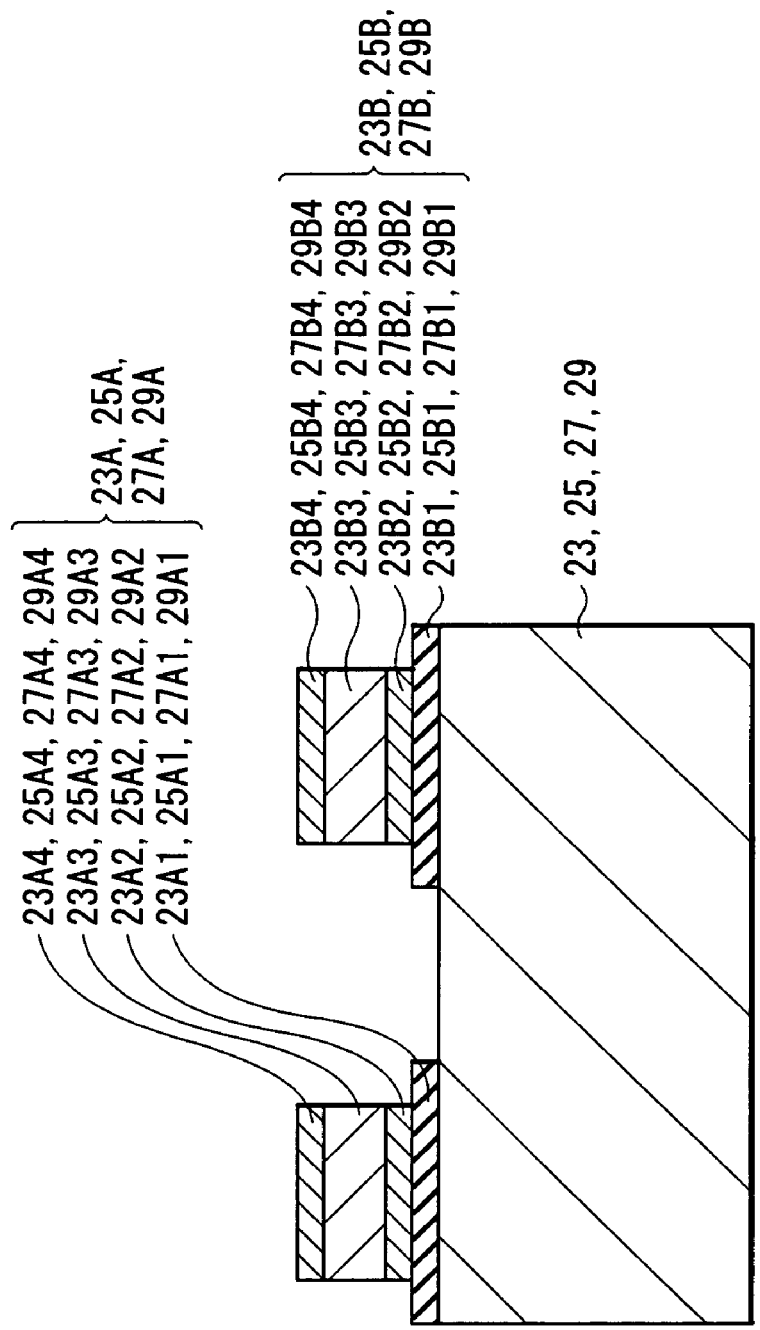
FIG. 4 is a cross-sectional configuration view of the angular velocity sensor of FIG. 3

FIG. 3 shows a top configuration view of the angular velocity sensor 2 and FIG. 4 is a cross-sectional view where the cross-sectional configuration examples as viewed from the direction of the arrows B-B, C-C, D-D and E-E of FIG. 3 are brought together. The angular velocity sensor 2 has a fixed section 20 fixed on the sensor support section 41 (FIG. 1), an upper vibration section 21 and a lower vibration section 22 coupled respectively to both sides of the fixed section 20 (in FIG. 3, the vertical direction of the drawing surface) extending in the plane parallel to the top surface of the sensor support section 41.

Here, the terms "upper" and "lower" are respectively used for convenience sake to indicate the upper direction and the lower direction by using the fixed section 20 as the base. The same is true for the terms "right" and "left" that will be mentioned later and they indicate the right direction and the left direction.

The fixed section 20 maintains the upper vibration section 21 and lower vibration section 22 inside an internal space G in the floating condition. The fixed section 20 has a rectangle fixed central section 20A provided in the central portion of the angular velocity sensor 20A. A pair of fixed beam sections 20B are coupled to the both sides of the fixed central section 20A (the right-left direction in the figure). Each of the fixed beam sections 20B has a rectangular shape extending in the right-left direction. A pair of fixed end sections 20C are coupled to the tip ends of the pair of fixed beam sections 20B so as to sandwich, from the left and the right, the fixed central section 20A and the pair of fixed beam sections 20B between the pair of fixed end sections 20C. Each of the fixed end sections 20C has a rectangular form extending in the upper-lower direction. The central portion of each of fixed end sections 20C is coupled to the tip end of each of the fixed beam sections 20B and the bottom of the fixed end sections 20C is contacted to the upper surface of the sensor support section 41. This enables the fixed central section 20A and the fixed beam sections 20B to be maintained inside the internal space G in the floating condition by the fixed end sections 20C.

The upper vibration section 21 has an upper detection arm 23 coupled to the upper side of the fixed central section 20A and extending on the upper side of the fixed section 20. When the distortion of the upper beam section 24 generated by the Coriolis force is transmitted to the upper detection arm 23, the upper detection arm 23 generates vibrations according to the magnitude of the distortion, the Coriolis force acting on the upper drive arm 25 that will be described later.

An upper beam section 24 is coupled to the tip end on the side of the upper detection arm 23 different from the fixed central section 20A. The upper beam section 24 transmits the distortion of the upper beam section 24 generated by the Coriolis force acting on the upper drive arms 25 that will be described later. The upper beam section 24 has, for example, a rectangular shape extending in the direction orthogonal to the extending direction of the upper detection arm 23, and the central portion of the upper beam section 24 is coupled to the upper detection arm 23. The upper beam section 24 may have a broken line shape which intersects the extending direction of the upper detection arm 23 at a predetermined angle.

Both ends of the upper beam section 24 are coupled to a pair of upper drive arms 25, respectively. Each of the upper drive arms 25 generates the Coriolis force on the upper drive arm 25 when an object equipped with the angular velocity sensor device 1 performs the rotation with respect to the direction orthogonal to the top surface of the sensor support section 41. Each of the upper drive arms 25 extends on the upper beam section 24 different from the upper detection arm 23, and has, for example, a rectangular shape extending in the direction parallel to the extending direction of the upper detection arm 23. Each of the upper drive arms 25 may extend in the direction intersecting the extending direction of the upper detection arm 23 at the predetermined angle.

A weighted section 26 is coupled to one tip end on the side of each of the upper drive arms 25 different from the upper beam section 24. Here, the weighted section 26 increases vibrations of each of the upper drive arm 25.

On the other hand, the lower vibration section 22 has a lower detection arm 27 coupled to the lower side of the fixed central section 20A and extending on the lower side of the fixed section 20. When the distortion of the lower beam section 28 (will be described later) generated by the Coriolis force is transmitted to the lower detection arm 27, the lower detection arm 27 generates vibrations according to the magnitude of the distortion, the Coriolis force acting on the lower drive arms 29 that will be described later.

A lower beam section 28 is coupled to the tip end on the side of the lower detection arm 27 different from the fixed central section 20A. The lower beam section 28 transmits the distortion of the lower beam section 28 generated by the Coriolis force acting on the lower detection arms 29 that will be described later. The lower beam section 28 has, for example, a rectangular shape extending in the direction orthogonal to the extending direction of the lower detection arm 27, and the central portion of the lower beam section 28 is coupled to the lower detection arm 27. The lower beam section 28 may have a broken line shape which intersects the extending direction of the lower detection arm 27 at the predetermined angle.

Both ends of the lower beam section 28 are coupled to a pair of lower drive arms 29, respectively. Each of the lower drive arms 29 generates the Coriolis force on the lower drive arm 29 when the object equipped with the angular velocity sensor device 1 performs the rotation with respect to the direction orthogonal to the top surface of the sensor support section 41. Each of the lower drive arms 29 extends on the side of the lower beam section 28 different from the lower detection arm 27, and has, for example, a rectangular shape extending in the direction parallel to the extending direction of the lower detection arm 27. Each of the lower drive arms 29 may extend in the direction intersecting the extending direction of the lower detection arm 27 at the predetermined angle.

The weighted section 26 is coupled to the tip end on the side of each of the lower drive arms 29 different from the lower beam section 28. Here, the weighted section 26 increases vibrations of each of the lower drive arm 29.

Here, the fixed section 20, the upper detection arm 23, the upper beam section 24, the upper drive arms 25, the weighted sections 26, the lower detection arm 27, the lower beam section 28 and the lower drive arms 29 can be, for example, respectively composed of common material (for example, silicon), and can be collectively formed by patterning a wafer.

On the surface of the upper detection arm 23, a pair of piezoelectric elements 23A and 23B are formed extending in the direction parallel to the extending direction of the upper detection arm 23. The piezoelectric elements 23A and 23B detect the vibrations when the upper detection arm 23 is vibrated along the plane parallel to the top surface of the sensor support section 41 of the case 4, and are disposed side by side along the width direction of the upper detection arm 23 (the direction orthogonal to the longitudinal direction).

The upper detection arm 23, and the part of the piezoelectric elements 23A and 23B correspond to an example of "the first upper vibration arm" of the present invention.

On the surface of each of the upper drive arms 25 or the upper beam section 24, a pair of piezoelectric elements 25A and 25B are formed extending in the direction parallel to the extending direction of each of the upper drive arms 25 or the upper beam section 24. These piezoelectric elements 25A and 25B vibrate, along the plane parallel to the top surface of the sensor support section 41 of the case 4, each of the upper drive arms 25 or the upper beam section 24, and are disposed side by side along the width direction of each of the upper drive arms 25 or the upper beam section 24 (the direction orthogonal to the longitudinal direction). In FIG. 3, the case is shown where the piezoelectric elements 25A and 25B are formed on each of the upper piezoelectric drive arms 25. In this case, the upper drive arms 25, and the part of the piezoelectric elements 25A and 25B correspond to an example of "the second upper vibration arm" of the present invention.

On the surface of the lower detection arm 27, a pair of piezoelectric elements 27A and 27B are formed extending in the direction parallel to the extending direction of the lower detection arm 27. The piezoelectric elements 27A and 27B detect the vibrations when the lower detection arm 27 is vibrated along the plane parallel to the top surface of the sensor support section 41 of the case 4, and are disposed side by side along the width direction of the lower detection arm 27. The lower detection arm 27, and the part of the piezoelectric elements 27A and 27B correspond to an example of "the first lower vibration arm" of the present invention.

On the surface of each of the lower drive arms 29 or the lower beam section 28, a pair of piezoelectric elements 29A and 29B are formed extending in the direction parallel to the extending direction of each of the lower drive arms 29 or the lower beam section 28. These piezoelectric elements 29A and 29B vibrate, along the plane parallel to the top surface of the sensor support section 41 of the case 4, each of the lower drive arms 29 or the lower beam section 29, and are disposed side by side along the width direction of each of the lower drive arms 29 or the lower beam section 28. In FIG. 3, the case is shown where the piezoelectric elements 29A and 29B are formed on each of the lower drive arms 29. In this case, the lower drive arms 29, and the part of the piezoelectric elements 29A and 29B correspond to an example of "the second lower vibration arm" of the present invention.

Here, for example as shown in FIG. 4, the piezoelectric element 23B, the piezoelectric elements 25B, the piezoelectric element 27B and the piezoelectric elements 29B are formed by stacking, in this order, on the upper detection arm 23, the upper drive arm 25, the lower detection arm 27 and the lower drive arm 29, insulation layers 23B1, 25B1, 27B1 and 29B1, lower electrodes 23B2, 25B2, 27B2 and 29B2, piezoelectric substances 23B3, 25B3, 27B3 and 29B3, and upper electrodes 23B4, 25B4, 27B4 and 29B4. On the other hand, for example as shown in FIG. 4, the piezoelectric element 23A, the piezoelectric elements 25A, the piezoelectric element 27A and the piezoelectric elements 29A are formed by stacking, in this order, on the upper detection arm 23, the upper drive arm 25, the lower detection arm 27 and the lower drive arm 29, insulation layers 23A1, 25A1, 27A1 and 29A1, lower electrodes 23A2, 25A2, 27A2 and 29A2, piezoelectric substances 23A3, 25A3, 27A3 and 29A3, and upper electrodes 23A4, 25A4, 27A4 and 29A4. That is, each of the piezoelectric element 23B, the piezoelectric elements 25B, the piezoelectric element 27B and the piezoelectric elements 29B, and each of the piezoelectric element 23A, the piezoelectric elements 25B, the piezoelectric element 27B and the piezoelectric elements 29B are formed separately to each other.

Figure 5:
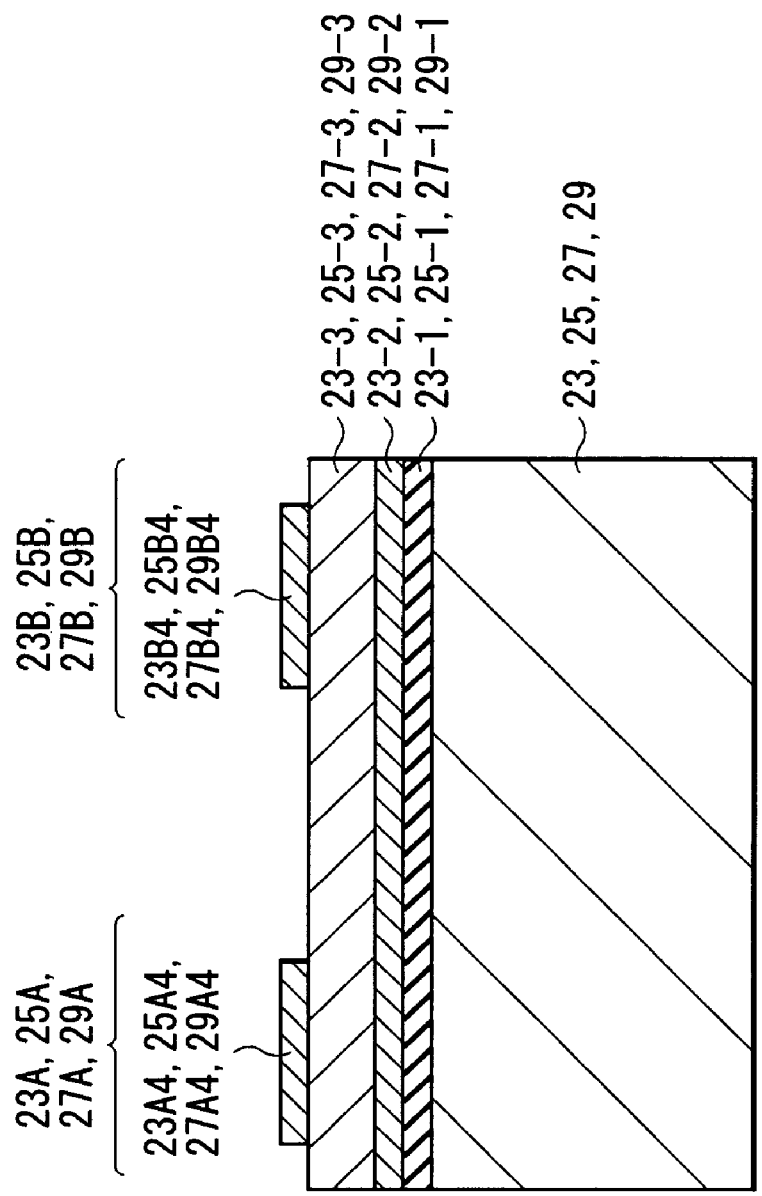
FIG. 5 is a cross-sectional configuration view for explaining a modification of the cross-sectional configuration illustrated in FIG. 4.

For example as shown in FIG. 5, the insulation layers 23B1, 25B1, 27B1 and 29B1 and the insulation layers 23A1, 25A1, 27A1 and 29A1 may be formed by common insulation layers 23-1, 25-1, 27-1 and 29-1. The lower electrodes 23B2, 25B2, 27B2 and 29B2, and the lower electrodes 23A2, 25A2, 27A2, and 29A2 may be formed by common insulation layers 23-2, 25-2, 27-2 and 29-2. The piezoelectric substances 23B3, 25B3, 27B3 and 29B3 and the piezoelectric substances 23A3, 25A3, 27A3 and 29A3 may be formed by common piezoelectric substances 23-3, 25-3, 27-3 and 29-3.

Here, the insulation layers 23B1, 25B1, 27B1, 29B1, 23A1, 25A1, 27A1, 29A1 and 23-1 are formed by stacking, for example, a $ZrO_2$ film and an $Y_2O_3$ film in this order. The lower electrodes 23B2, 25B2, 27B2, 29B2, 23A2, 25A2, 27A2, 29A2 and 23-2 are, for example, composed of a Pt (100) alignment film. The piezoelectric substances 23B3, 25B3, 27B3, 29B3, 23A3, 25A3, 27A3, 29A3 and 23-3 are, for example, formed including piezoelectric zirconate titanate (PZT). The upper electrodes 23B4, 25B4, 27B4, 29B4, 23A4, 25A4, 27A4 and 29A4 are, for example, composed of a Pt (100) alignment film.

Next, the operation of the angular velocity sensor device having the abovementioned configuration or the like will be described.

Figure 6:
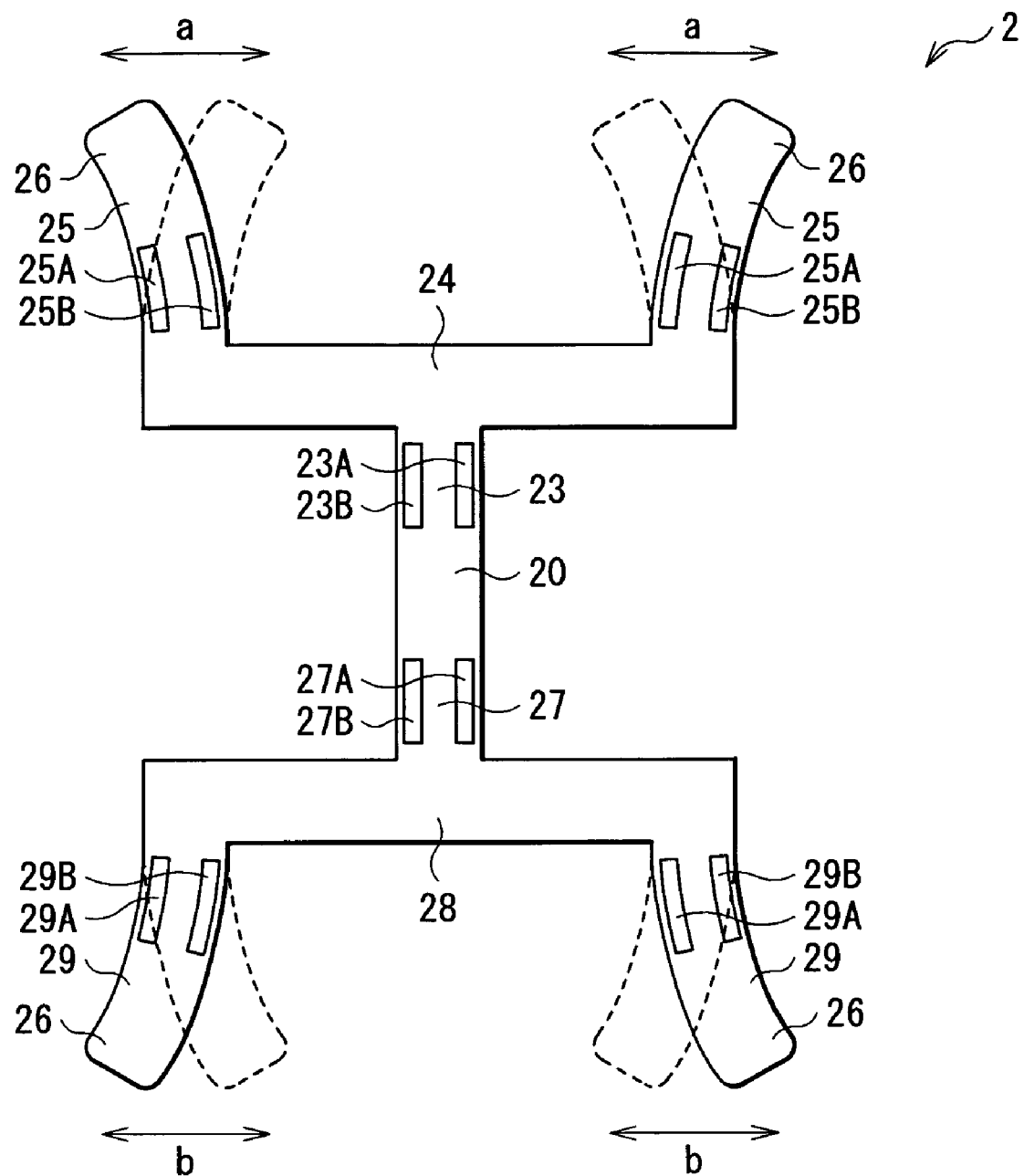
FIG. 6 is a simplified top configuration view for explaining an operation when a rotation is not applied to the angular velocity sensor of FIG. 1.

In the angular velocity sensor device, in case the object equipped with the angular velocity sensor device performs no rotation, when the upper drive arms 25 are, for example, driven using the piezoelectric elements 25B and the piezoelectric elements 25A, the upper drive arms 25 are mainly vibrated in a direction "a" parallel to the extending direction of the upper beam section 24, and the lower drive arms 29 are mainly vibrated in a direction "b" parallel to the extending direction of the lower beam section 28, as in FIG. 6.

Figure 7:
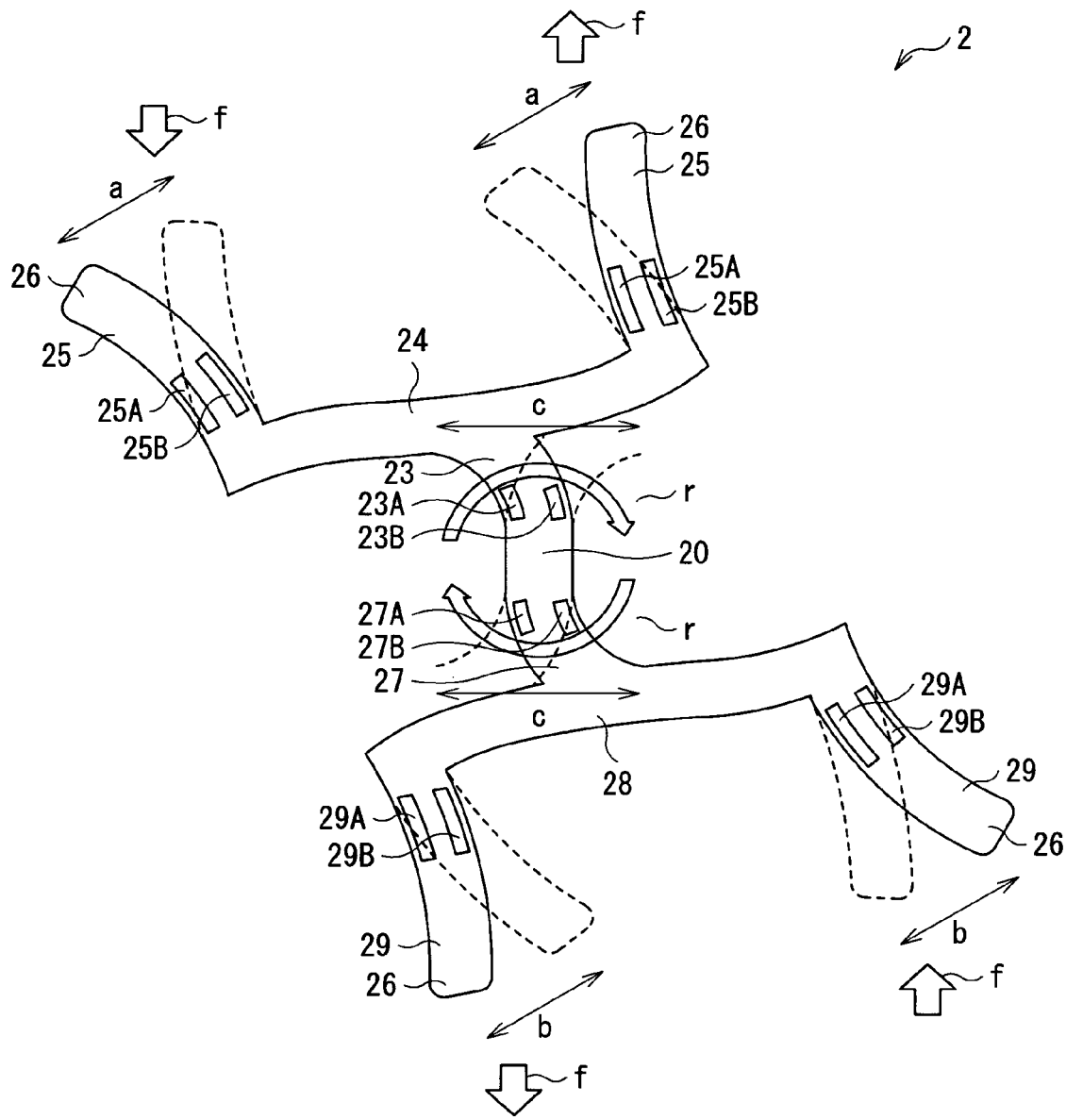
FIG. 7 is a simplified top configuration view for explaining the operation when the rotation is applied to the angular velocity sensor of FIG. 1

In this case, for example as in FIG. 7, when the object equipped with the angular velocity sensor device 1 performs a rotation "r" with respect to the direction orthogonal to the top surface of the sensor support section 41, a Coriolis force f acts on the right upper drive arm 25 and the left upper drive arm 25 in the opposite directions, respectively, and the Coriolis force f acts on the right lower drive arm 29 and the left lower drive arm 29 in the opposite directions, respectively. Thus, the pair of upper drive arms 25 and the upper beam section 24, and the pair of lower drive arms 29 and the lower beam section 28 are asymmetrically vibrated, and the upper detection arm 23 and the lower detection arm 27 are vibrated in a right-left direction "c". Therefore, the detection signal according to the vibration of the upper detection arm 23 at this time can be extracted from the piezoelectric element 23B and the piezoelectric element 23A, and the detection signal according to the vibration of the lower detection arm 27 can be extracted from the piezoelectric element 27B and the piezoelectric element 27A, thereby each velocity can be detected.

In the first embodiment, the vibration arm including the upper drive arms 25 and the upper detection arm 23 and the vibration arm including the lower drive arms 29 and the lower detection arm 27 are coupled to the both sides of the fixed section 20, respectively. Thus, in case the angular velocity is detected in the abovementioned way, or in case the object equipped with the angular velocity sensor device 1 stops or performs the uniform motion, when the acceleration is received in the lateral direction, the upper detection arm 23 and the lower detection arm 27 are displaced in the same direction and the vibrations of the same phase are generated on the upper detection arm 23 and the lower detection arm 27. The difference between the detection signal extracted from the piezoelectric element 23B and the piezoelectric element 23A, and the detection signal extracted from the piezoelectric element 27B and the piezoelectric element 27A are detected so that the output of the vibrations due to the acceleration in the lateral direction can be canceled and the noise can be suppressed. In this way, although the angular velocity sensor is horizontally located, the vibrations generated due to the Coriolis force and the vibrations generated by the acceleration received in the lateral direction can be distinguished, thereby the influence of the translational acceleration in the lateral direction can be almost eliminated.

In the first embodiment, the upper beam section 24 is coupled between the upper detection arm 23 and the upper drive arms 25, and the lower beam section 28 is coupled between the lower detection arm 27 and the lower drive arms 29. Thus when the Coriolis force is generated, a greater moment of the Coriolis force can act on the upper drive arms 25 and the lower drive arms 29, thereby the upper detection arm 23 and the lower detection arm 27 can be vibrated with relatively large amplitude. As a result, the detection accuracy of the angular velocity is improved.

In the first embodiment, the upper drive arms 25 are formed extending on the side of the upper beam section 24 different from the fixed section 20 and the lower drive arms 29 are formed extending on the side of the lower beam section 28 different from the fixed section 20. Thus, when the upper drive arms 25 are vibrated by the piezoelectric elements 25B and the piezoelectric elements 25A, and when the lower drive arms 29 are vibrated by the piezoelectric elements 29B and the piezoelectric elements 29A, the upper drive arms 25 and the lower drive arms 29 can be vibrated with relatively large amplitude, thereby the detection accuracy of the angular velocity is improved.

When the upper detection arm 23, the lower detection arm 27, the upper drive arms 25 and the lower drive arms 29 are formed extending in the direction parallel to each other, the moment of the Coriois force can be maximized, thereby the detection accuracy of the angular velocity further improved.

When the pair of upper drive arms 25 are symmetrically formed with respect to the upper detection arm 23, and the pair of lower drive arms 29 are symmetrically formed with respect to the lower detection arm 27, the bilaterally-symmetric drive vibrations are likely generated thereby the drive circuit driving the upper drive arms 25 and the lower drive arms 29 are simplified, and the undesired vibrations of the upper detection arm 23 and the lower detection arm 27 can be suppressed.

When the upper detection arm 23 and the lower detection arm 27 are symmetrically disposed extending with respect to the straight line orthogonal to the extending direction of the upper detection arm 23 passing through the fixed central section 20A, and the pair of upper drive arms 25 and the pair of lower drive arms 29 are symmetrically formed extending with respect to the straight line orthogonal to the extending direction of the upper detection arm 23 passing through the fixed central section 20A, the vibrations by the acceleration in the lateral direction and the vibrations by the angular velocity can be easily distinguished, thereby the detection accuracy of the angular velocity is improved.

In the first embodiment, the weighted sections 26 are formed coupled to the tip ends on the side of the upper drive arms 25 different from the upper beam section 24, and the weighted sections 26 are formed coupled to the tip ends on the side of the lower drive arms 29 different from the lower beam section 28. Thus, when the upper drive arms 25 and the lower drive arms 29 are vibrated, the upper drive arms 25 and the lower drive arms 29 can be vibrated with relatively large amplitude. Therefore the detection accuracy of the angular velocity is improved.

To facilitate the elimination of the influence of the acceleration in the lateral direction, it is preferred to equalize the amplitude and the resonance frequency of the upper detection arm 23 and the lower detection arm 27 disposed in the upper-lower direction. This enables the vibrations excited by the acceleration in the lateral direction to be efficiently eliminated so that the suppression of the noise can be facilitated. To facilitate the elimination of the influence of the acceleration in the lateral direction, the amplitude and the resonance frequency of the pair of upper drive arms 25 and the pair of lower drive arms 29 disposed in the upper-lower direction and in the right-left direction are preferably equalized to each other.

Specifically, the resonance frequency and the amplitude can be adjusted by changing the width and the length of the amplitude part and the mass and the shape of the weighted sections 26. By these adjustments, the amplitude and the resonance frequency of the upper detection arm 23 and the lower detection arm 27, or the amplitude and resonance frequency of the pair of upper drive arms 25 and the pair of lower drive arms 29 are desirably equalized to each other. Most preferably, the upper detection arm 23 and the lower detection arm 27, or the pair of upper drive arms 25 and the pair of lower drive arms 29 have a symmetrical formation with respect to the fixed section 20. By the symmetrical formation, the amplitudes are equalized to each other and the noise is likely suppressed. When the resonance frequency and the amplitude between the pair of upper drive arms 25 and the pair of lower drive arms 29, and the upper detection arm 23 and the lower detection arm 27 are different to each other, the noise due to the drive vibrations is suppressed by this difference, thereby the difference is rather preferable to avoid the interference with each other. Thus it is unnecessary to eliminate the difference.

In the first embodiment, the upper drive arms 25 and the upper detection arm 23 are coupled without the fixed section 20 in between, and the lower drive arms 29 and the lower detection arm 27 are coupled without the fixed section 20 in between. Thus, even through the configuration of the fixed section 20 is not complicated, the distortion of the upper beam section 24 generated by the Coriolis force acting on the upper drive arms 25 can be efficiently transmitted to the upper detection arm 23, and the distortion of the lower beam section 28 generated by the Coriolis force acting on the lower drive arms 29 can be efficiently transmitted to the lower detection arm 27. Therefore, the fixed section 20 can be easily fixed on the sensor support section 41.

Figure 8:
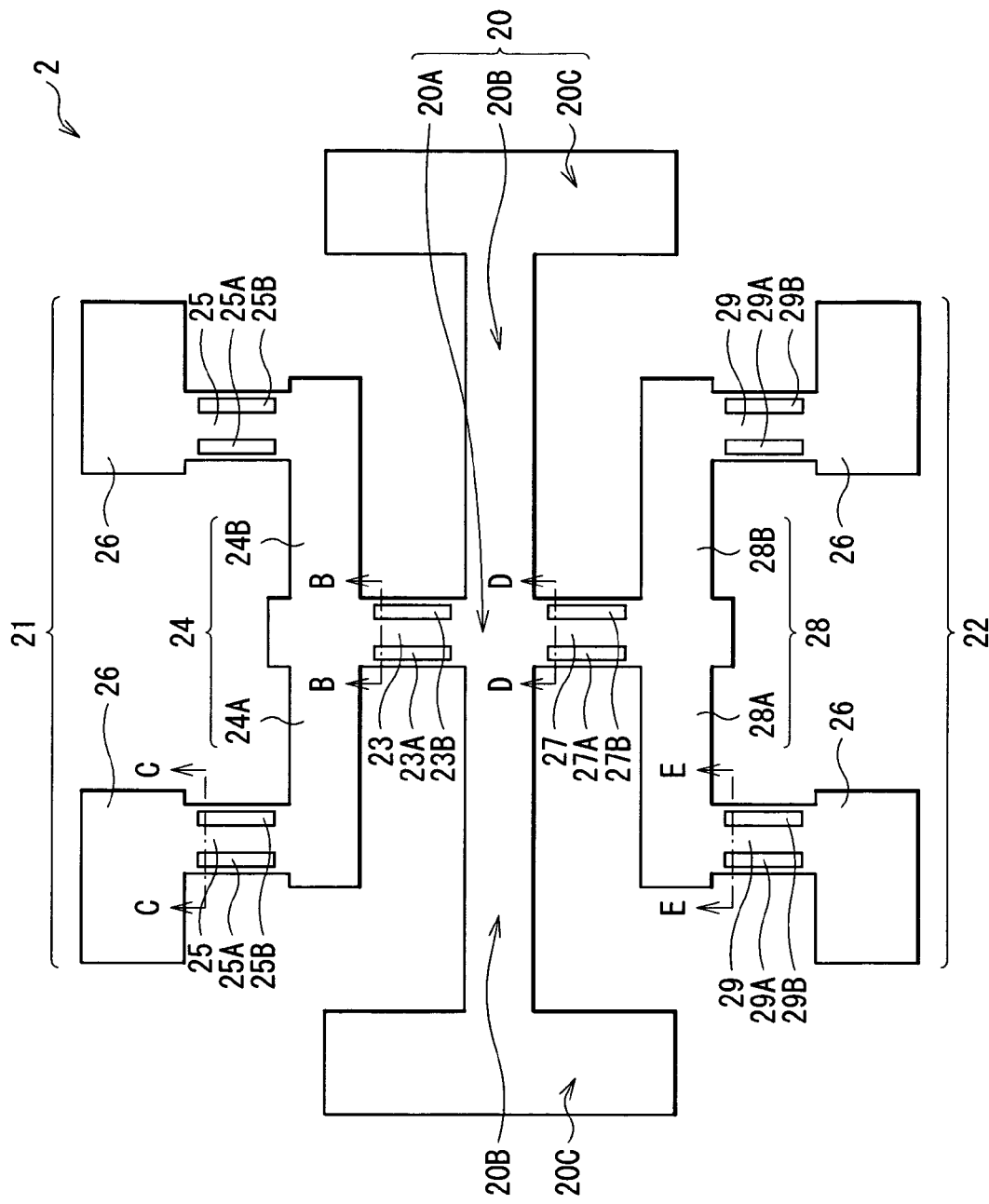
FIG. 8 is a top configuration view of a modification of the angular velocity sensor device of FIG. 1.

As shown in FIG. 8, the upper beam section 24 is coupled slightly approaching to the fixed section 20 side from the tip end of the upper detection arm 23 so that the tip end of the upper detection arm 23 may be projected from the side face of the upper beam section 24. Similarly, the lower beam section 28 is coupled slightly approaching to the fixed section 20 side from the tip end of the lower detection arm 27 so that the tip end of the lower detection arm 27 may be projected from the side face of the lower beam section 28. Here, the pair of upper beam sections 24A and 24B composing the upper beam section 24 correspond to an example of a pair of upper beam sections in the present invention, and the pair of lower beam sections 28A and 28B composing the lower beam section 28 correspond to an example of a pair of lower beam sections in the present invention. The same is true for the modifications in the following.

As shown in FIG. 3, the upper drive arms 25 are coupled slightly approaching to the upper detection arm 23 side from the tip end of the upper beam section 24 so that the tip ends of the upper beam section 24 may be projected from the side faces of the upper drive arms 25, and the lower drive arms 29 are coupled slightly approaching to the lower detection arm 27 side from the tip ends of the lower beam section 28 so that the tip ends of the lower beam section 28 may be projected from the side faces of the lower drive arm 29. Although it is not shown in the figure, the upper drive arms 25 are coupled to the tip ends of the upper beam section 24 so that the tip ends of the upper beam section 24 may not be projected from the side faces of the upper drive arms 25, and the lower drive arms 29 are coupled to the tip ends of the lower beam section 28 so that the tip ends of the lower beam section 28 are not projected from the side faces of the lower drive arms 29. The same is true for the modification in the following.

In the configurations of FIGS. 3 and 8, the piezoelectric elements 23A and 23B, and the piezoelectric elements 27A and 27B for detection may be respectively disposed in the position where the upper detection arm 23 and the upper beam section 24 intersect and in the position where the lower detection arm 27 and the lower beam section 28 intersect, as long as the piezoelectric elements 23A and 23B, and the piezoelectric elements 27A and 27B are respectively disposed on the upper detection arm 23 and the lower detection arm 27. The same is true for the modifications in the following.

(Modification 1-1)

Figure 9:
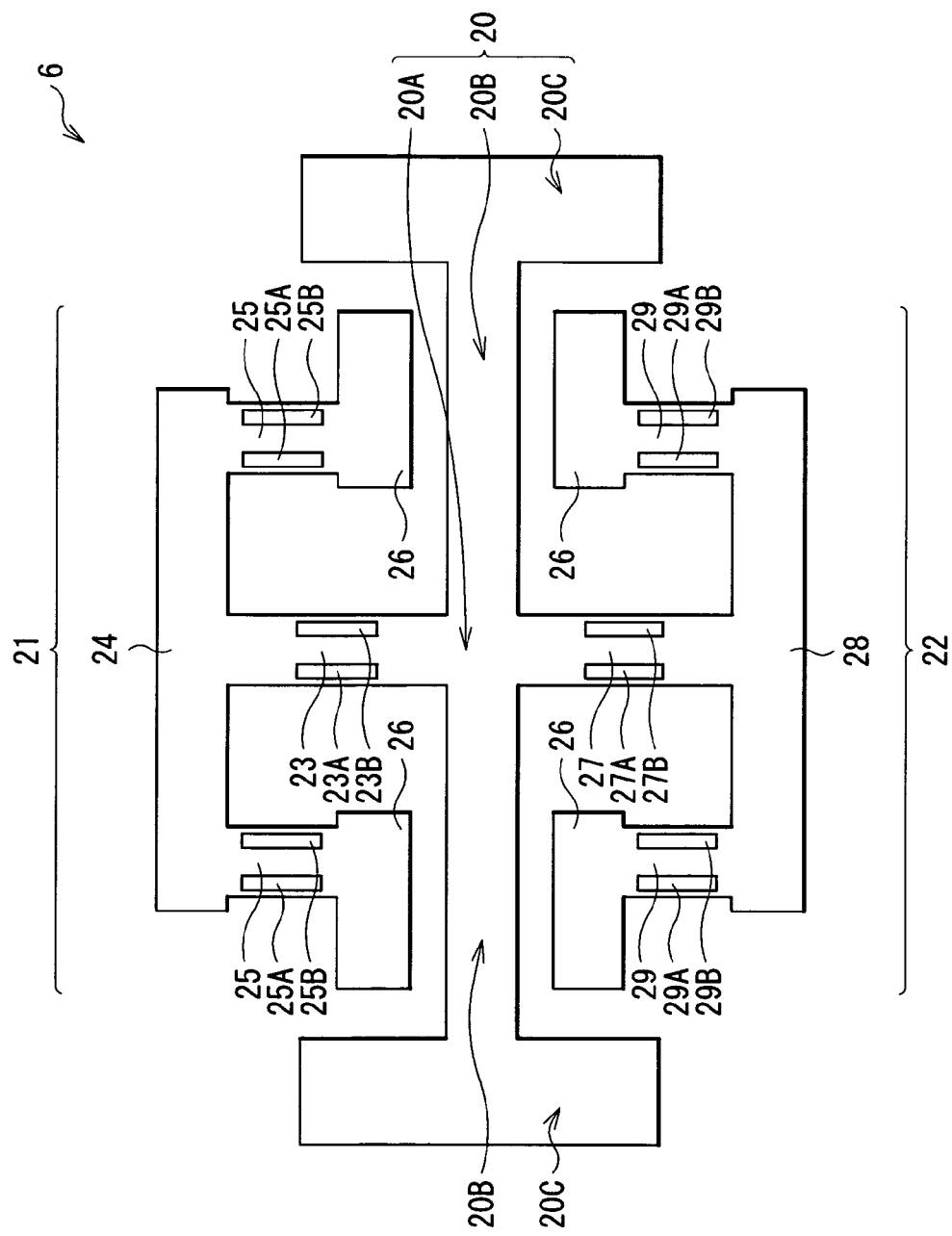
FIG. 9 is a top configuration view of the angular velocity sensor according to a modification 1-1.

In the first embodiment, the upper drive arms 25 and the weighted sections 26 are coupled to the side different from the fixed section 20 with respect to the upper beam section 24, and the lower drive arms 29 and the weighted sections 26 are coupled to the side different from the fixed section 20 with respect to the lower beam section 28. However, as shown in the angular velocity sensor 6 of FIG. 9, the upper drive arms 25 and the weighted sections 26 may be coupled to the side of the fixed section 20 with respect to the upper beam section 24, and the lower drive arms 29 and the weighted sections 26 may be coupled to the side of the fixed section 20 with respect to the lower beam section 28. Also in this case, similarly to the first embodiment, the vibration arm of the upper drive arms 25 and the upper detection arm 23, and the vibration arm of the lower drive arms 29 and the lower detection arm 27 are coupled respectively to the both sides of the fixed section 20, thereby the influence of the acceleration in the lateral direction can be almost eliminated. Similarly to the first embodiment, the upper drive arms 25 and the upper detection arm 23 are coupled without the fixed section 20 in between, and the lower drive arms 29 and the lower detection arm 27 are coupled without the fixed section 20 in between, thereby the fixed section 20 can be easily fixed on the sensor support section 41.

Further, in this case, the angular velocity sensor 6 and the angular velocity sensor device 1 can be miniaturized in comparison with the case where the upper drive arms 25 and the weighted sections 26 are coupled to the side different from the fixed section 20 with respect to the upper beam section 24, and the lower drive arms 29 and the weighted sections 26 are coupled to the side different from the fixed section 20 with respect to the lower beam section 28 (in case of the first embodiment).

Figure 10:
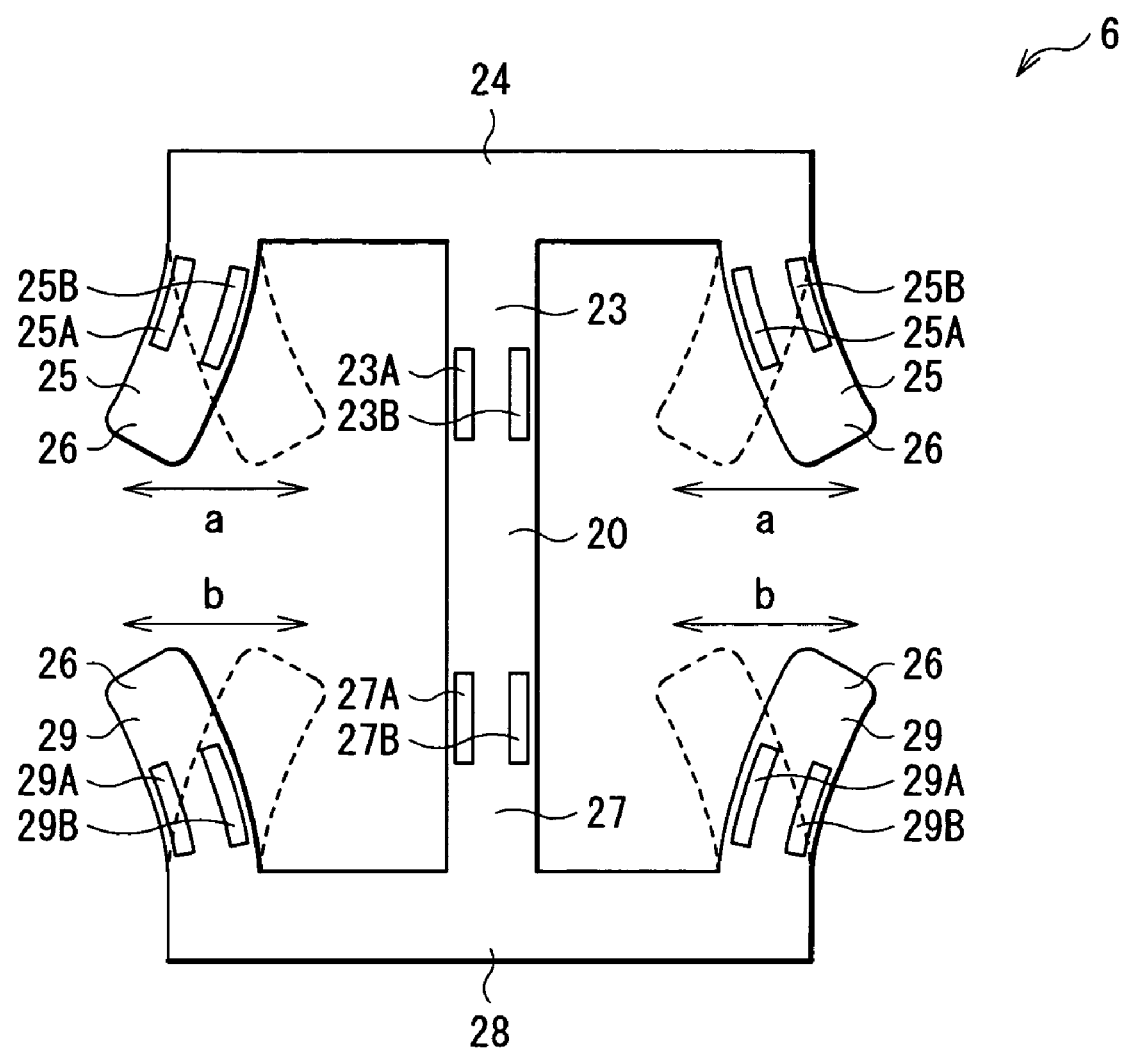
FIG. 10 is a simplified top configuration view for explaining the operation when the rotation is not applied to the angular velocity sensor of FIG. 9.

Here, in case the object equipped with the angular velocity sensor device1 performs no rotation, when the upper drive arms 25 are driven by using the piezoelectric elements 25B and the piezoelectric elements 25A, the upper drive arms 25 are vibrated in a direction "a" parallel to the extending direction of the upper beam section 24, and the lower drive arms 29 are vibrated in a direction "b" parallel to the extending direction of the lower beam section 28, as in FIG. 10.

Figure 11:
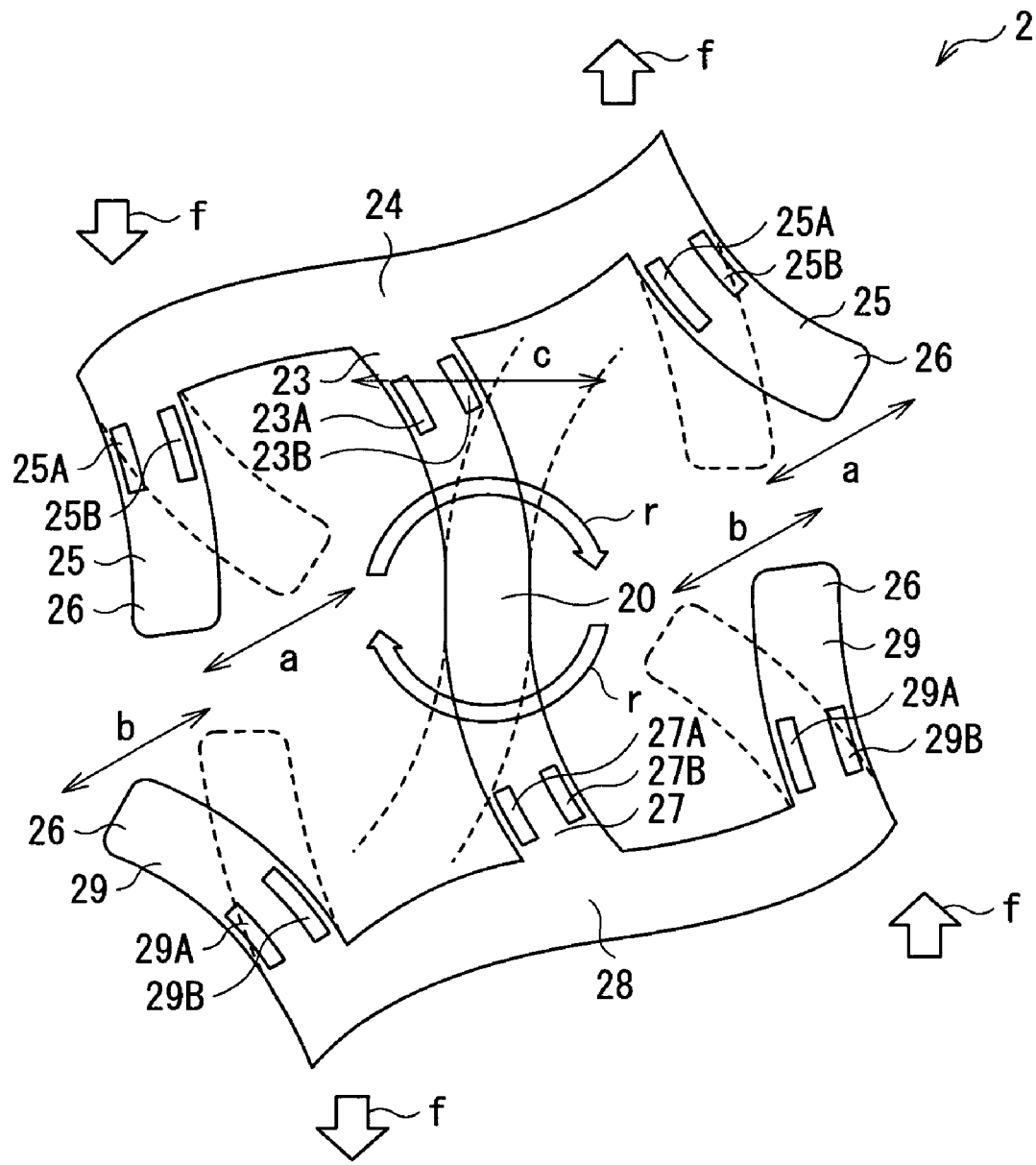
FIG. 11 is a simplified top configuration view for explaining the operation when the rotation is applied to the angular velocity sensor of FIG. 9.

In this case, as in FIG. 11, when the object equipped with the angular velocity sensor device 1 performs a rotation "r" with respect to the direction orthogonal to the top surface of the sensor support section 41, a Coriolis force f acts on the right upper drive arm 25 and the left upper drive arm 25 in the opposite directions, respectively, and the Coriolis force f acts on the right lower drive arm 29 and the left lower drive arm 29 in the opposite directions, respectively. Thus, the pair of upper drive arms 25 and the upper beam section 24, and the pair of lower drive arms 29 and the lower beam section 28 are asymmetrically vibrated, and the upper detection arm 23 and the lower detection arm 27 are vibrated in a right-left direction "c". Therefore, the detection signal according to the vibrations of the upper detection arm 23 at this time can be extracted from the piezoelectric element 23B and the piezoelectric element 23A, and the detection signal according to the vibrations of the lower detection arm 27 can be extracted from the piezoelectric element 27B and the piezoelectric element 27A, thereby each velocity can be detected.

(Modification 1-2)

Figure 12:
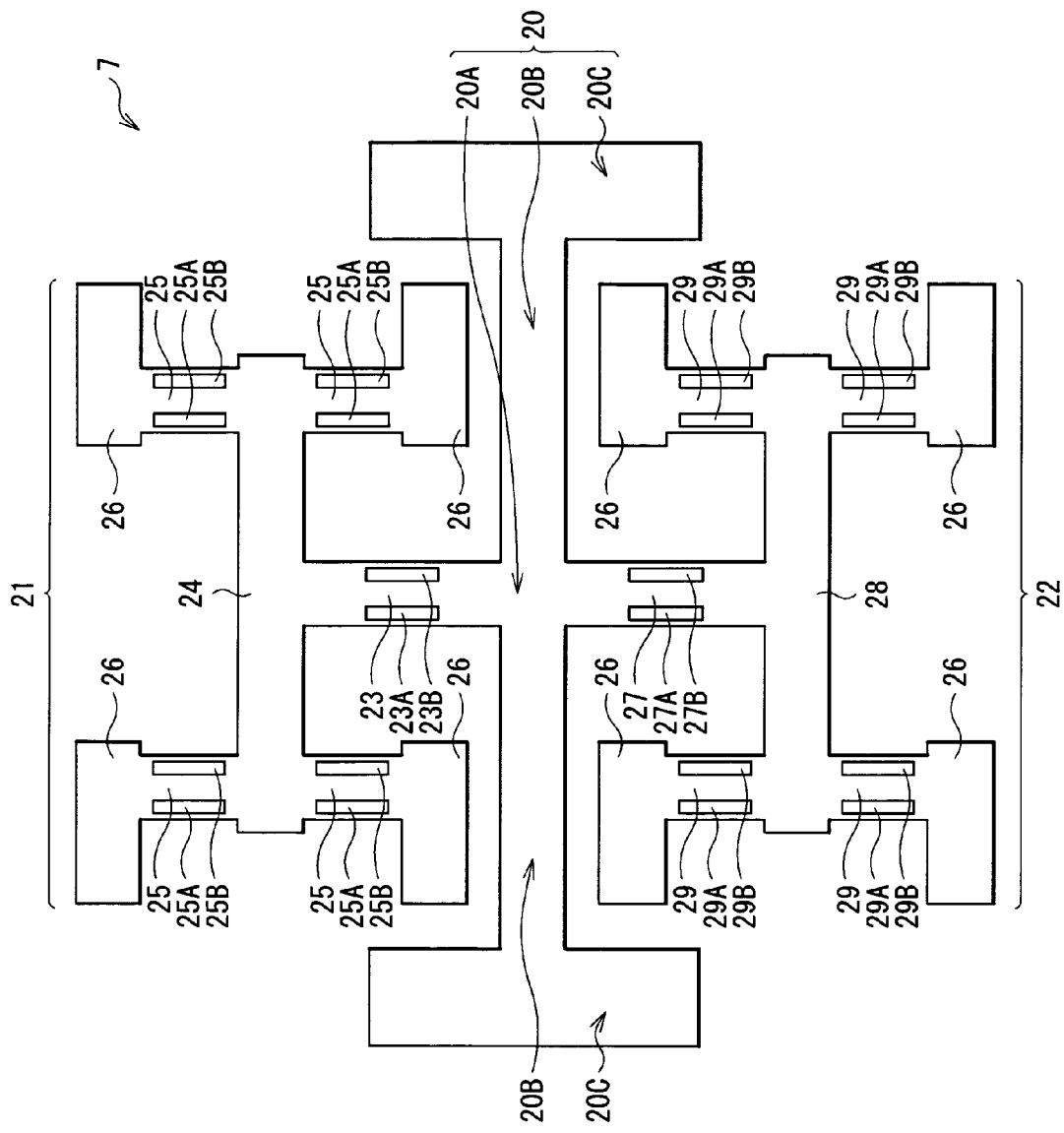
FIG. 12 is a top configuration view of the angular velocity sensor according to a modification 1-2.

In the first embodiment, the upper drive arms 25 and the weighted sections 26 are coupled only to the side different from the fixed section 20 with respect to the upper beam section 24, and lower drive arms 29 and the weighted sections 26 are coupled only to the side different from the fixed section 20 with respect to the lower beam section 28. However, as shown in the angular velocity sensor 7 of FIG. 12 according to the modification 1-2, the upper drive arms 25 and the weighted sections 26 may be coupled to the side different from the fixed section 20 with respect to the upper beam section 24 and to the side of the fixed section 20 with respect to the upper beam section 24 as well, and the lower drive arms 29 and the weighted sections 26 may be coupled to the side different from the fixed section 20 with respect to the lower beam section 28 and to the side of the fixed section 20 with respect to the lower beam section 28 as well. Also in this case, similarly to the first embodiment, a vibration arm of the upper drive arms 25 and the upper detection arm 23, and the vibration arm of the lower drive arms 29 and the lower detection arm 27 are coupled respectively to the both sides of the fixed section 20, thereby the influence of the acceleration in the lateral direction can be almost eliminated. Similarly to the first embodiment, the upper drive arms 25 and the upper detection arm 23 are coupled without the fixed section 20 in between, and the lower drive arms 29 and the lower detection arm 27 are coupled without the fixed section 20 in between, thereby the fixed section 20 can be easily fixed on the sensor support section 41.

Further, in case no rotation is applied, when the upper drive arms 25 are vibrated, with the vibrations of the upper drive arms 25, not only the upper detection arm 23 but also the upper beam section 24 can be controlled not to be vibrated correspondingly. In such a case, the detection accuracy of the angular velocity is improved.

Figure 13:
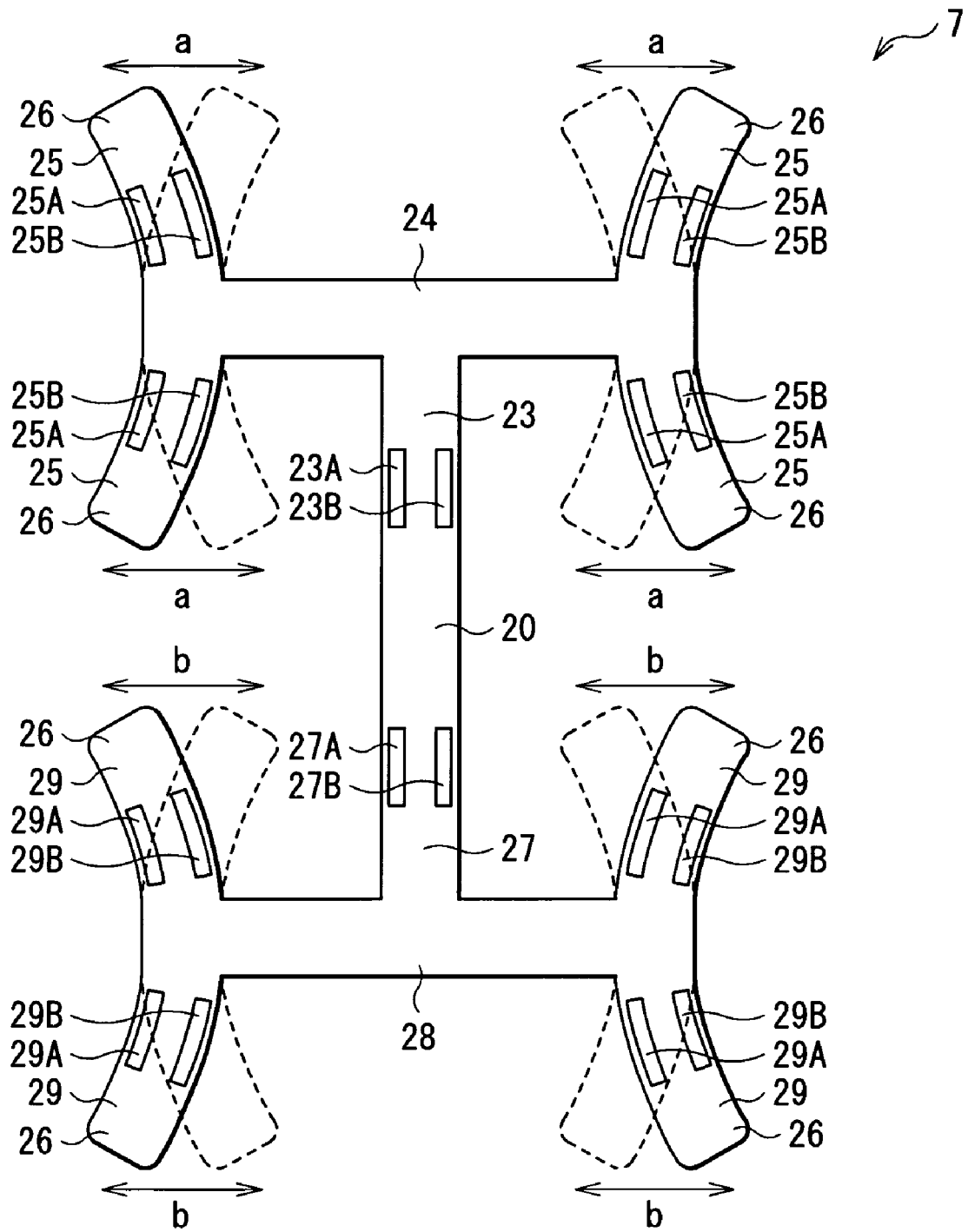
FIG. 13 is a simplified top configuration view for explaining the operation when the rotation is not applied to the angular velocity sensor of FIG. 12.

Here, in case the object equipped with the angular velocity sensor device 1 performs no rotation, when the upper drive arms 25 are driven by using the piezoelectric elements 25B and the piezoelectric elements 25A, the four of upper drive arms 25 are vibrated in a direction "a" parallel to the extending direction of the upper beam section 24, and the four of lower drive arms 29 are vibrated in a direction "b" parallel to the extending direction of the lower beam section 28, as in FIG. 13.

Figure 14:
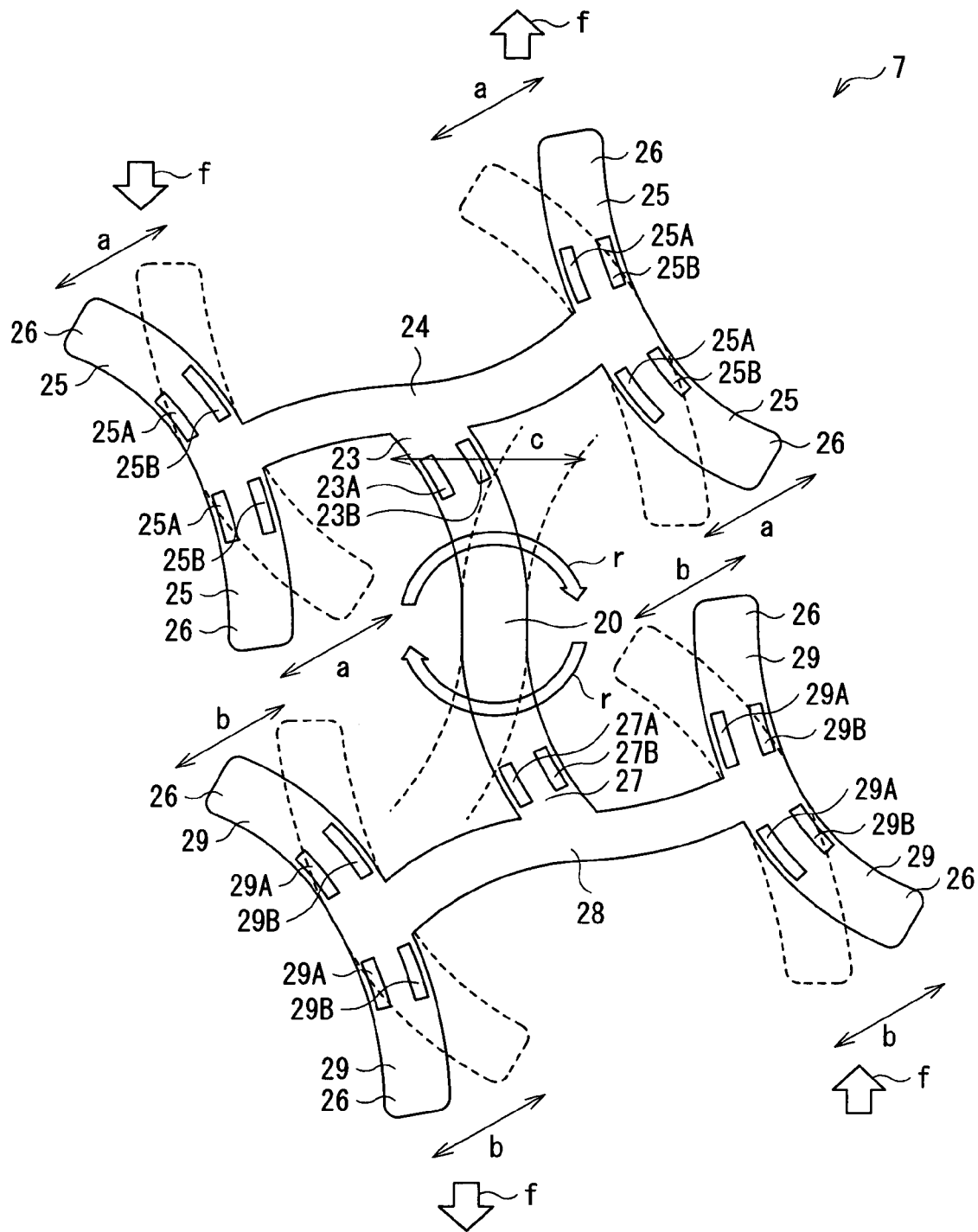
FIG. 14 is a simplified top configuration view for explaining the operation when the rotation is applied to the angular velocity sensor of FIG. 12.

In this case, as in FIG. 14, when the object equipped with the angular velocity sensor device 1 performs a rotation "r"

with respect to the direction orthogonal to the top surface of the sensor support section 41, a Coriolis force f acts on the right upper drive arms 25 and the left upper drive arms 25 in the opposite directions, respectively, and the Coriolis force f acts on the right lower drive arms 29 and the left lower drive arms 29 in the opposite directions, respectively. Thus, the pair of upper drive arms 25 and the upper beam section 24, and the pair of lower drive arms 29 and the lower beam section 28 are asymmetrically vibrated, and the upper detection arm 23 and the lower detection arm 27 are vibrated in a right-left direction "c". Therefore, the detection signal according to the vibrations of the upper detection arm 23 can be extracted from the piezoelectric element 23B and the piezoelectric element 23A, and the detection signal according to the vibrations of the lower detection arm 27 can be extracted from the piezoelectric element 27B and the piezoelectric element 27A, thereby each velocity can be detected.

(Modification 1-3)

An upper beam section 24 and a lower beam section 28 of the first embodiment may be composed of rigid material. In this case, when upper drive arms 25 are vibrated using piezoelectric elements 25B and piezoelectric elements 25A, with the vibrations of the upper drive arms 25, not only an upper detection arm 23 but also an upper beam section 24 are controlled not to be vibrated. When lower drive arms 29 are vibrated using piezoelectric elements 29B and piezoelectric elements 29A, with the vibrations of the lower drive arms 29, not only a lower detection arm 27 but also a lower beam section 28 are controlled not to be vibrated. Therefore, the detection accuracy of the angular velocity is improved.

Figure 15:
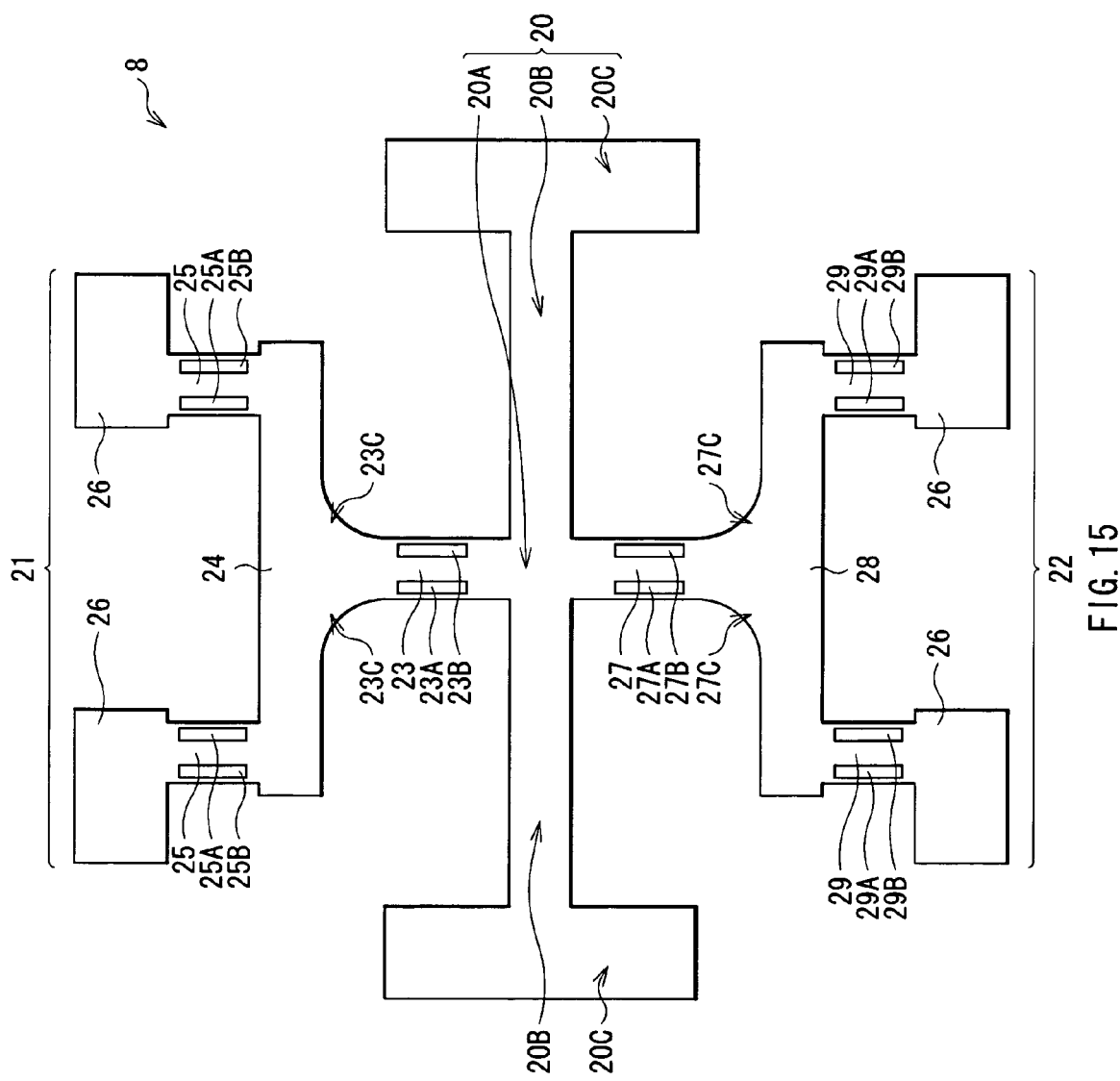
FIG. 15 is a top configuration view of the angular velocity sensor according to a modification 1-3.

In this case, as shown in the angular velocity sensor 8 of FIG. 15, flare sections 23C may be provided in the connection portion of the upper detection arm 23 and the upper beam section 24, and flare sections 27C may be provided in the connection portion of the lower detection arm 27 and the lower beam section 28. Thus, the corner sections may be reinforced.

Figure 16:
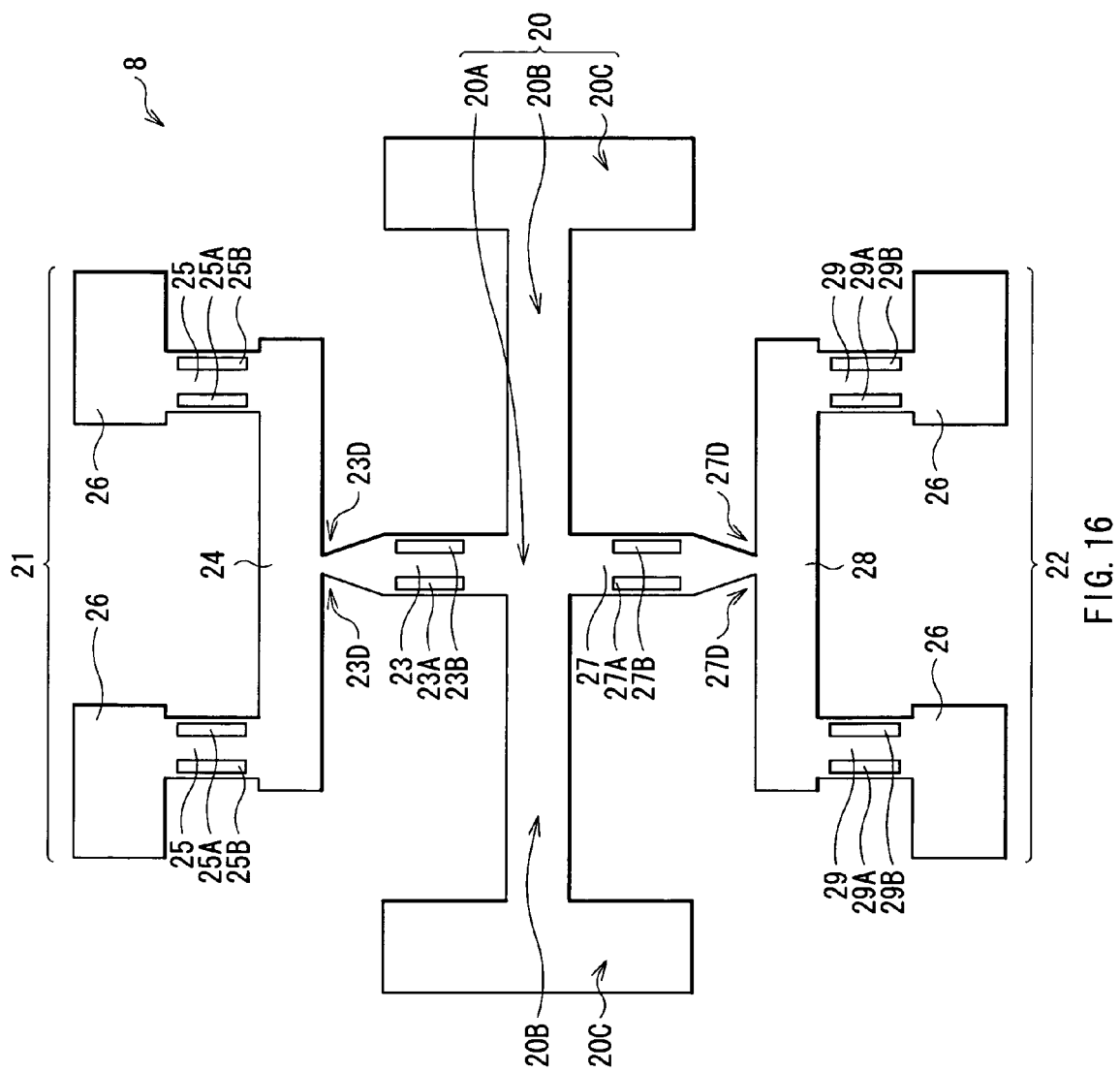
FIG. 16 is a top configuration view of the angular velocity sensor according to a modification of the angular velocity sensor of FIG. 15.
Figure 17:
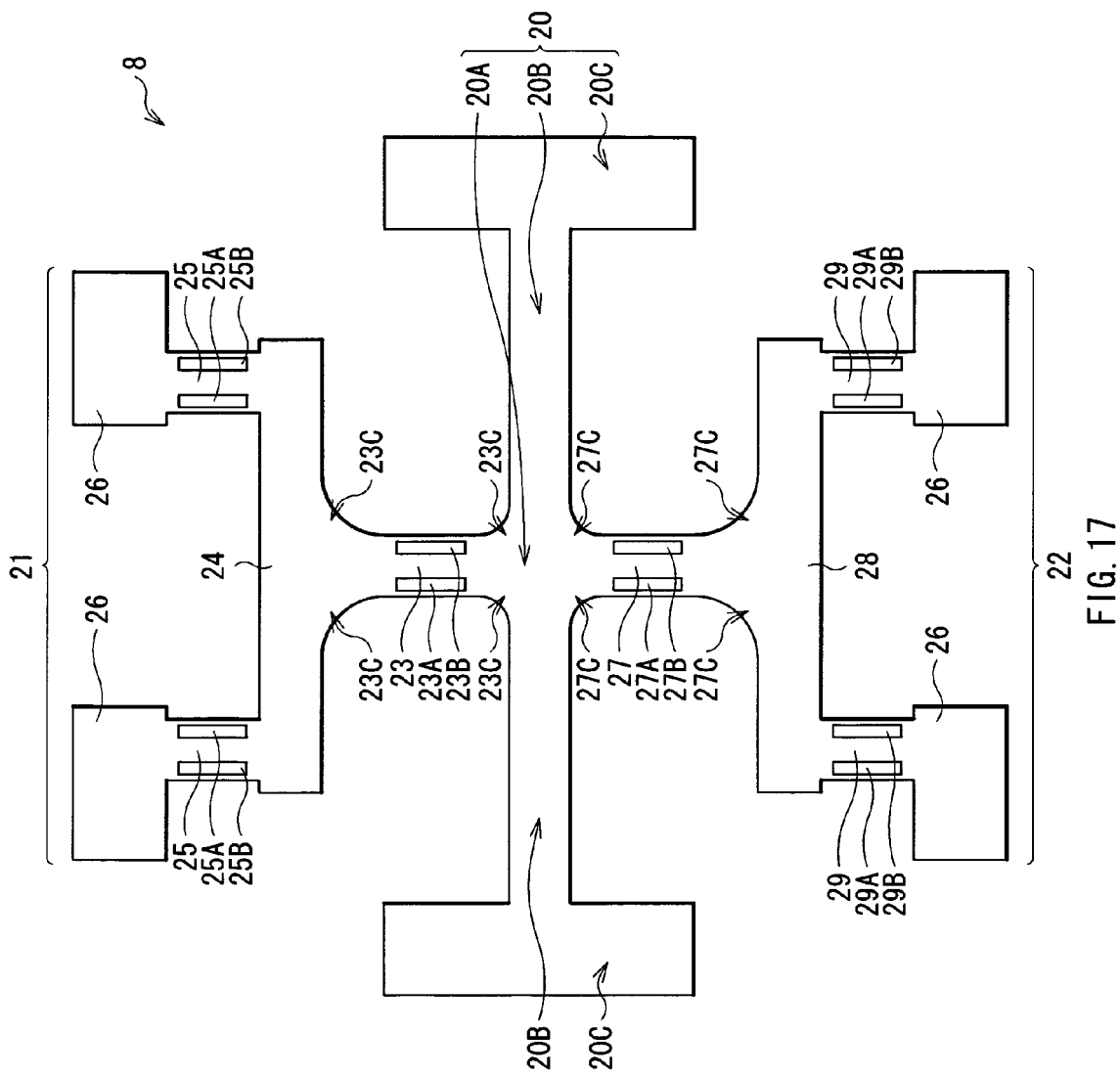
FIG. 17 is a top configuration view of the angular velocity sensor according to another modification of the angular velocity sensor of FIG. 15.
Figure 18:
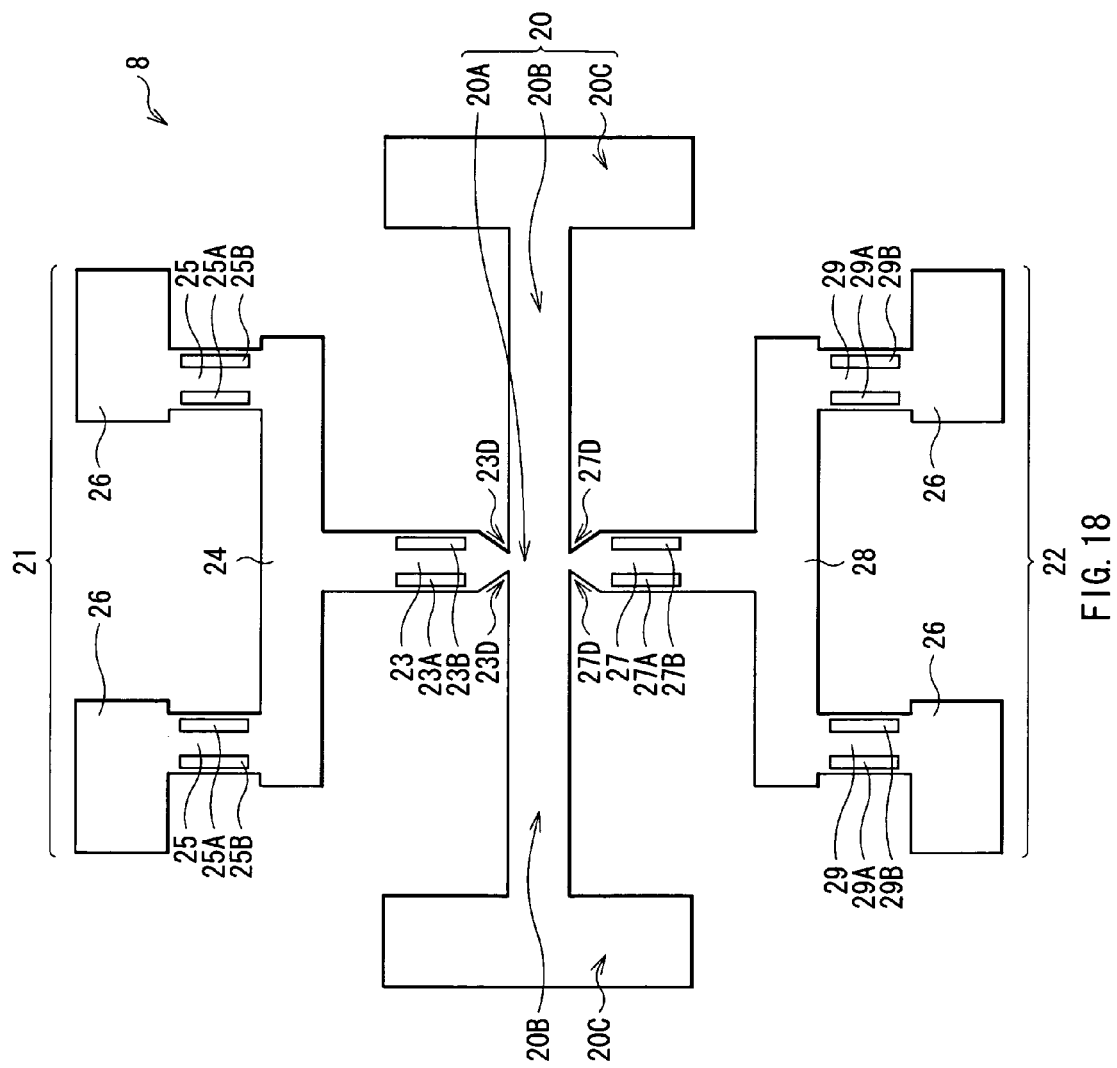
FIG. 18 is a top configuration view of the angular velocity sensor according to still another modification of the angular velocity sensor of FIG. 15.

As shown in FIG. 16, notches 23D may be provided in the position where the piezoelectric element 23B and the piezoelectric element 23A of the upper detection arm 23 are provided, or in the vicinity thereof, and notches 27D may be provided in the position where the piezoelectric element 27B and the piezoelectric element 27A of the lower detection arm 27 are provided, or in the vicinity thereof. As shown in FIG. 17, flare sections 23D may be provided on the both ends of the upper detection arm 23, and flare sections 27D may be provided on the both ends of the lower detection arm 27, thereby the corner portions may be reinforced. Also as shown in FIG. 18, the notches 23D may be provided in the connection portion of the upper detection arm 23 and the fixed central section 20A, and the notches 27D may be provided in the connection portion of the lower detection arm 27 and the fixed central section 20A.

The upper beam section 24 can be formed larger than one of the upper drive arms 25 and the upper detection arm 23 in width, and the lower beam section 28 can be formed larger than one of the lower drive arms 29 and the lower detection arm 27 in width. The upper beam section 24 can be formed larger than one of the upper drive arms 25 and the upper detection arm 23 in thickness, and the lower beam section 28 can be formed larger than one of the lower drive arms 29 and the lower detection arm 27 in thickness. In such a case, the rigidity of the upper beam section 24 and the lower beam section 28 is enhanced so that the drive vibrations can be generated efficiently on the upper drive arms 25 and the lower drive arms 29. Further, when the Coriolis force is generated, the detection vibrations can be generated efficiently on the upper detection arm 23 and the lower detection arm 27. As a result, the detection accuracy of the angular velocity is improved.

(Modification 1-4)

Figure 19:
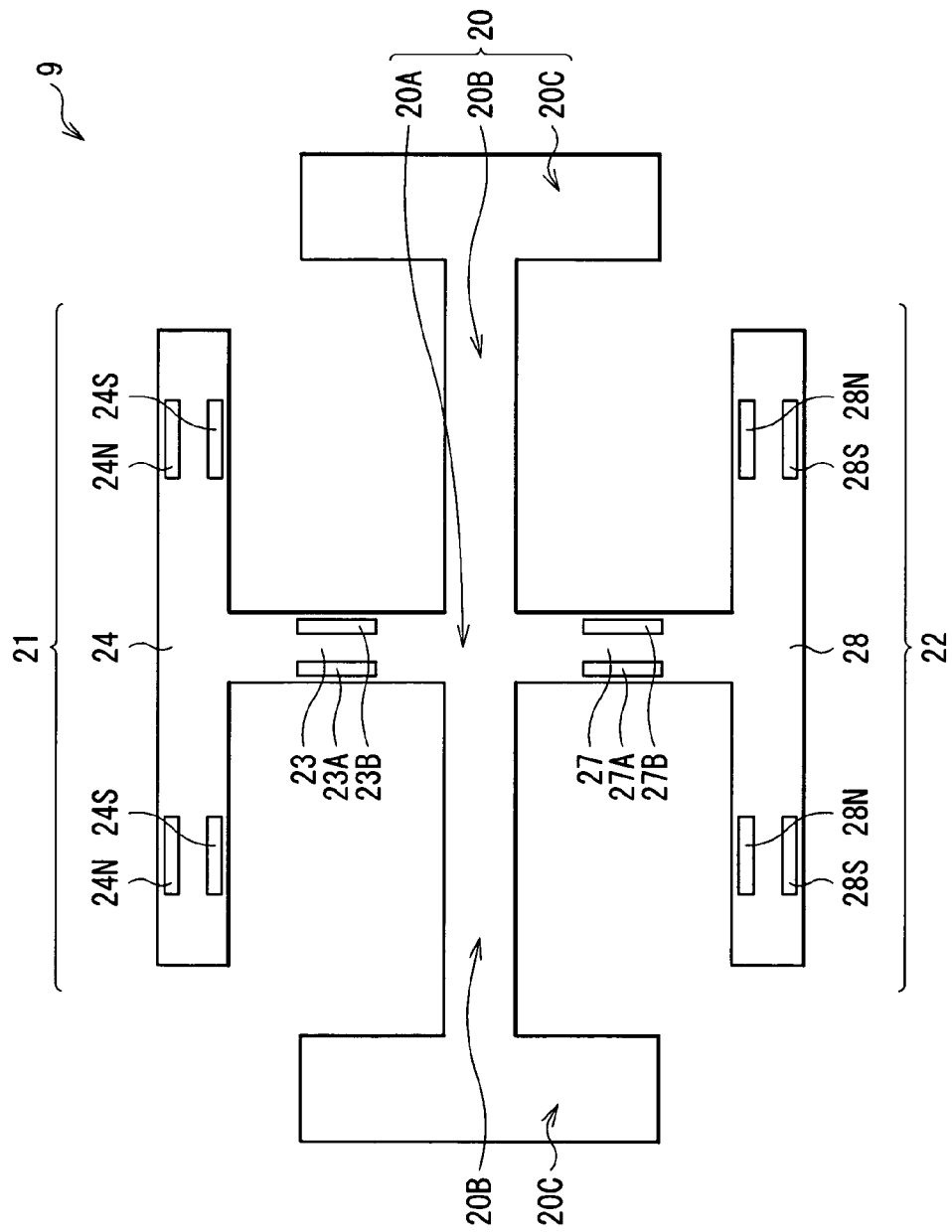
FIG. 19 is a top configuration view of the angular velocity sensor according to a modification 1-4.

In the first embodiment, upper detection arms 25 and weighted sections 26 are coupled to one side of an upper beam section 24 different from a fixed section 20, and lower drive arms 29 and weighted sections 26 are coupled to the side different from the fixed section 20 with respect to a lower beam section 28. However, as shown in an angular velocity sensor 9 of FIG. 19, the upper drive arms 25, the weighted sections 26 and the lower drive arms 29 may be eliminated, and a pair of piezoelectric elements 24N and a pair of piezoelectric elements 24S may be provided on both end sides of the upper beam section 24 and a pair of piezoelectric elements 28N and a pair of piezoelectric elements 28S may be provided on the both end sides of the lower beam section 28. In this case, similarly to the first embodiment, the upper detection arm 23, and the upper beam section 24 operating as a vibration arm are coupled to one side of the fixed section 20, and the lower detection arm 27, and the lower beam section 28 operating as the vibration arm are coupled to the other side of the fixed section 20, thereby the influence of the acceleration in the lateral direction is almost eliminated. Similarly to the first embodiment, the upper detection arm 23, and the upper beam section 24 operating as the vibration arm are coupled without the fixed section 20 in between, and the lower detection arm 27, and the lower beam section 28 operating as the vibration arm are coupled without the fixed section 20 in between, thereby the fixed section 20 can be easily fixed on the sensor support section 41. In addition, the same as the above weighted sections 26 may be coupled to both end sides of the upper detection arm 23 and to both end sides of the lower detection arm 27, respectively.

Figure 20:
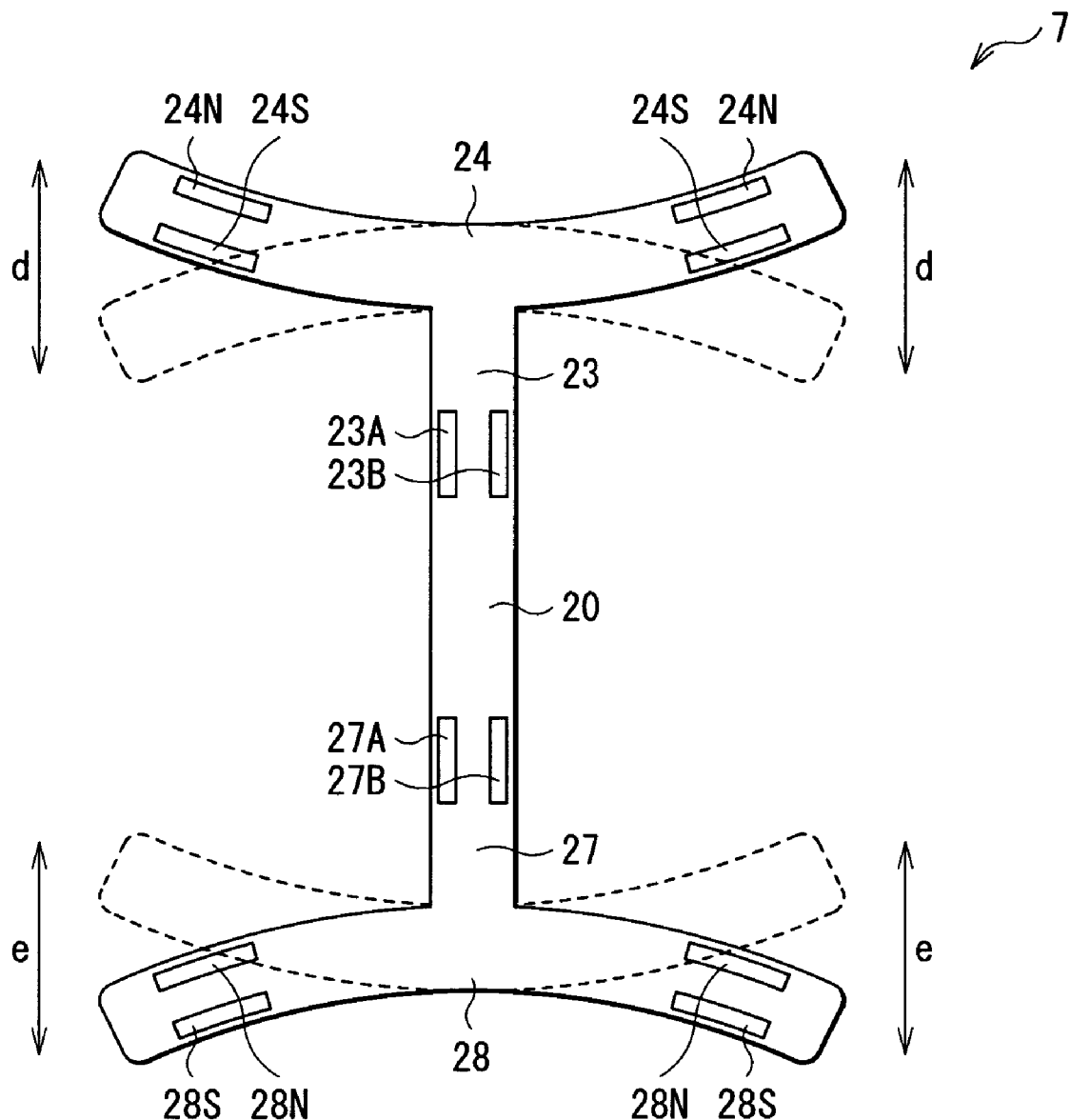
FIG. 20 is a simplified top configuration view for explaining the operation when the rotation is not applied to the angular velocity sensor of FIG. 19.

In this case, when an object equipped with the angular velocity sensor device 1 performs no rotation, when the upper beam section 24 is driven using the piezoelectric elements 24N and the piezoelectric elements 24S and the lower beam section 28 is driven using the piezoelectric elements 28N and the piezoelectric elements 28S. The upper beam section 24 is vibrated in a direction d parallel to the extending direction of the upper detection arm 23 and the lower beam section 28 is vibrated in a direction "e" parallel to the extending direction of the lower detection arm 27, as shown in FIG. 20.

Figure 21:
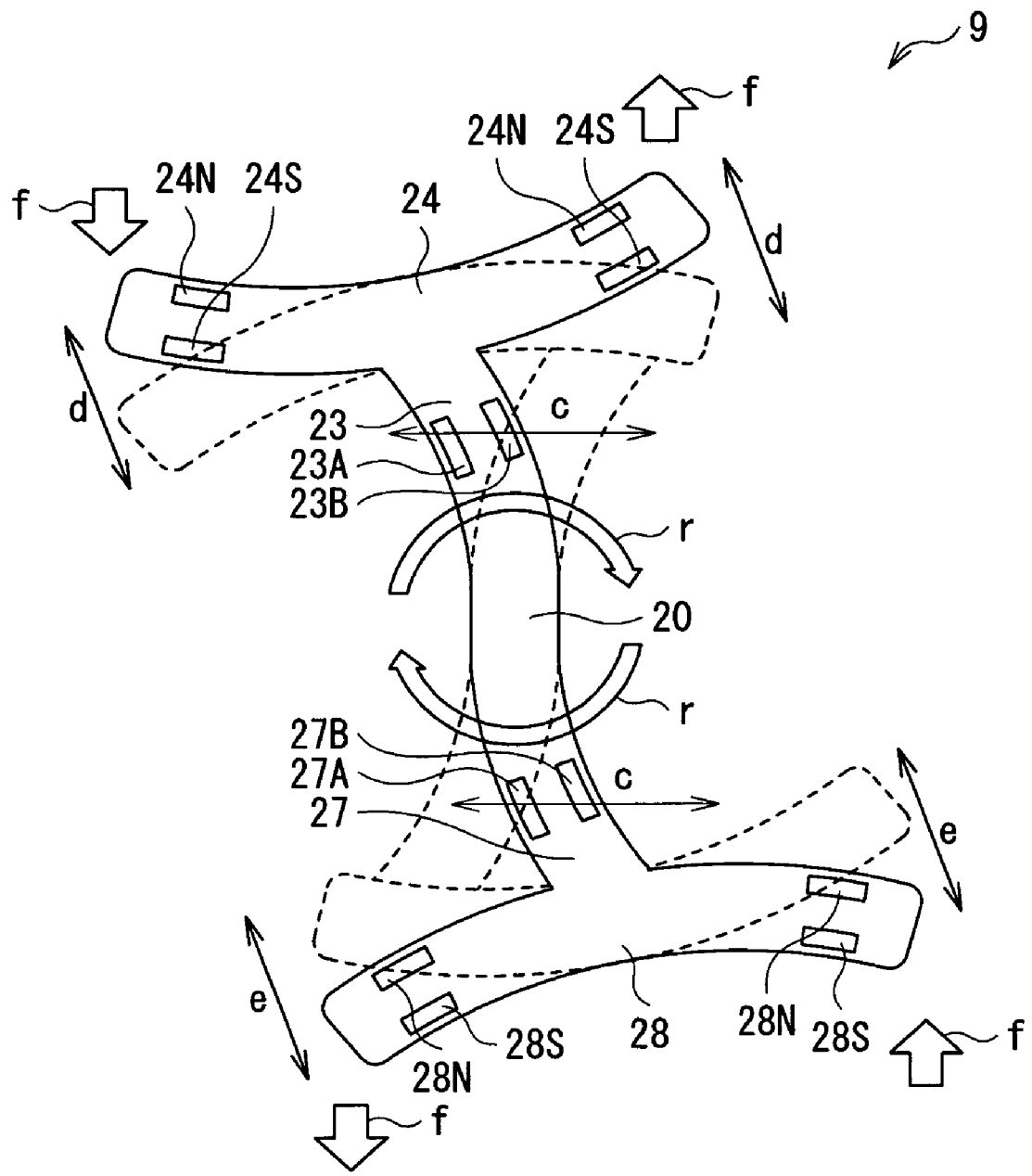
FIG. 21 is a simplified top configuration view for explaining the operation when the rotation is applied to the angular velocity sensor of FIG. 19.

In this case, as in FIG. 21, when the object equipped with the angular velocity sensor device 1 performs a rotation "r" with respect to the direction orthogonal to the top surface of the sensor support section 41, a Coriolis force f acts on both ends of the upper beam section 24 in the opposite directions, respectively, and the Coriolis force f acts on both ends of the lower beam section 28 in the opposite directions, respectively. Thus, the upper beam section 24 and the lower beam section 28 are asymmetrically vibrated, and the upper detection arm 23 and the lower detection arm 27 are vibrated in a right-left direction "c". Therefore, the detection signal according to the vibrations of the upper detection arm 23 can be extracted from the piezoelectric element 23B and the piezoelectric element 23A, and the detection signal according to the vibrations of the lower detection arm 27 can be extracted from the piezoelectric element 27B and the piezoelectric element 27A, thereby each velocity can be detected.

Second Embodiment

Next, an angular velocity sensor device according to a second embodiment of the present invention will be described. The overall configuration of the angular velocity sensor device of the second embodiment is identical to that of the abovementioned first embodiment (FIGS. 1 and 2), thereby the description will be appropriately omitted. However, in the second embodiment, an angular velocity sensor 2 in FIG. 1 will be referred to as an angular velocity sensor 12, 16 or 17.

Figure 22:
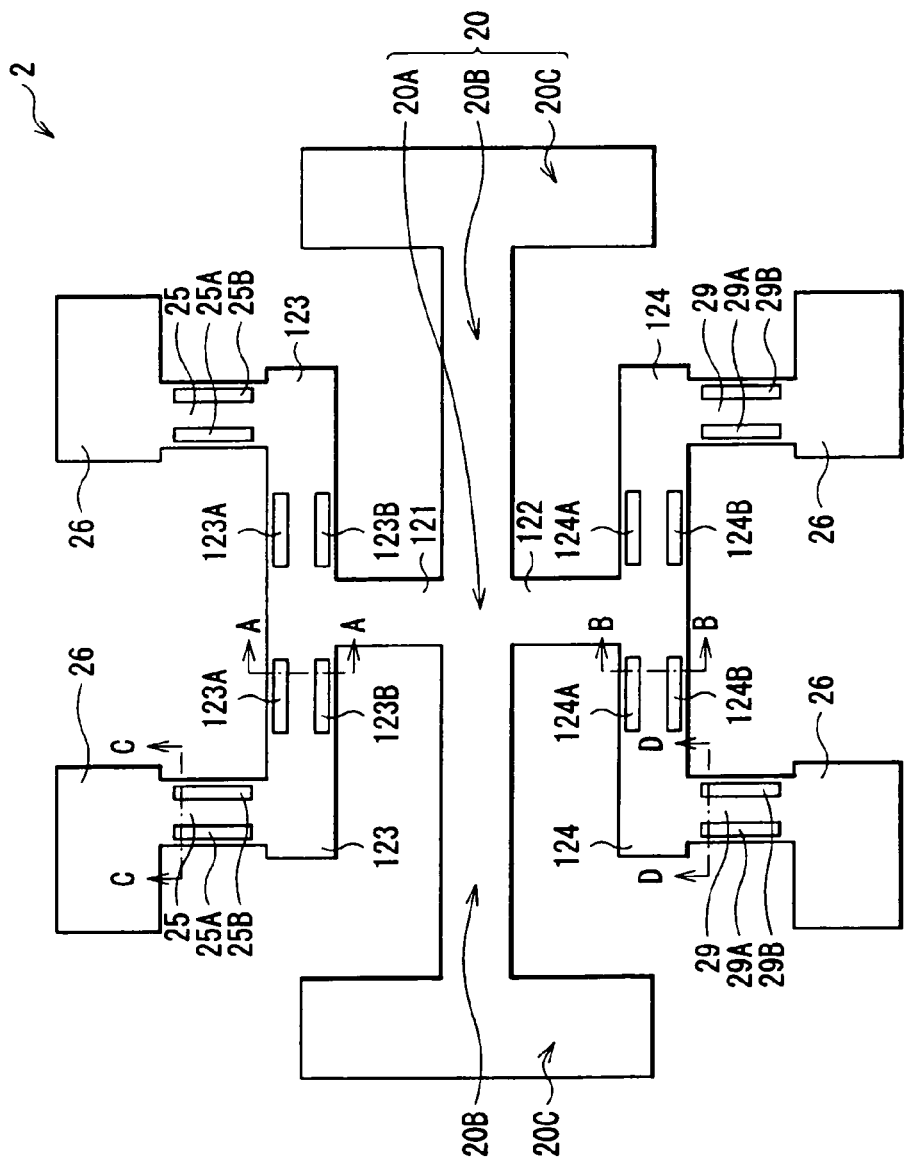
FIG. 22 is a top configuration view of the angular velocity sensor of FIG. 1.
Figure 23:
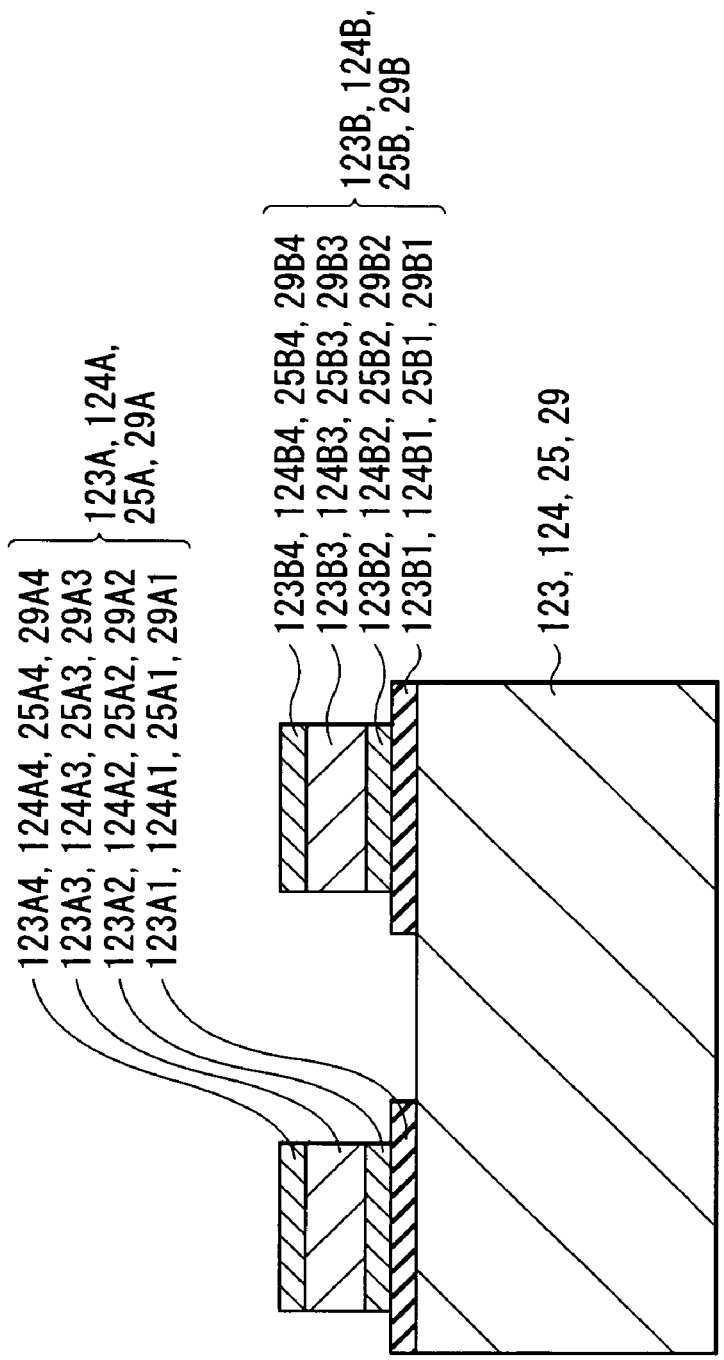
FIG. 23 is a cross-sectional configuration view of the angular velocity sensor of FIG. 22.

FIG. 22 shows a top configuration view of the angular velocity sensor 12 according to the second embodiment. FIG. 23 is a cross-sectional view where the cross-sectional configuration examples as viewed from the direction of the arrows A-A, B-B, C-C and D-D of FIG. 22 are brought together. The angular velocity sensor 2 has a fixed section 20 fixed on a sensor support section 41 (FIG. 1), an upper connection arm 121 and a lower connection arm 122 respectively coupled to both sides of the fixed section 20 (the upper-lower direction in FIG. 22), a pair of upper detection arms 123 (a first upper vibration arm) coupled to the upper connection arm 121, a pair of lower detection arms 124 (a first lower vibration arm) coupled to the lower connection arm 122, an upper drive arm 25 (a second upper vibration arm) coupled to each of the upper detection arms 123, a lower drive arm 29 (a second lower vibration arm) coupled to each of the lower detection arms 124, and a weighted section 26 coupled to each of the upper drive arms 25 and each of the lower drive arms 29. That is, an arm section of the upper connection arm 121, the upper detection arms 123, the upper drive arms 25 and the weighted sections 26, and the arm section of the lower connection arm 122, the lower detection arms 124, the lower drive arms 29 and the weighted sections 26 are provided on both sides of the fixed section 20.

The terms "upper" and "lower" mean the same as the case of the first embodiment (FIG. 22).

The fixed section 20 maintains each component from the upper connection arm 121 to the weighted section 26 inside an internal space G in the floating condition. The fixed section 20 has a rectangular fixed central section 20A provided in the central portion of the angular velocity sensor 12, and a pair of fixed beam sections 20B are coupled to both sides of the fixed central section 20A (the right side and the left side of the drawing surface in FIG. 22). Each of the fixed beam sections 20B has a rectangular shape extending long and narrowly in a direction orthogonal to the extending direction of the upper connection arm 121 and the lower connection arm 122. A pair of fixed end sections 20C are respectively coupled to the tip ends of the pair of fixed beam sections 20B while the fixed central section 20A is interposed between the pair of fixed beam sections 20B from the left and the right. Each of the fixed end sections 20C has a rectangular shape extending long and narrowly in the extending direction of the upper connection arm 121 and the lower connection arm 122. The central portion of each of the fixed end sections 20C is coupled to the tip end of each of the fixed beam sections 20B, and the bottom of each of the fixed end sections 20C is in contact with the top surface of the sensor support section 41 of the case 4. Therefore, the fixed central section 20A and the fixed beam sections 20B are maintained inside the internal space G in the floating condition by the fixed end sections 20C.

The fixed section 20 is not limited in the shape and dimension as shown in FIG. 22. Any shapes and dimensions are acceptable as long as the pair of upper detection arms 123, the pair of lower detection arms 124, the pair of upper drive arms 25 and the pair of lower drive arms 29 are maintained inside the internal space G in the floating condition.

The upper connection arm 121 maintains the upper detection arms 123, the upper drive arms 25 and the weighted sections 26 inside the internal space G in the floating condition. The upper connection arm 121 is connected to one face side of the fixed central section 20A (the side face of the upper side in FIG. 22) and is formed extending in plane parallel to the top surface of the sensor support section 41 and extending in a direction away from the fixed central section 20A.

The upper connection arm 121 is, for example, formed so as to be larger than both of the upper detection arms 123 and the upper drive arms 25 in width, or the upper connection arm 121 is formed so as to be larger than both of the upper detection arms 123 and the upper drive arms 25 in thickness. Therefore the upper connection arm 121 has the rigidity higher than those of the upper detection arms 123 and the upper drive arms 25.

The lower connection arm 122 maintains the lower detection arms 124, the lower drive arms 29 and the weighted sections 26 inside the internal space G in the floating condition. The lower connection arm 122 is connected to the side face different from the upper connection arm 121 with respect to the fixed central section 20A and is formed extending in the top surface of the sensor support section 41 and extending in the direction away from the fixed central section 20A.

The lower connection arm 122 is, for example, formed so as to be larger than both of the lower detection arms 124 and the lower drive arms 29 in width, or the lower connection arm 122 is formed so as to be larger than both of the lower detection arms 124 and the lower drive arms 29 in thickness. Therefore the lower connection arm 122 has the rigidity higher than those of the lower detection arms 124 and the lower drive arms 29.

The upper connection arm 121 and the lower connection arm 122 preferably extend in the direction parallel to each other, but may extend in directions intersecting to each other at a predetermined angle. The upper connection arm 121 and the lower connection arm 122 are preferably symmetrically formed extending with respect to the straight line orthogonal to the extending direction of the upper connection arm 121 through the fixed central section 20A.

When the distortion of the upper drive arms 25 generated by the Coriolis force acting on the pair of upper drive arms 25 is transmitted to the upper detection arms 123, the upper detection arms 123 generate the vibrations according to the magnitude of the distortion. Each of the upper detection arms 123 is coupled to the tip end on the side of the upper connection arm 121 different from the fixed central section 20A (refer to FIG. 22), or in the vicinity (refer to FIG. 27) thereof, and the part of the upper detection arms 123 except the both tip ends is coupled to the upper connection arm 121.

When the distortion of the lower drive arms 29 generated by the Coriolis force acting on the pair of lower drive arms 29 is transmitted to the lower detection arms 124, the lower detection arms 124 generate the vibrations according to the magnitude of the distortion. The lower detection arm 123 is coupled to the tip end (refer to FIG. 22) on the side of the lower connection arm 122 different from the fixed central section 20A, or in the vicinity (refer to FIG. 27) thereof, and the part of the lower detection arm 124 except the both tip ends is coupled to the lower connection arm 122.

The upper detection arms 123 and the lower detection arms 124 preferably extend in a direction parallel to each other, but may extend in directions intersecting to each other at the predetermined angle. The upper detection arms 124 and the lower detection arms 124 are preferably symmetrically formed extending with respect to the straight line orthogonal to the extending direction of the upper detection arms 123 through the fixed central section 20A.

When an object equipped with the angular velocity sensor device 1 performs the rotation with respect to the direction orthogonal to the top surface of the sensor support section 41

(the vertical direction of the drawing surface in FIG. 22), the upper drive arms 25 generate the Coriolis force on the upper drive arms 25. Each of the upper drive arms 25 is coupled to the tip end of each of the upper detection arms 123 or in the vicinity thereof, and is formed extending in the plane parallel to the top surface of the sensor support section 41 and extending in a direction away from the fixed central section 20A.

Each of the upper drive arms 25 preferably extend in a direction parallel to each other, but may extend in directions intersecting to each other at the predetermined angle. Each of the upper drive arms 25 is preferably symmetrically formed extending with respect to the upper connection arm 121. The upper connection arm 121 and each of the upper drive arms 25 preferably extend in a direction parallel to each other, but may extend in directions intersecting to each other at the predetermined angle.

When the object equipped with the angular velocity sensor device 1 performs the rotation with respect to the direction orthogonal to the top surface of the sensor support section 41 (the vertical direction of the drawing surface in FIG. 22), the lower drive arms 29 generate the Coriolis force on the lower drive arms 29. Each of the lower drive arms 29 is coupled to the tip end of each of the lower detection arms 124 or in the vicinity thereof, and is formed extending in the plane parallel to the top surface of the sensor support section 41 and extending in a direction away from the fixed central section 20A.

Each of the lower drive arms 29 preferably extend in a direction parallel to each other, but may extend in directions intersecting to each other at the predetermined angle. Each of the lower drive arms 29 is preferably symmetrically formed extending with respect to the lower connection arm 122. The lower connection arm 122 and each of the lower drive arms 29 preferably extend in a direction parallel to each other, but may extend in directions intersecting to each other at the predetermined angle.

Each of the upper drive arms 25 and each of the lower drive arms 29 preferably extend in a direction parallel to each other. Each of the upper drive arms 25 and each of the lower drive arms 29 are preferably symmetrically formed extending with respect to the straight line orthogonal to the extending direction of the upper connection arm 121 through the fixed central section 20A.

A weighted section 26 is coupled to the tip end on the side of each of the upper drive arms 25 different the upper detection arm 123, or the vicinity thereof. The weighted section 26 increases the vibrations of each of the upper drive arms 25. Also, the weighted section 26 is coupled to the tip end on the side of each of the lower drive arms 29 different from the lower detection arm 124, or in the vicinity thereof. The weighted section 26 increases the vibrations of each of the lower drive arms 29.

Here, the fixed section 20, the upper connection arm 121, the lower connection arm 122, the upper detection arms 123, the lower detection arms 124, the upper drive arms 25, the lower drive arms 29 and the weighted sections 26 can be respectively composed of, for example, common material (for example, silicon), and can be collectively formed by patterning the wafer.

On the surface of each of the upper detection arms 123, a pair of piezoelectric elements 123A and 123B are formed extending in the direction parallel to the extending direction of each of the upper detection arms 123. The pair of piezoelectric elements 123A and 123B detect the vibrations when each of the upper detection arms 123 is vibrated along the plane parallel to the top surface of the sensor support section 41 of the case 4, and are preferably disposed side by side along the extending direction of each of the upper detection arms 123. The upper detection arms 123, and the piezoelectric elements 123A and 123B correspond to an example of "the first upper vibration arm" of the present invention.

On the surface of each of the lower detection arms 124, a pair of piezoelectric elements 124A and 124B are formed extending in the direction parallel to the extending direction of each of the lower detection arms 124. The pair of piezoelectric elements 124A and 124B detect the vibrations when each of the lower detection arms 124 are vibrated along the plane parallel to the top surface of the sensor support section 41 of the case 4, and are preferably disposed side by side along the extending direction of each of the lower detection arms 124. The lower detection arms 124, and the piezoelectric elements 124A and 124B correspond to an example of "the first lower vibration arm" of the present invention.

On the surface of each of the upper drive arms 25, a pair of piezoelectric elements 25A and 25B are formed extending in the direction parallel to the extending direction of each of the upper drive arms 25. The pair of piezoelectric elements 25A and 25B vibrate each of the upper drive arms 25 along the plane parallel to the top surface of the sensor support section 41 of the case 4, and are preferably disposed side by side along the extending direction of each of the upper drive arms 25. The upper drive arm 25, and the piezoelectric elements 25A and 25B correspond to an example of "the second upper vibration arm" of the present invention.

On the surface of each of the lower drive arms 29, a pair of piezoelectric elements 29A and 29B are formed extending in the direction parallel to the extending direction of each of the lower drive arms 29. The pair of piezoelectric elements 29A and 29B vibrate each of the lower drive arms 29 along the plane parallel to the top surface of the sensor support section 41 of the case 4, and are preferably disposed side by side along the extending direction of each of the lower drive arms 29. The lower drive arm 29, and the piezoelectric elements 29A and 29B correspond to an example of "the second lower vibration arm" of the present invention.

Figure 24:
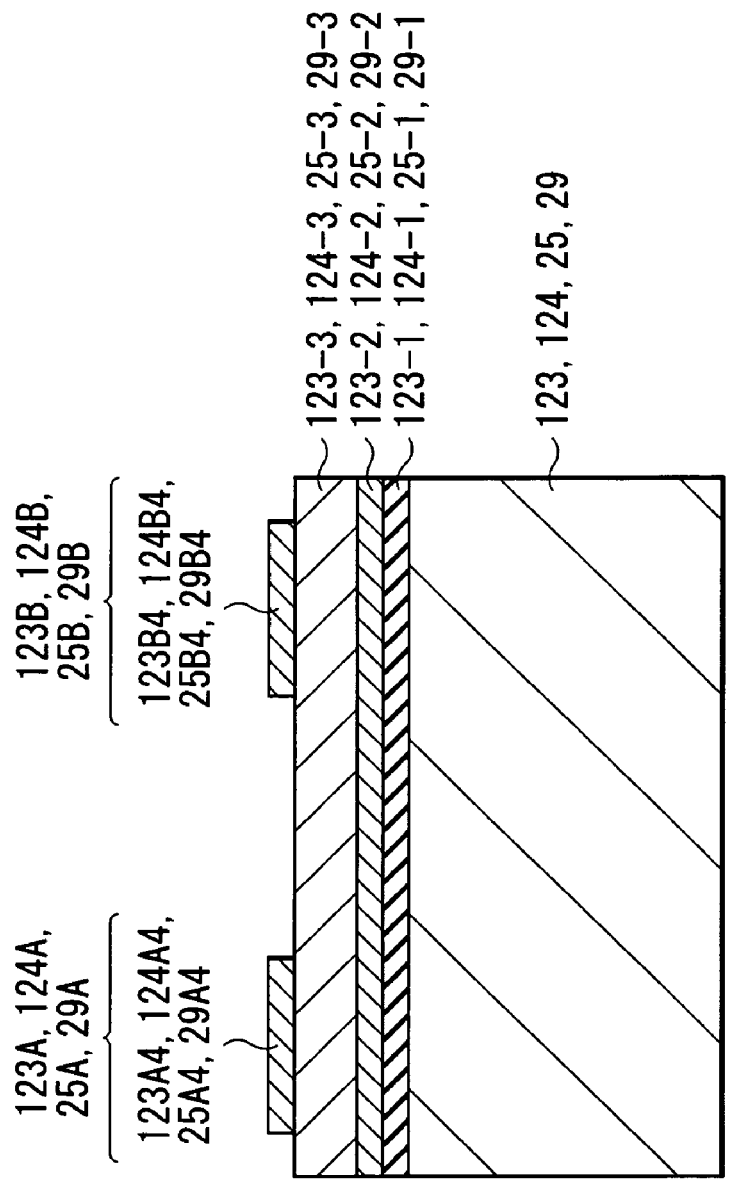
FIG. 24 is a cross-sectional configuration view for explaining a modification of the cross-sectional configuration illustrated in FIG. 23.

Here, for example as shown in FIG. 23, each of the piezoelectric elements 123A, 124A, 25A and 29A are formed by stacking, in this order, on the upper detection arms 123, the lower detection arms 124, the upper drive arms 25 and the lower drive arms 29, insulation layers 123A1, 124A1, 25A1 and 29A1, lower electrodes 123A2, 124A2, 25A2 and 29A2, piezoelectric substances 123A3, 124A3, 25A3 and 29A3, and upper electrodes 123A4, 124A4, 25A4 and 29A4. On the other hand, for example as shown in FIG. 24, each of the piezoelectric element 123B, 124B, 25B, and 29B are formed by stacking, in this order, on the upper detection arms 123, the lower detection arms 124, the upper drive arms 25 and the lower drive arms 29, the insulation layers 123B1, 124B1, 25B1 and 29B1, the lower electrodes 123B2, 124B2, 25B2 and 29B2, the piezoelectric substances 123B3, 124B3, 25B3 and 29B3, and the upper electrodes 123B4, 124B4, 25B4 and 29B4. That is, each of the piezoelectric elements 123A, 124A, 25A and 29A, and each of the piezoelectric elements 123B, 124B, 25B and 29B are formed separately to each other.

For example as shown in FIG. 24, the insulation layers 123A1, 124A1, 25A1 and 29A1 and the insulation layers 123B1, 124B1, 25B1 and 29B1 may be formed by common insulation layers 123-1, 124-1, 25-1 and 29-1. The lower electrodes 123A2, 124A2, 25A2 and 29A2, and the lower electrodes 123B2, 124B2, 25B2, and 29B2 may be formed by common lower electrodes 123-2, 124-2, 25-2 and 29-2. The piezoelectric substances 123A3, 124A3, 25A3 and 29A3 and the piezoelectric substances 123B3, 124B3, 25B3 and 29B3 may be formed by common piezoelectric substances 123-3, 124-3, 25-3, and 29-3.

Here, the insulation layers 123A1, 124A1, 25A1, 29A1, 123B1, 124B1, 25B1, 29B1, 123-1, 124-1, 25-1, and 29-1 are formed by stacking, for example, a $ZrO_2$ film and an $Y_2O_3$ film in this order. The lower electrodes 123A2, 124A2, 25A2, 123B2, 124B2, 25B2, 29B2, 123-2, 124-2, 25-2 and 29-2 are composed of, for example, a Pt (100) alignment film. The piezoelectric substances 123A3, 124A3, 25A3, 29A3, 123B3, 124B3, 25B3, 29B3, 123-3, 124-3, 25-3, and 29-3 are, for example, formed including piezoelectric zirconate titanate (PZT). The upper electrodes 123A4, 124A4, 25A4, 29A4, 123B4, 124B4, 25B4 and 29B4 are, for example, composed of a Pt (100) alignment film.

Figure 25:
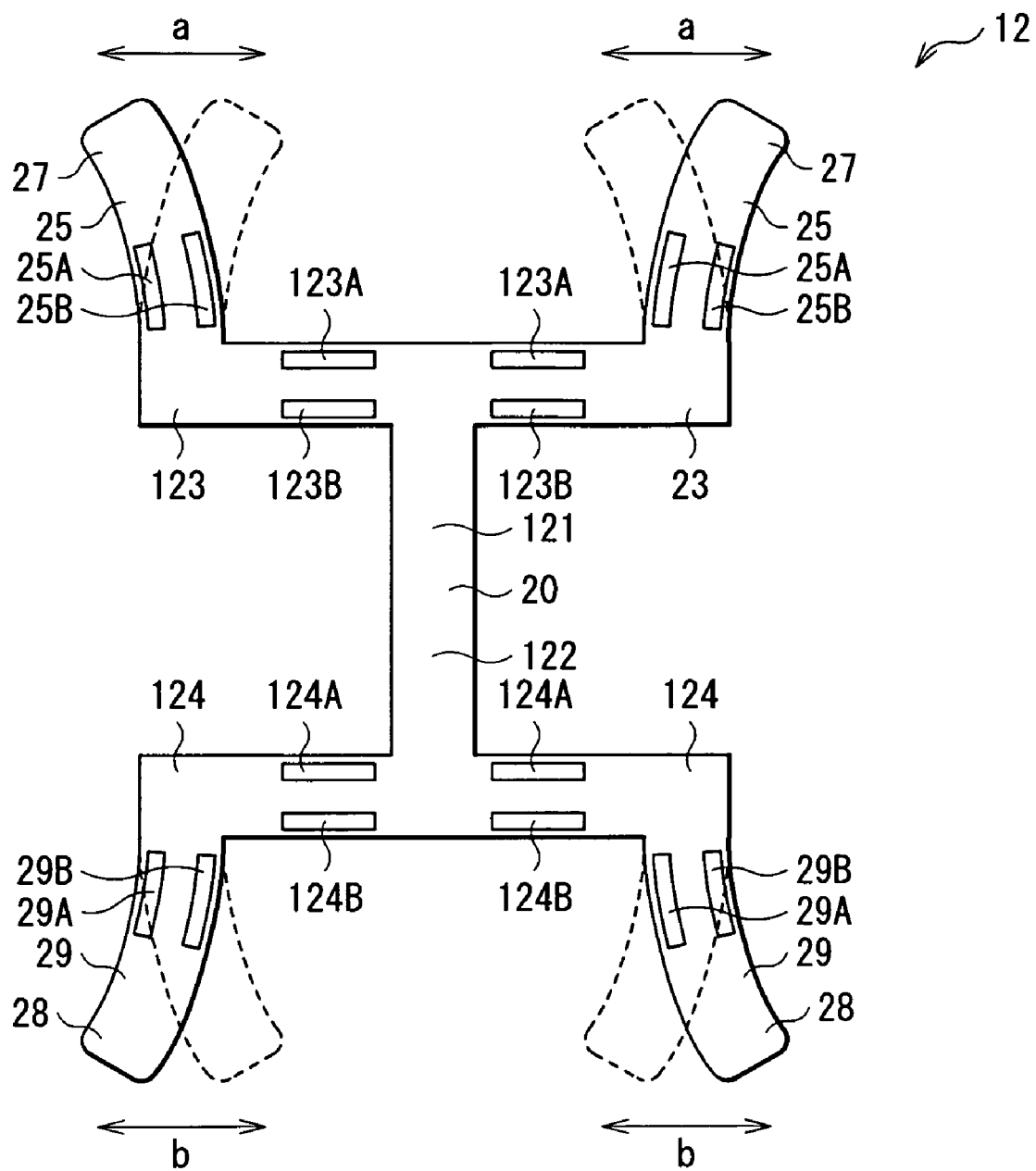
FIG. 25 is a simplified top configuration view for explaining the operation when the rotation is not applied to the angular velocity sensor of FIG. 1.

Next, the operation of the angular velocity sensor device having the abovementioned configuration or the like will be described. In the angular velocity sensor device 1, in case the object equipped with the angular velocity sensor device performs the rotation, for example, when the upper drive arms 25 are driven by using the piezoelectric elements 25A and 25B, and the lower drive arms 29 are driven by using the piezoelectric elements 29A and 29B, the upper drive arms 25 are mainly vibrated in a direction "a" parallel to the extending direction of the upper detection arms 123, and the lower drive arms 29 are mainly vibrated in a direction "b" parallel to the extending direction of the lower detection arms 124, as in FIG. 25.

Figure 26:
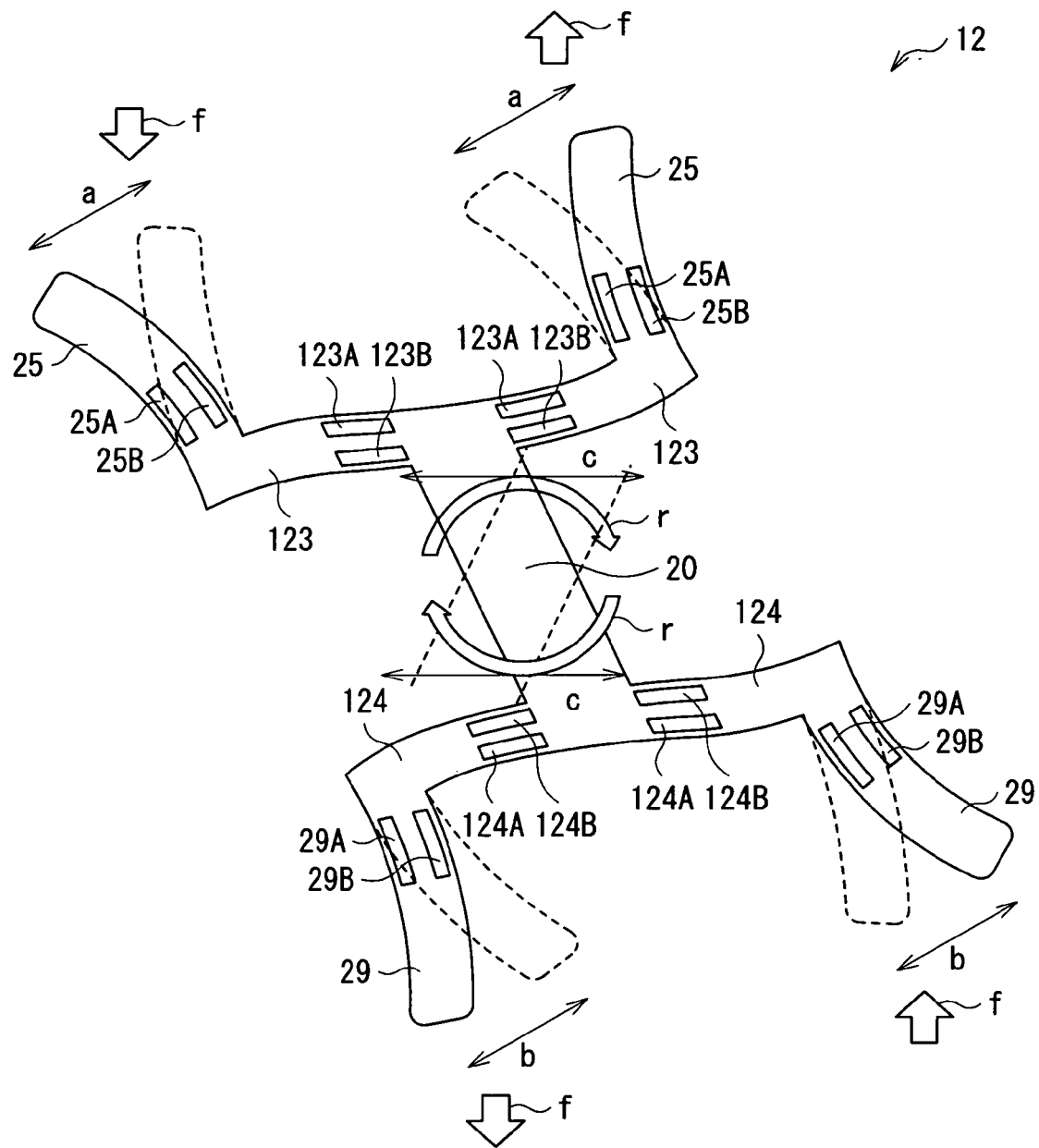
FIG. 26 is a simplified top configuration view for explaining the operation when the rotation is applied to the angular velocity sensor of FIG. 1.

In this case, for example as in FIG. 26, when the object equipped with the angular velocity sensor device performs a rotation "r" with respect to the direction orthogonal to the top surface of the sensor support section 41, a Coriolis force f acts on each of the upper drive arms 25 in the opposite directions, respectively, and the Coriolis force f acts on each of the lower drive arms 29 in the opposite directions, respectively. Thus, each of the upper drive arms 25 and each of the upper drive arms 29 are asymmetrically vibrated, and the upper detection arms 123 and the lower detection arms 124 are vibrated in a right-left direction "c" while using, as fulcrums, the connection portion of the upper detection arms 123 and the fixed central section 20A, and the connection portion of the lower detection arms 124 and the fixed central section 20A. Therefore, the detection signal according to the vibration of the upper detection arms 123 can be extracted from the piezoelectric elements 123A and 123B, and the detection signal according to the vibration of the lower detection arms 124 can be extracted from the piezoelectric elements 124A and 124B, thereby the angular velocity can be detected.

In the second embodiment, the arm section including the upper connection arm 121, the upper detection arms 123, the upper drive arms 25 and the weighted sections 26 and the arm section including the lower connection arm 122, the lower detection arms 124, the lower drive arms 29 and the weighted sections 26 are coupled to the both sides of the fixed section 20, respectively. Further, the rigidity of the upper connection arm 121 and lower connection arm 122 is enhanced. Thus, in case the angular velocity is detected in the abovementioned way, or in case the object equipped with the angular velocity sensor device 1 stops or performs the uniform motion, when the acceleration is received in the lateral direction, the upper connection arm 121 and the lower connection arm 122 are hardly displaced, each of the upper detection arms 123 and each of the lower detection arms 124 are displaced in the same direction, and the vibrations of the same phase are generated on each of the upper detection arms 123 and each of the lower detection arms 124. The difference between the detection signal extracted from each of the upper detection arms 123 and the detection signal extracted from each of the lower detection arms 124 is detected so that the output of the vibrations due to the translational acceleration in the lateral direction can be canceled and the noise can be suppressed. In this way, although the angular velocity sensor is horizontally located, the vibrations generated due to the Coriolis force and the vibrations generated by the translational acceleration received in the lateral direction can be distinguished, thereby the influence of the translational acceleration in the lateral direction can be almost eliminated.

In the second embodiment, each of the upper detection arms 123 acting also as a beam is coupled between each of the upper drive arms 25 and the upper connection arm 121, and each of the lower detection arms 124 acting also as a beam is coupled between each of the lower drive arms 29 and the lower connection arm 122. Thus when the Coriolis force is generated, a greater moment of the Coriolis force can act on the upper drive arms 25 and the lower drive arms 29, thereby the upper detection arms 123 and the lower detection arms 124 can be vibrated with relatively large amplitude. As a result, the detection accuracy of the angular velocity is improved.

In the second embodiment, the upper drive arms 25 are formed extending on the side of the upper detection arms 123 different from the fixed section 20 and the lower drive arms 29 are formed extending on the side of lower detection arms 124 different from the fixed section 20. Thus, when the upper drive arms 25 are vibrated by the piezoelectric elements 25A and 25B, and when the lower drive arms 29 is vibrated by the piezoelectric elements 29A and 29B, the upper drive arms 25 and the lower drive arms 29 can be vibrated with relatively large amplitude, thereby the detection accuracy of the angular velocity is improved.

When each of the upper drive arms 25 and each of the lower drive arms 29 are formed extending in the direction parallel to each other, the moment of the Coriois force can be maximized, thereby the detection accuracy of the angular velocity is further improved.

When each of the upper drive arms 25 are symmetrically formed extending with respect to the center of the upper connection arm 121, and each of the lower drive arms 29 are symmetrically formed extending with respect to the center of the lower connection arm 122, the bilaterally-symmetric drive vibrations are likely generated thereby the drive circuit driving each of the upper drive arms 25 and each of the lower drive arms 29 are simplified and the unnecessary vibrations of the upper detection arms 123 and the lower detection arms 124 can be suppressed.

When the upper detection arms 123 and the lower detection arms 124 are symmetrically disposed with respect to the straight line orthogonal to the extending direction of the upper connection arm 121 passing through the fixed central section 20A, and each of the upper drive arms 25 and each of the lower drive arms 29 are symmetrically disposed with respect to the straight line orthogonal to the extending direction of the upper detection arms 123 passing through the fixed central section 20A, the vibrations by the translational acceleration in the lateral direction and the vibrations by the angular velocity can be easily distinguished, thereby the detection accuracy of the angular velocity is improved.

In the second embodiment, the weighted section 26 is formed coupled to the tip end on the side of each of the upper drive arms 25 different from the upper detection arms 123, and the weighted section 26 is formed coupled to the tip end on the side of each of the lower drive arms 29 different from the lower detection arms 124. Thus, when each of the upper drive arms 25 and each of the lower drive arms 29 are vibrated, the upper drive arms 25 and the lower drive arms 29 can be vibrated with relatively large amplitude. Therefore the detection accuracy of the angular velocity is improved.

To facilitate the elimination of the influence of the translational acceleration in the lateral direction, it is preferred to equalize the amplitude and the resonance frequency of the upper detection arms 123 and the lower detection arms 124. This enables the vibrations excited by the translational acceleration in the lateral direction to be efficiently eliminated so that the suppression of the noise can be facilitated. To facilitate the elimination of the influence of the translational acceleration in the lateral direction, the amplitude and the resonance frequency of each of the upper drive arms 25 and each of the lower drive arms 29 are preferably equalized to each other.

Specifically, the resonance frequency and the amplitude can be adjusted by changing the width and the length of the amplitude part and the mass and the shape of the weighted sections 26. By these adjustments, the amplitude and the resonance frequency of the upper detection arms 123 and the lower detection arms 124, or the amplitude and the resonance frequency of each of the upper drive arms 25 and each of the lower drive arms 29 are preferably equalized. Most preferably, the upper detection arm 123 and the lower detection arm 124, or each of the upper drive arms 25 and each of the lower drive arms 29 have a symmetrical formation with respect to the fixed section 20. By the symmetrical formation, the vibrations are equalized to each other and the noise is likely minimized. When the resonance frequency and the amplitude between each of the upper drive arms 25 and each of the lower drive arms 29, and the resonance frequency and the amplitude between the upper detection arms 123 and the lower detection arms 124 are different to each other, the noise from the drive vibrations is suppressed by this difference, thereby the difference is rather preferable to avoid the interference with each other. Thus, it is unnecessary to eliminate the difference.

In the second embodiment, the upper detection arms 123 and each of the upper drive arms 25 are coupled without the fixed section 20 in between, and the lower detection arms 124 and each of the lower drive arms 29 are coupled without the fixed section 20 in between. Thus, even though the configuration of the fixed section 20 is not complicated, the distortion of each of the upper drive arms 25 generated by the Coriolis force acting on each of the upper drive arms 25 can be efficiently transmitted to the upper detection arms 123, and the distortion of each of the lower drive arms 29 generated by the Coriolis force acting on each of the lower drive arms 29 can be efficiently transmitted to the lower detection arms 124. Therefore, the fixed section 20 can be easily fixed on the sensor support section 41.

Figure 27:
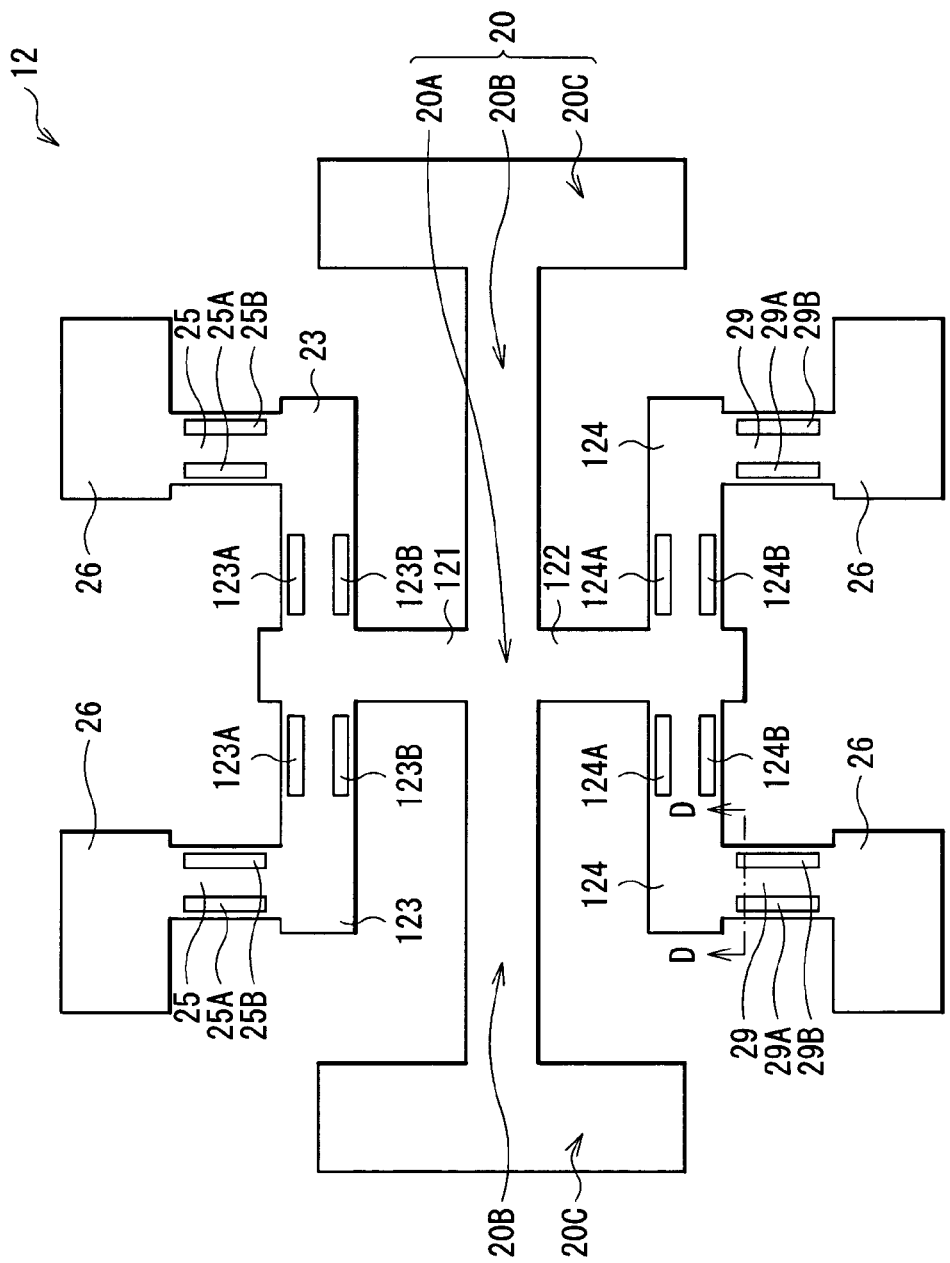
FIG. 27 is a top configuration view of a modification of the angular velocity sensor device of FIG. 1.

As shown in FIG. 27, the upper detection arms 123 may be coupled slightly approaching to the fixed section 20 side from the tip end of the upper connection arm 121 so that the tip end of the upper connection arm 121 is projected from the side face of the upper detection arms 123. Similarly, the lower detection arms 124 may be coupled slightly approaching to the fixed section 20 side from the tip end of the lower connection arm 122 so that the tip end of the lower connection arm 122 is projected from the side face of the lower detection arms 124.

In the configurations of FIGS. 3 and 4, the piezoelectric elements 123A, 123B, 124A, and 124B may be disposed in the position where the upper detection arms 123 and the upper connection arm 121 intersect and in the position where the lower detection arms 124 and the lower connection arm 122 intersect, respectively. The same is true for the modifications in the following.

(Modification 2-1)

Figure 28:
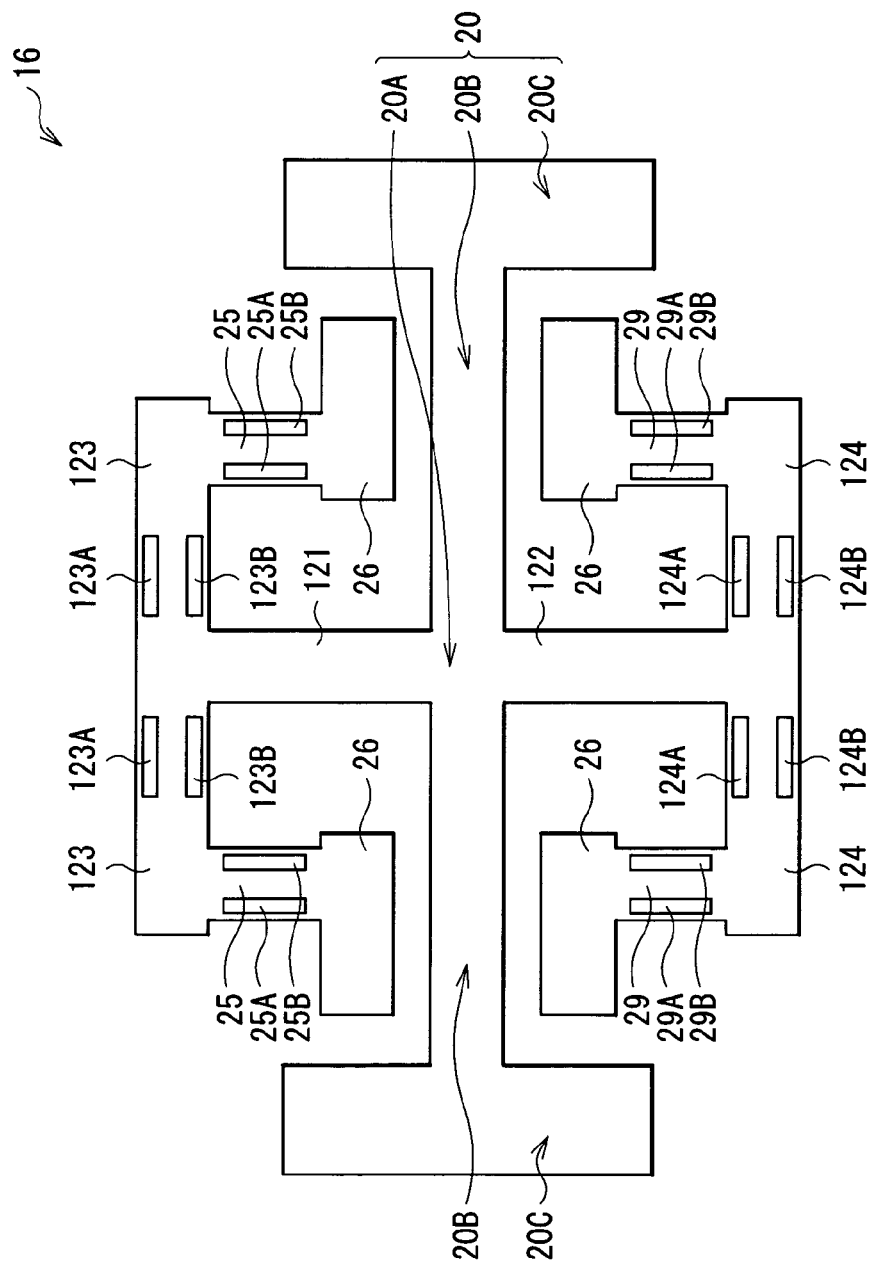
FIG. 28 is a top configuration view of the angular velocity sensor according to a modification 2-1.

In the second embodiment, the upper drive arms 25 and the weighted sections 26 are coupled to the side different from the fixed section 20 with respect to the upper detection arms 123, and the lower drive arms 29 and the weighted sections 26 are coupled to the side different from the fixed section 20 with respect to the lower detection arms 124. However, as shown in the angular velocity sensor 16 of FIG. 28, the upper drive arms 25 and the weighted sections 26 may be coupled to the side of the fixed section 20 side with respect to the upper detection arms 123, and the lower drive arms 29 and the weighted sections 26 may be coupled to the side different from the fixed section 20 with respect to the lower detection arms 124. Also in this case, similarly to the second embodiment, an arm section of the upper connection arm 121, the upper detection arms 123, the upper drive arms 25 and the weighted sections 26, and the arm section of the lower connection arm 122, the lower detection arms 124, the lower drive arms 29 and the weighted sections 26 are respectively coupled to the both sides of the fixed section 20. Further, the rigidity of the upper connection arm 121 and the lower connection arm 122 is enhanced so that the influence of the translational acceleration in the lateral direction can be almost eliminated. Similarly to the second embodiment, each of the upper detection arms 123 and each of the upper drive arms 25 are coupled without the fixed section 20 in between, and each of the lower detection arm 124 and each of the lower drive arms 29 are coupled without the fixed section 20 in between, thereby the fixed section 20 can be easily fixed on the sensor support section 41.

In this case, the angular velocity sensor 16 and the angular velocity sensor device 1 can be miniaturized in comparison with the case where the upper drive arms 25 and the weighted sections 26 are coupled to the side different from the fixed section 20 with respect to the upper detection arms 123, and the lower drive arms 29 and the weighted sections 26 are coupled to the side different from the fixed section 20 with respect to the lower detection arms 124 (in case of the second embodiment).

Figure 29:
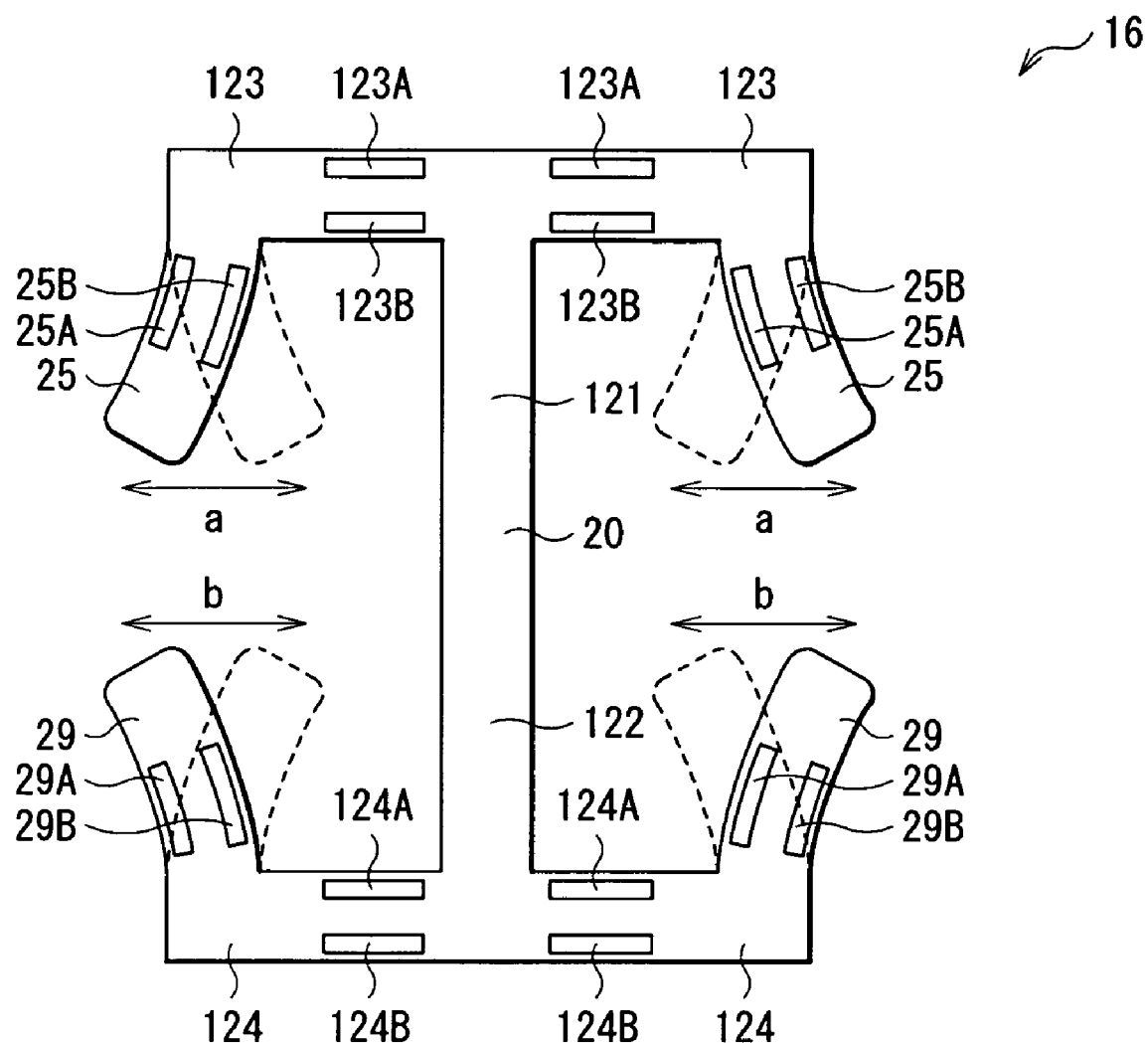
FIG. 29 is a simplified top configuration view for explaining the operation when the rotation is not applied to the angular velocity sensor of FIG. 28.

Here, in case the object equipped with the angular velocity sensor device 1 performs no rotation, when each of the upper drive arms 25 is driven by using the piezoelectric elements 25A and 25B, and each of the lower drive arms 29 is driven by using the piezoelectric elements 29A and 29, as shown in FIG. 29, each of the upper drive arms 25 is vibrated in a direction "a" parallel to the extending direction of the upper detection arms 123, and each of the lower drive arms 29 is vibrated in a direction "b" parallel to the extending direction of the lower detection arms 124.

Figure 30:
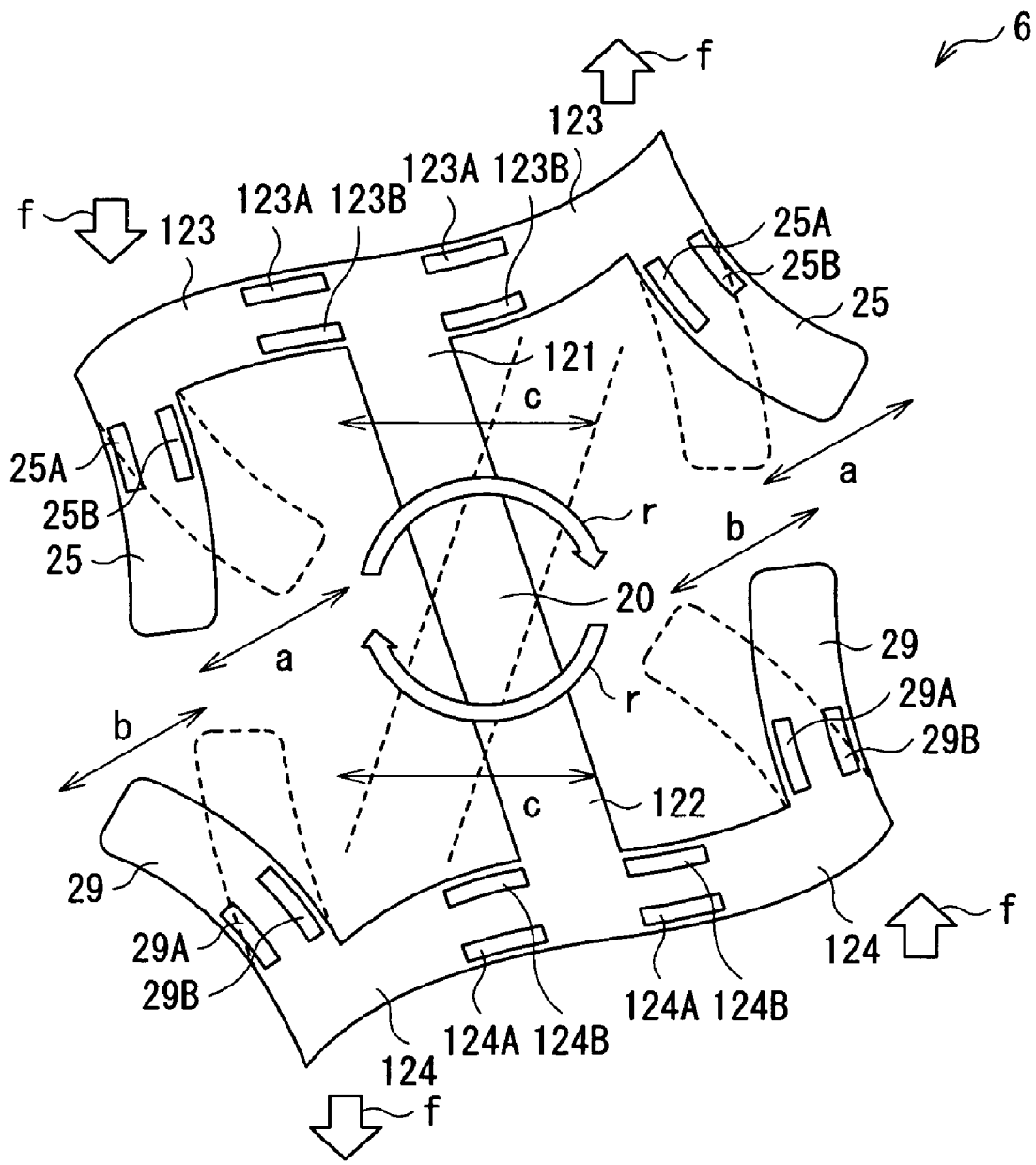
FIG. 30 is a simplified top configuration view for explaining the operation when the rotation is applied to the angular velocity sensor of FIG. 28.

In this case, as in FIG. 30, when the object equipped with the angular velocity sensor device 1 performs a rotation "r" with respect to the direction orthogonal to the top surface of the sensor support section 41, a Coriolis force f acts on each of the upper drive arms 25 in the opposite directions, respectively, and the Coriolis force f acts on each of the lower drive arms 29 in the opposite directions, respectively. Thus, each of the upper drive arms 25 and each of the upper detection arms 123, and each of the lower drive arms 29 and each of the lower detection arms 124 are asymmetrically vibrated, and the upper detection arms 23 and the lower detection arms 124 are vibrated in a right-left direction "c". Therefore, the detection signal according to the vibrations of the upper detection arms 123 can be extracted from the piezoelectric elements 123A and 123B, and the detection signal according to the vibrations of the lower detection arms 124 can be extracted from the piezoelectric elements 124A and 124B, thereby each velocity can be detected.

(Modification 2-2)

Figure 31:
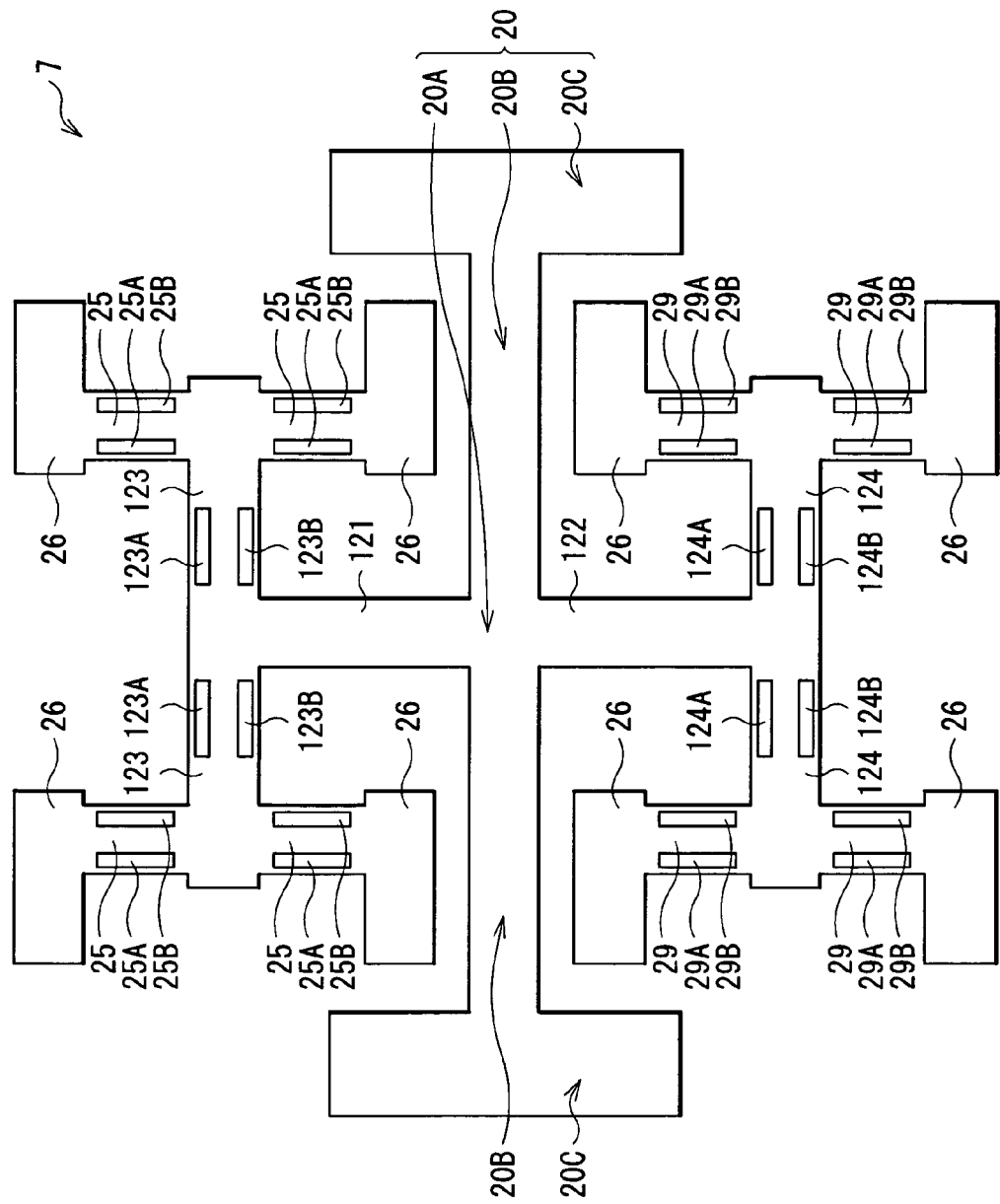
FIG. 31 is a top configuration view of the angular velocity sensor according to a modification 2-2.

In the second embodiment, the upper drive arms 25 (a pair of second upper vibration arms) and the weighted sections 26 are coupled to the side different from the fixed section 20 with respect to the upper detection arms 123, and the lower drive arms 29 (a pair of second lower vibration arms) and the weighted sections 26 are coupled to the side different from the fixed section 20 with respect to the lower detection arms 124. Additionally, as shown in the angular velocity sensor 17 of FIG. 31, the upper drive arms 25 (a pair of third upper vibration arms) and the weighted sections 26 may be coupled to the side of the fixed section 20 with respect to the upper detection arms 123, and the lower drive arms 29 (a pair of third lower vibration arms) and the weighted sections 26 may be coupled to the side of the fixed section 20 with respect to the lower detection arms 124. Also in this case, similarly to the second embodiment, the arm section of the upper connection arm 121, the upper detection arms 123, the upper drive arms 25 and the weighted sections 26, and the arm section of the lower connection arm 122, the lower detection arms 124, the lower drive arms 29 and the weighted sections 26 are respectively coupled to the both sides of the fixed section 20. Further, the rigidity of the upper connection arm 121 and the lower connection arm 122 is enhanced so that the influence of the translational acceleration in the lateral direction can be almost eliminated. Similarly to the second embodiment, each of the upper detection arms 123 and each of the upper drive arms 25 are coupled without the fixed section 20 in between, and each of the lower detection arm 124 and each of the lower drive arms 29 are coupled without the fixed section 20 in between, thereby the fixed section 20 can be easily fixed on the sensor support section 41.

Further, in this case, when each of the upper drive arms 25 and each of the lower drive arms 29 are vibrated with no rotation applied, accompanied by the vibrations of each of the upper drive arms 25 and each of the lower drive arms 29, the upper detection arms 123, the lower detection arms 124, the upper connection arm 121 and the lower connection arm 122 can be controlled not to be vibrated correspondingly. In such a case, the detection accuracy of the angular velocity is improved.

Figure 32:
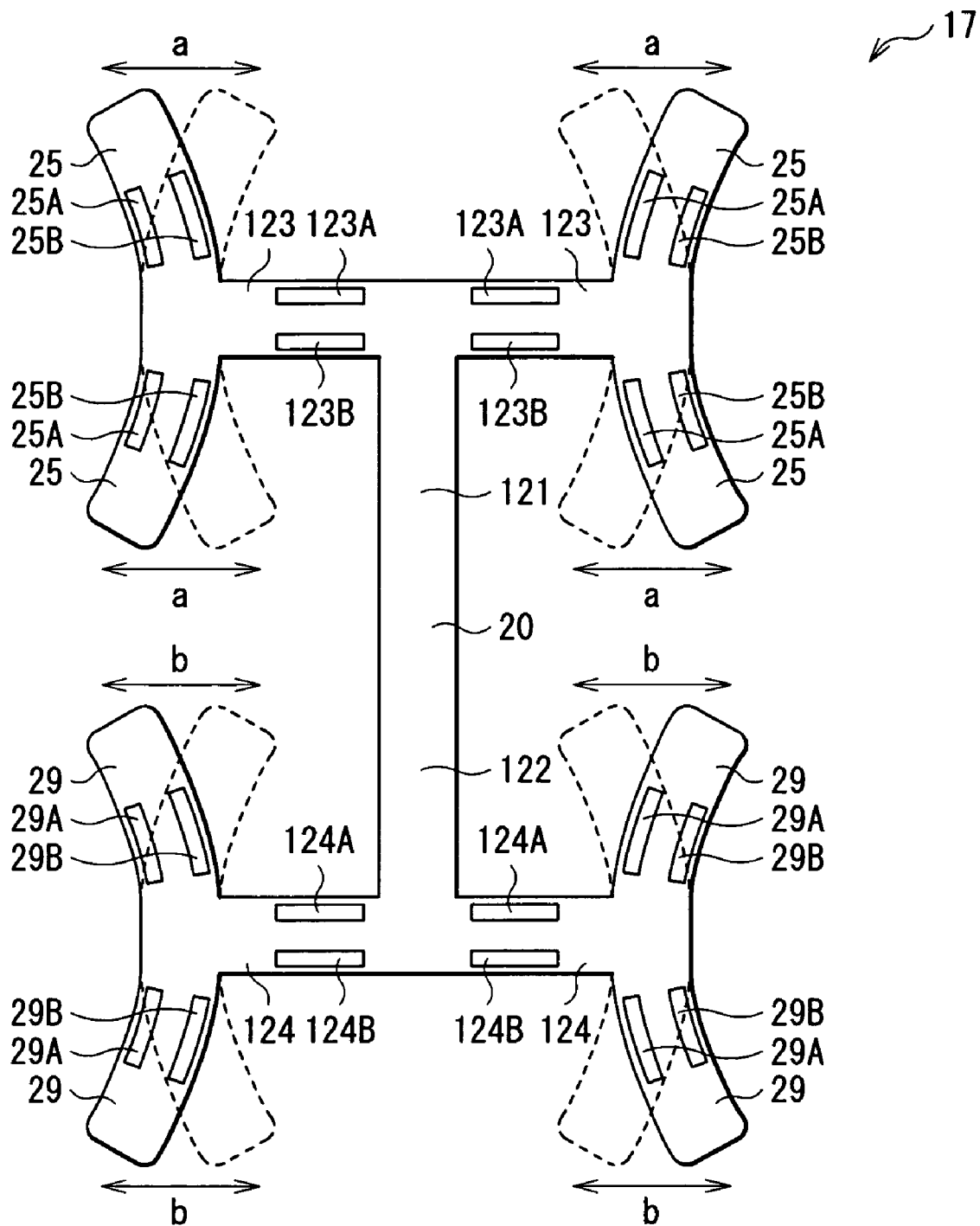
FIG. 32 is a simplified top configuration view for explaining the operation when the rotation is not applied to the angular velocity sensor of FIG. 31.

Here, in case the object equipped with the angular velocity sensor device 1 performs no rotation, when each of the upper drive arms 25 is driven by using the piezoelectric elements 25A and 25B, and each of the lower drive arms 29 is driven by using the piezoelectric elements 29A and 29, as shown in FIG. 32, the four of upper drive arms 25 are vibrated in a direction "a" parallel to the extending direction of the upper detection arms 123, and the four of lower drive arms 29 are vibrated in a direction "b" parallel to the extending direction of the lower detection arms 124.

Figure 33:
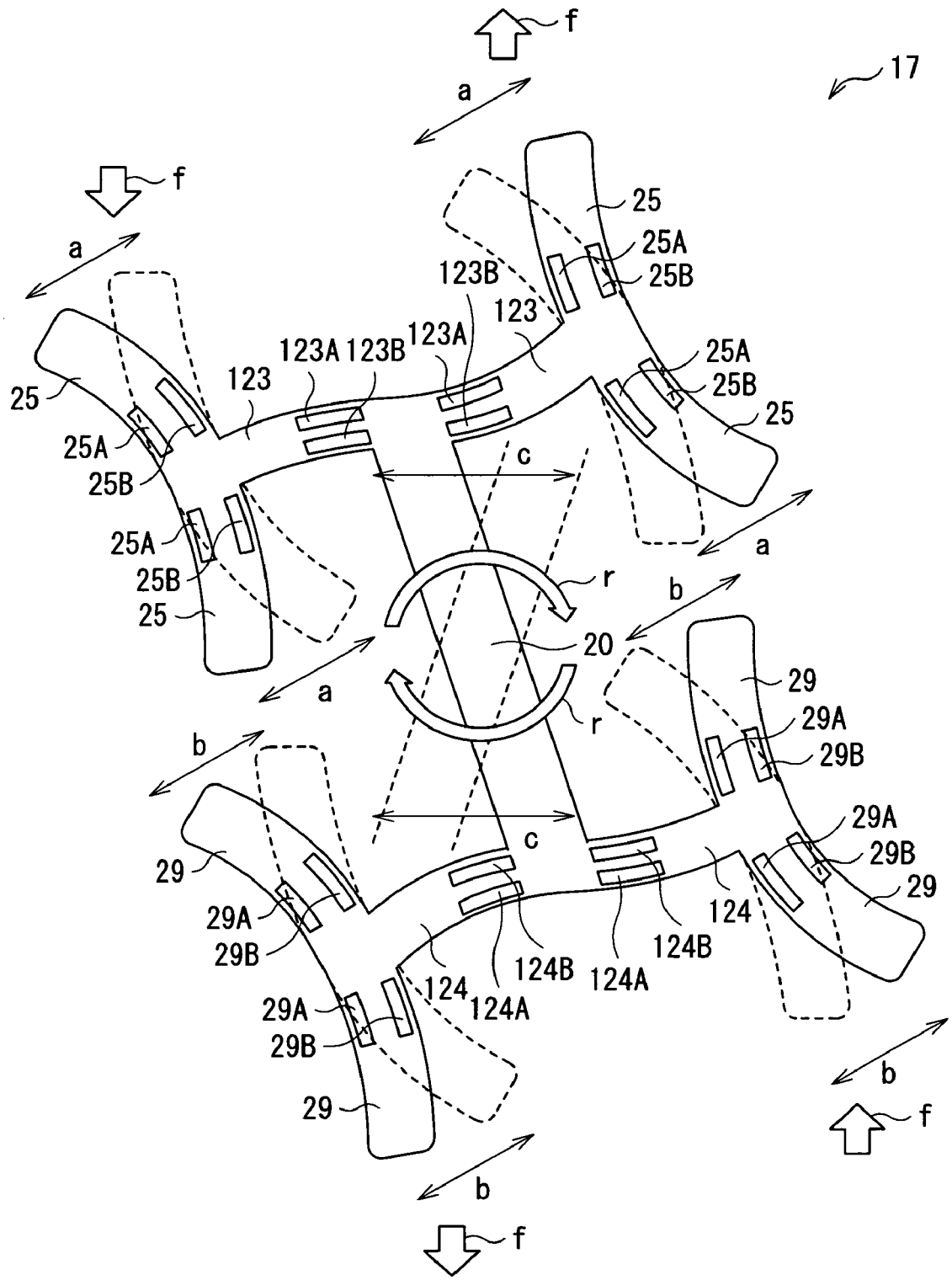
FIG. 33 is a simplified top configuration view for explaining the operation when the rotation is applied to the angular velocity sensor of FIG. 31.
Figure 34:
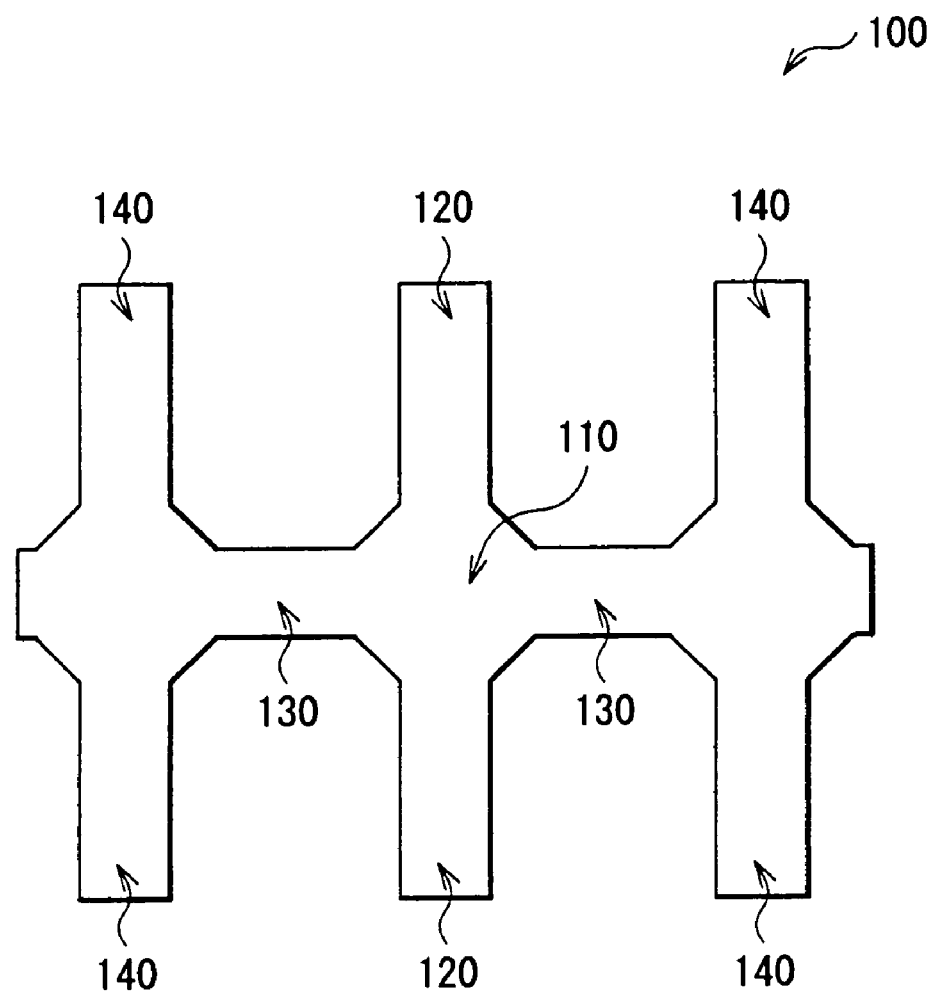
FIG. 34 is a top configuration view of the angular velocity sensor of the related art.

In this case, as in FIG. 33, when the object equipped with the angular velocity sensor device 1 performs a rotation "r" with respect to the direction orthogonal to the top surface of the sensor support section 41, a Coriolis force f acts on the right upper drive arms 25 and the left upper drive arms 25 in the opposite directions, respectively, and the Coriolis force f acts on the right lower drive arms 29 and the left lower drive arms 29 in the opposite directions, respectively. Thus, each of the upper drive arms 25 and each of the upper detection arms 123, and each of the lower drive arms 29 and each of the lower detection arms 124 are asymmetrically vibrated, and the upper detection arms 123 and the lower detection arms 124 are vibrated in a right-left direction "c". Therefore, the detection signal according to the vibrations of the upper detection arms 123 at this time can be extracted from the piezoelectric elements 123A and 123B, and the detection signal according to the vibrations of the lower detection arms 124 can be extracted from the piezoelectric elements 124A and 124B, thereby each velocity can be detected.

Hereinbefore, the present invention is explained with the embodiment and the modifications. However the present invention is not limited to these as various modifications are available.

It should be understood by those skilled in the art that various modifications, combinations, sub-combinations and alterations may occur depending on design requirements and other factors insofar as they are within the scope of the appended claims or the equivalents thereof.

What is claimed is:

1. An angular velocity sensor comprising:

a fixed section fixed on a support surface;

an upper connection arm and a lower connection arm coupled to both sides of the fixed section, respectively, and extending along a plane parallel to the support surface;

a pair of first upper vibration arms coupled to a tip end of the upper connection arm and extending in a first direction along the plane parallel to the support surface, and each of the pair of first upper vibration arms extending opposite to one another in the first direction, the tip end of the upper connection arm located on a side of the upper connection arm opposite to the fixed section, the pair of first upper vibration arms respectively each having a first electrode;

a pair of first lower vibration arms coupled to a tip end of the lower connection arm and extending in the first direction along the plane parallel to the support surface, and each of the pair of first lower vibration arms extending opposite to one another in the first direction, the tip end of the lower connection arm located on a side of the lower connection arm opposite to the fixed section, the pair of first lower vibration arms respectively each having a second electrode;

a pair of second upper vibration arms respectively coupled to first and second tip ends of the pair of first upper vibration arms and extending in a second direction away from the fixed section, orthogonal to the first direction, and along the plane parallel to the support surface, the pair of second upper vibration arms respectively each having a third electrode, and the first and second tip ends of the pair of first upper vibration arms located on a side of the first upper vibration arms opposite to the tip end of the upper connection arm;

a pair of second lower vibration arms respectively coupled to first and second tip ends of the pair of first lower vibration arms and extending in the second direction away from the fixed section and along the plane parallel to the support surface, the pair of second lower vibration arms respectively each having a fourth electrode, and the first and second tip ends of the pair of first lower vibration arms located on a side of the first lower vibration arms opposite to the tip end of the lower connection arm;

a first plurality of piezoelectric elements disposed upon at least one of (1) one of the pair of first upper vibration arms and (2) one of the pair of first lower vibration arms, the first plurality of piezoelectric elements including the first electrodes and the second electrodes; and a second plurality of piezoelectric elements disposed upon at least one of (1) one of the pair of second upper vibrations arms and (2) one of the pair of second lower vibration arms, the second plurality of piezoelectric elements including the third electrodes and the fourth electrodes, wherein the pair of first upper vibration arms and the pair of first lower vibration arms operate as detection arms, the pair of second upper vibration arms and the pair of second lower vibration arms operate as drive arms, the fixed section, the pair of first upper vibration arms, the pair of first lower vibration arms, the pair of second upper vibration arms, and the pair of second lower vibrations arms are formed of a silicon substrate, and the first electrodes, the second electrodes, the third electrodes, and the fourth electrodes are all disposed on one surface of the silicon substrate.

2. The angular velocity sensor according to claim 1, wherein the pair of second upper vibration arms and the pair of second lower vibration arms extend in a direction parallel to each other.

3. The angular velocity sensor according to claim 1, wherein the pair of second upper vibration arms extend from the pair of first upper vibration arms toward the fixed section, respectively, and the pair of second lower vibration arms extend from the pair of first lower vibration arms toward the fixed section, respectively.

4. The angular velocity sensor according to claim 1, wherein the pair of second upper vibration arms extend from the pair of first upper vibration arms toward a direction different from the fixed section, respectively, and the pair of second lower vibration arms extend from the pair of first lower vibration arms toward a direction different from the fixed section, respectively.

5. The angular velocity sensor according to claim 4 further comprising:

a pair of third upper vibration arms respectively coupled to the pair of first upper vibration arms and extending from the first upper vibration arms toward the fixed section, along the plane parallel to the support surface, and respectively having a fifth electrode; and a pair of third lower vibration arms respectively coupled to the pair of first lower vibration arms and extending from the first lower vibration arms toward the fixed section, along the plane parallel to the support surface, and respectively having a sixth electrode.

6. The angular velocity sensor according to claim 1, wherein an upper weighted section is coupled to a tip end of each of the pair of second upper vibration arms, and a lower weighted section is coupled to a tip end of each of the pair of second lower vibration arms.

7. The angular velocity sensor according to claim 1, wherein the upper connection arm is formed larger than a width of at least one of (1) one of the pair of first upper vibration arms and (2) one of the pair of second upper vibration arms, and the lower connection arm is formed larger than a width of at least one of (1) one of the pair of first lower vibration arms and (2) one of the pair of second lower vibration arms.

8. The angular velocity sensor according to claim 1, wherein the upper connection arm is formed larger than a thickness of at least one of (1) one of the pair of first upper vibration arms and (2) one of the pair of second upper vibration arms, and the lower connection arm is formed larger than a thickness of at least one of (1) one of the pair of first lower vibration arms and (2) one of the pair of second lower vibration arms.

9. The angular velocity sensor according to claim 1, wherein the pair of second upper vibration arms are symmetrically disposed with respect to the upper connection arm, and the pair of second lower vibration arms are symmetrically disposed with respect to the lower connection arm.

10. The angular velocity sensor according to claim 1, wherein the pair of first upper vibration arms and the pair of first lower vibration arms are symmetrically disposed with respect to the fixed section, and the pair of second upper vibration arms and the pair of second lower vibration arms are symmetrically disposed with respect to the fixed section.

11. An angular velocity sensor device comprising an angular velocity sensor and an integrated circuit, wherein the angular velocity sensor includes a fixed section fixed on a support surface, an upper connection arm and a lower connection arm coupled to both sides of the fixed section, respectively, and extending along a plane parallel to the support surface, a pair of first upper vibration arms coupled to a tip end of the upper connection arm and extending in a first direction along the plane parallel to the support surface, and each of the pair of first upper vibration arms extending opposite to one another in the first direction, the tip end of the upper connection arm located on a side of the upper connection arm opposite to the fixed section, the pair of first upper vibration arms respectively each having a first electrode, a pair of first lower vibration arms coupled to a tip end of the lower connection arm and extending in the first direction along the plane parallel to the support surface, and each of the pair of first lower vibration arms extending opposite to one another in the first direction, the tip end of the lower connection arm located on a side of the lower connection arm opposite to the fixed section, the pair of first lower vibration arms respectively each having a second electrode, a pair of second upper vibration arms respectively coupled to first and second tip ends of the pair of first upper vibration arms and extending in a second direction away from the fixed section., orthogonal to the first direction, and along the plane parallel to the support surface, the pair of second upper vibration arms respectively each having a third electrode, and the first and second tip ends of the pair of first upper vibration arms located on a side of the first upper vibration arms opposite to the tip end of the upper connection arm, a pair of second lower vibration arms respectively coupled to first and second tip ends of the pair of first lower vibration arms and extending in the second direction away from the fixed section and along the plane parallel to the support surface, the pair of second lower vibration arms respectively each having a fourth electrode, and the first and second tip ends of the pair of first lower vibration arms located on a side of the first lower vibration arms opposite to the tip end of the lower connection arm, a first plurality of piezoelectric elements disposed upon at least one of (1) one of the pair of first upper vibration arms and (2) one of the pair of first lower vibration arms, the first plurality of piezoelectric elements including the first electrodes and the second electrodes, a second plurality of piezoelectric elements disposed upon at least one of (1) one of the pair of second upper vibrations arms and (2) one of the pair of second lower vibration arms, the second plurality of piezoelectric elements including the third electrodes and the fourth electrodes, wherein the pair of first upper vibration arms and the pair of first lower vibration arms operate as detection arms, the pair of second upper vibration arms and the pair of second lower vibration arms operate as drive arms, the fixed section, the pair of first upper vibration arms, the pair of first lower vibration arms, the pair of second upper vibration arms, and the pair of second lower vibrations arms are formed of a silicon substrate, and the first electrodes, the second electrodes, the third electrodes, and the fourth electrodes are all disposed on one surface of the silicon substrate; and the integrated circuit transmits drive signals to the pair of second upper vibration arms and the pair of second lower vibration arms, and receives detection signals outputted from the pair of first upper vibration arm and the pair of first lower vibration arm.

* * * * *